United States Patent
Ganigarakoppal Kantharaju et al.

(10) Patent No.: US 12,216,910 B1
(45) Date of Patent: Feb. 4, 2025

(54) RESILIENT SOFTWARE RAID/MANAGEMENT COMMUNICATION SYSTEM

(71) Applicant: Dell Products L.P., Round Rock, TX (US)

(72) Inventors: Nikhith Ganigarakoppal Kantharaju, Hassan (IN); Sumalatha Pagadala, Bangalore (IN); Sushmitha Naik, Udupi (IN); Dharma Bhushan Ramaiah, Bangalore (IN); Vineeth Radhakrishnan, Bangalore (IN); Shinose Abdul Rahiman, Bangalore (IN); Rama Rao Bisa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/228,240

(22) Filed: Jul. 31, 2023

(51) Int. Cl.
*G06F 3/06* (2006.01)

(52) U.S. Cl.
CPC .......... *G06F 3/0617* (2013.01); *G06F 3/0653* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 10,282,094 B2 | 5/2019 | Kachare et al. | |
| 2003/0212857 A1* | 11/2003 | Pacheco | G11B 19/20 711/170 |
| 2011/0208922 A1* | 8/2011 | Coronado | G06F 11/1482 711/E12.001 |
| 2011/0320708 A1* | 12/2011 | Otaka | G06F 3/0659 711/E12.001 |
| 2014/0149658 A1* | 5/2014 | Boyd | G06F 3/0689 711/112 |
| 2015/0143169 A1* | 5/2015 | Konta | G06F 3/0613 714/6.32 |
| 2018/0081550 A1* | 3/2018 | Balakrishnan | G06F 9/4411 |
| 2020/0004445 A1* | 1/2020 | Benisty | G06F 3/0664 |
| 2023/0305859 A1* | 9/2023 | Harsany | G06F 9/4403 |

* cited by examiner

Primary Examiner — Stephanie Wu
(74) Attorney, Agent, or Firm — Joseph Mencher

(57) ABSTRACT

A resilient software Redundant Array of Independent Disk (RAID)/management communication system includes a chassis housing a software RAID subsystem coupled to a plurality of storage devices that are also coupled to a management subsystem. The software RAID subsystem designates a first storage device in the plurality of storage devices as a primary storage device and a second storage device in the plurality of storage devices as a secondary storage device, and uses the respective storage device memory subsystem in the first storage device to transmit first management communications with the management subsystem. If the software RAID subsystem determines that the first storage device is unavailable, it uses the respective storage device memory subsystem in the second storage device to transmit second management communications with the management subsystem.

20 Claims, 51 Drawing Sheets

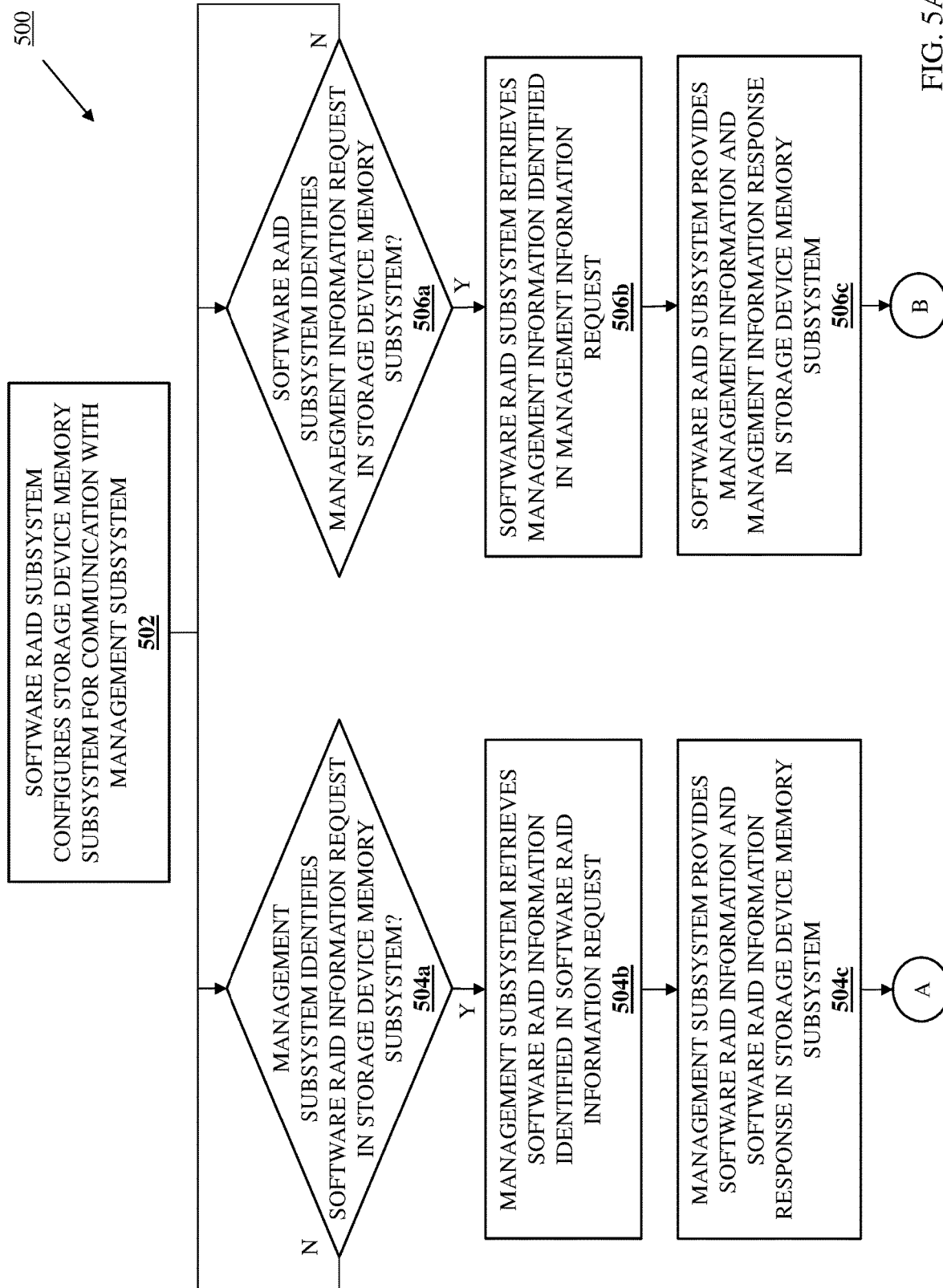

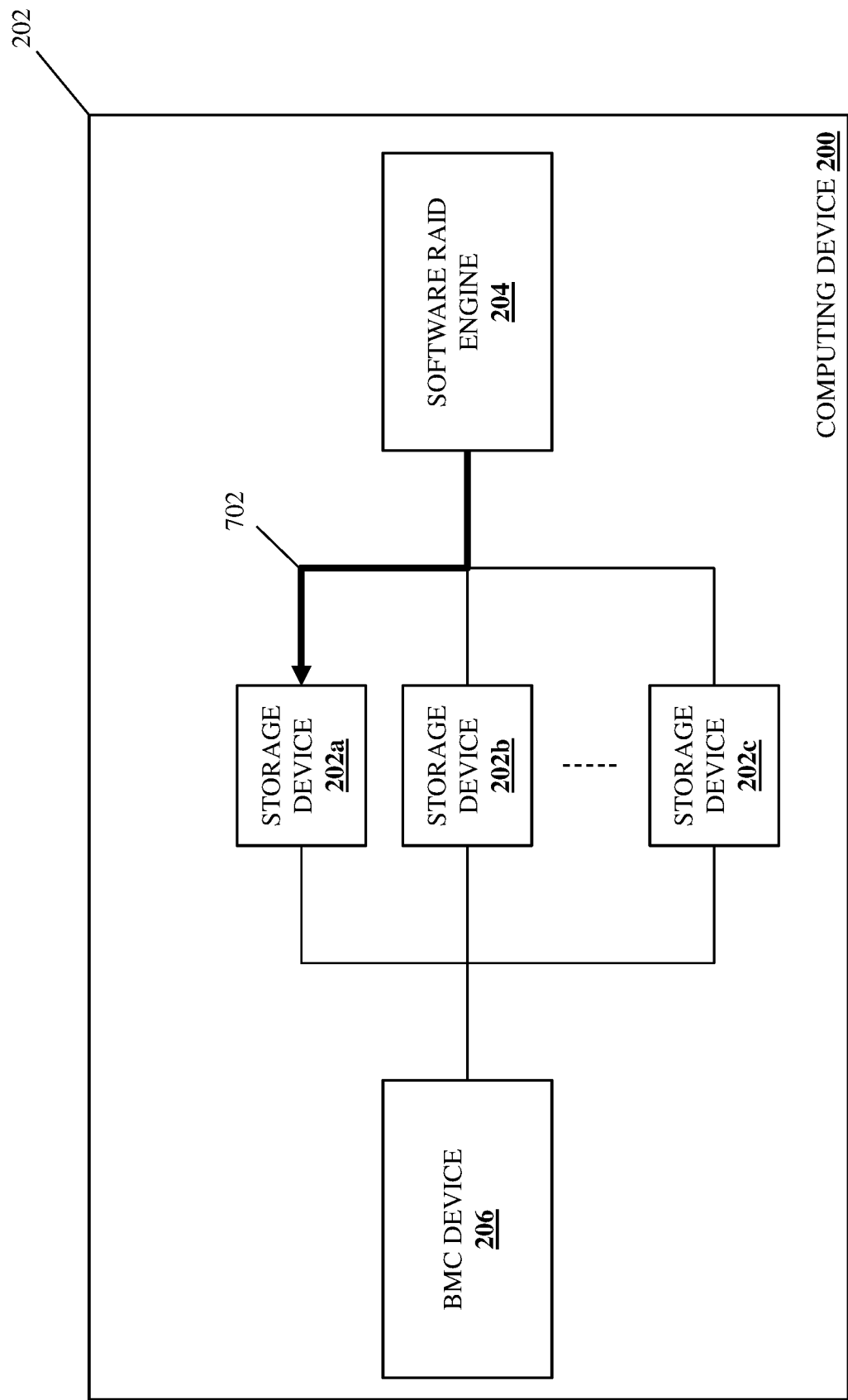

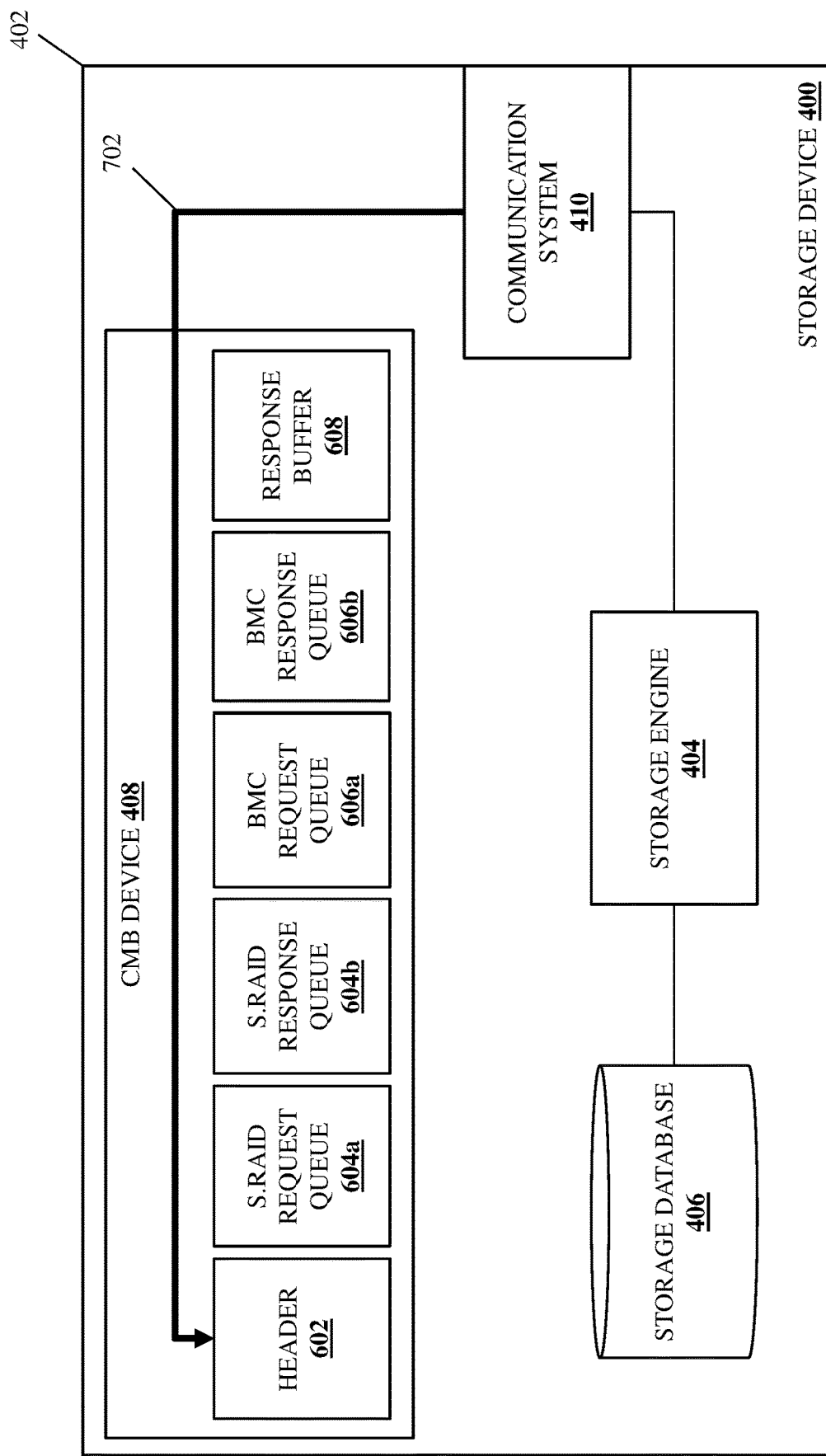

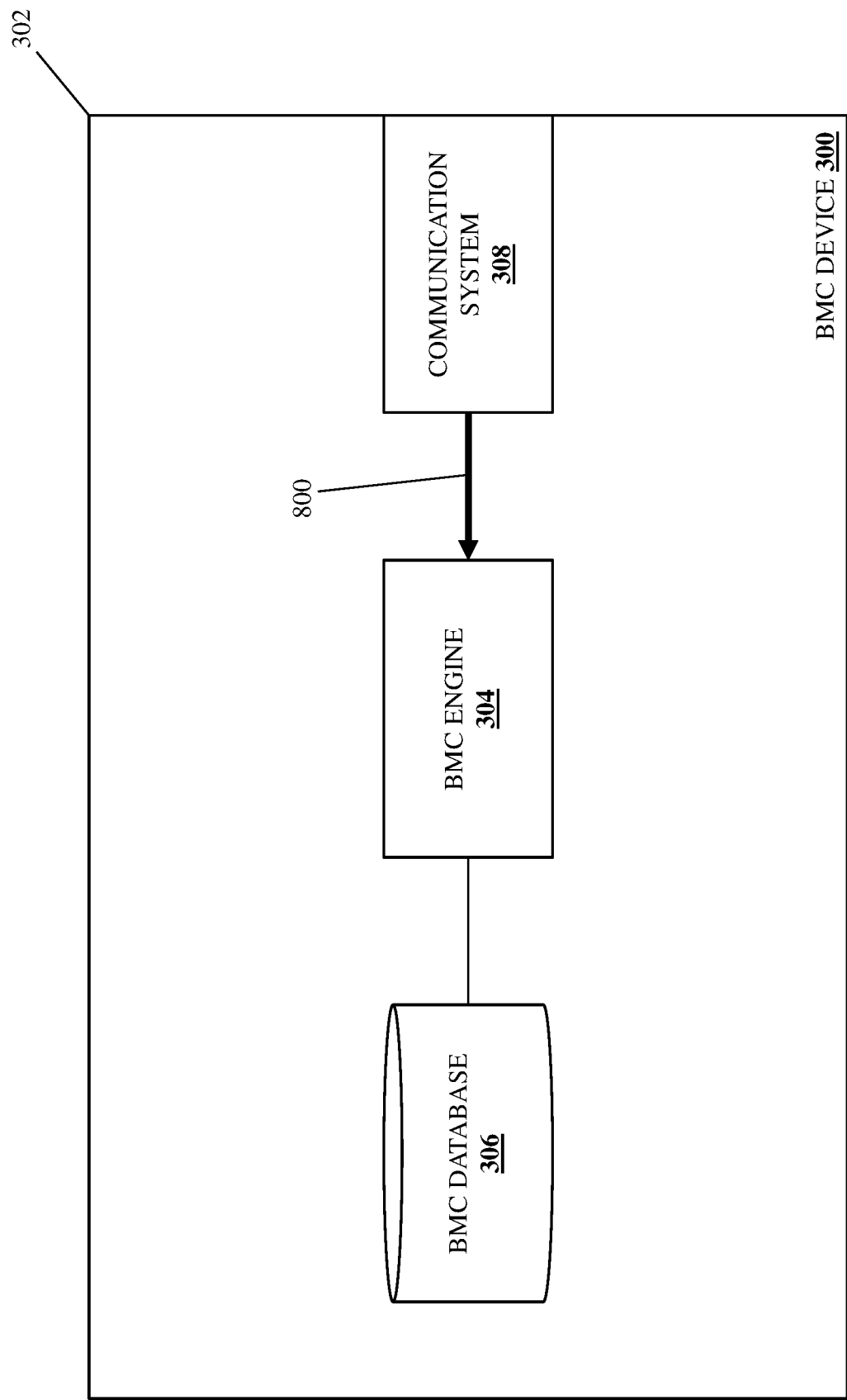

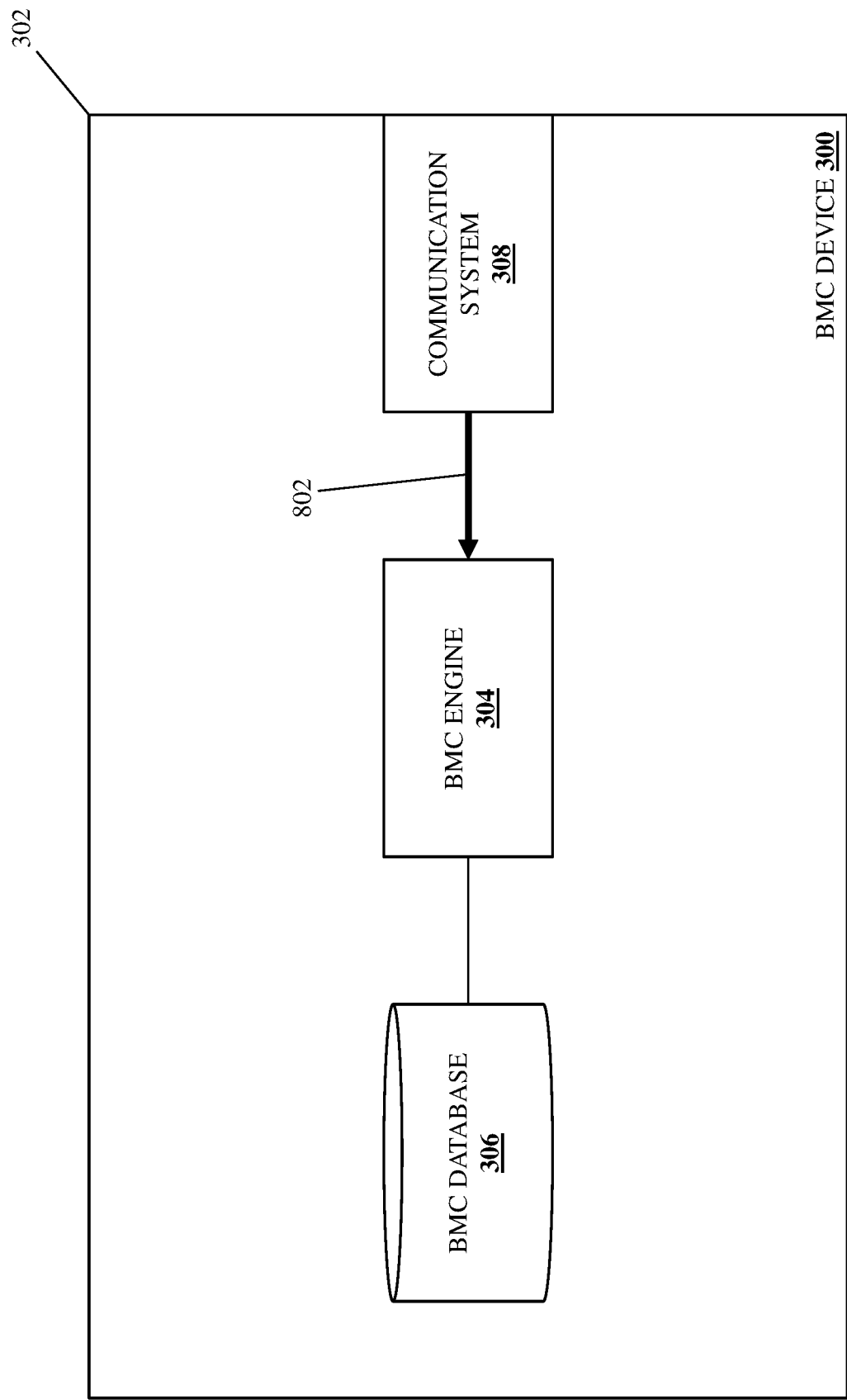

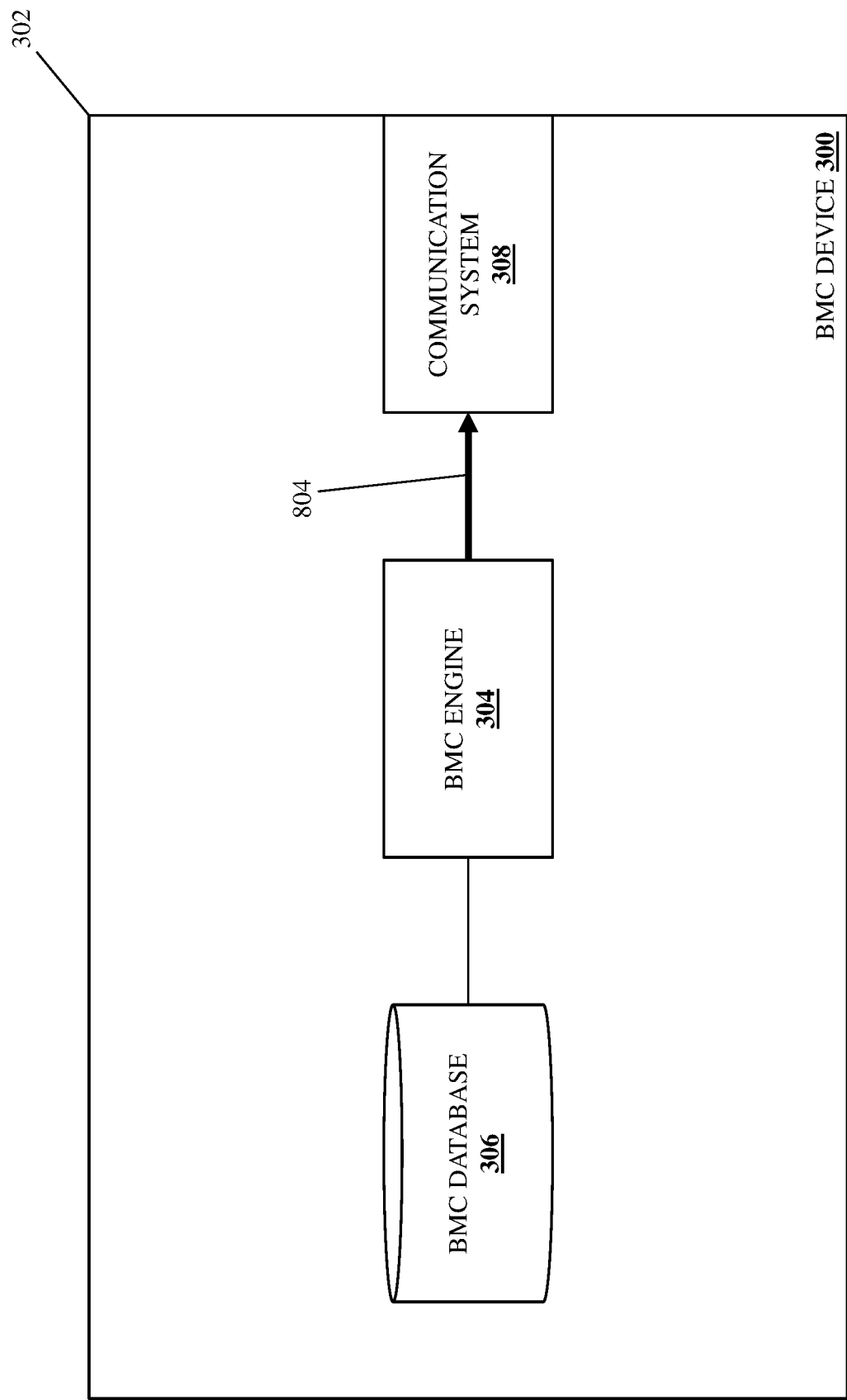

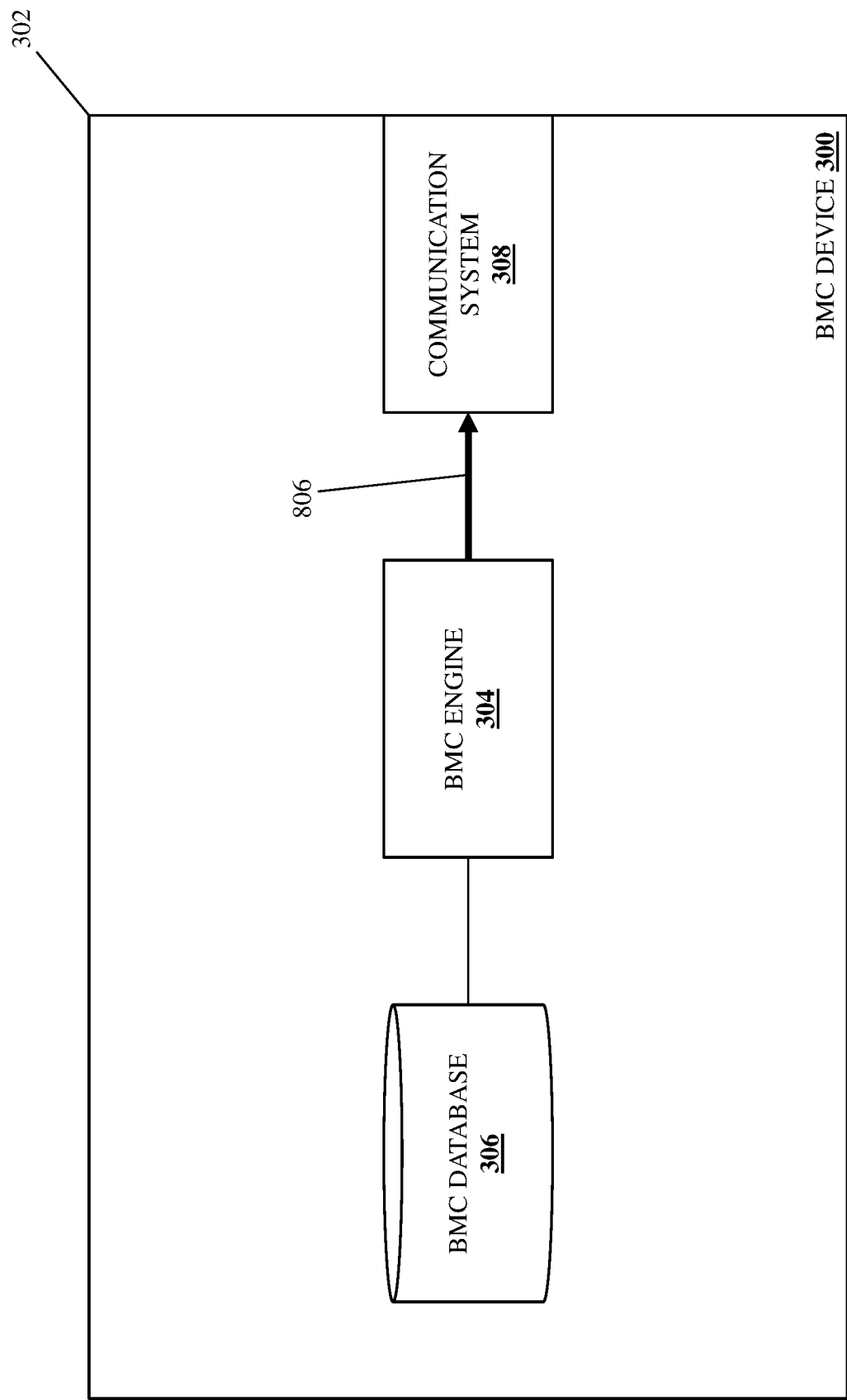

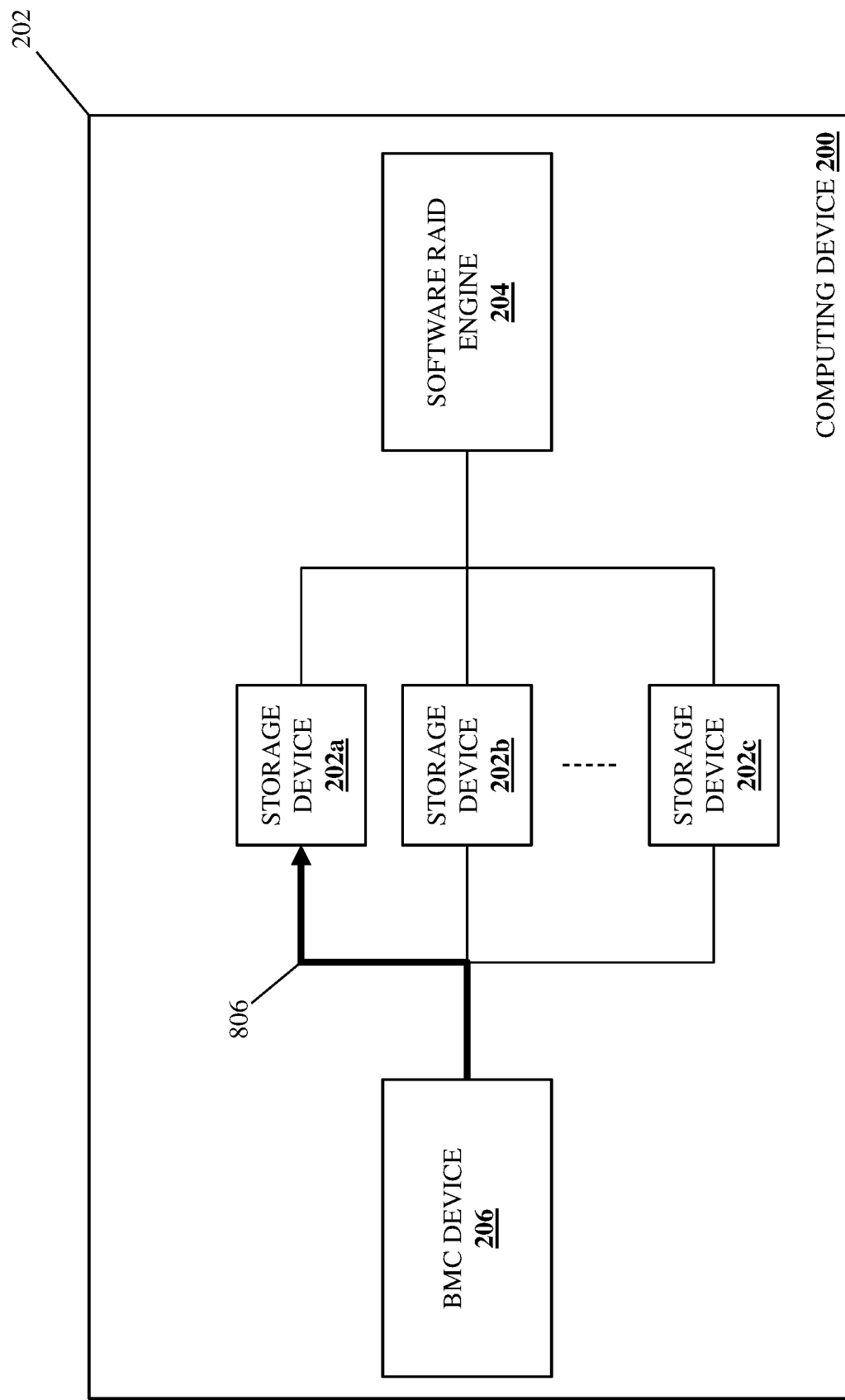

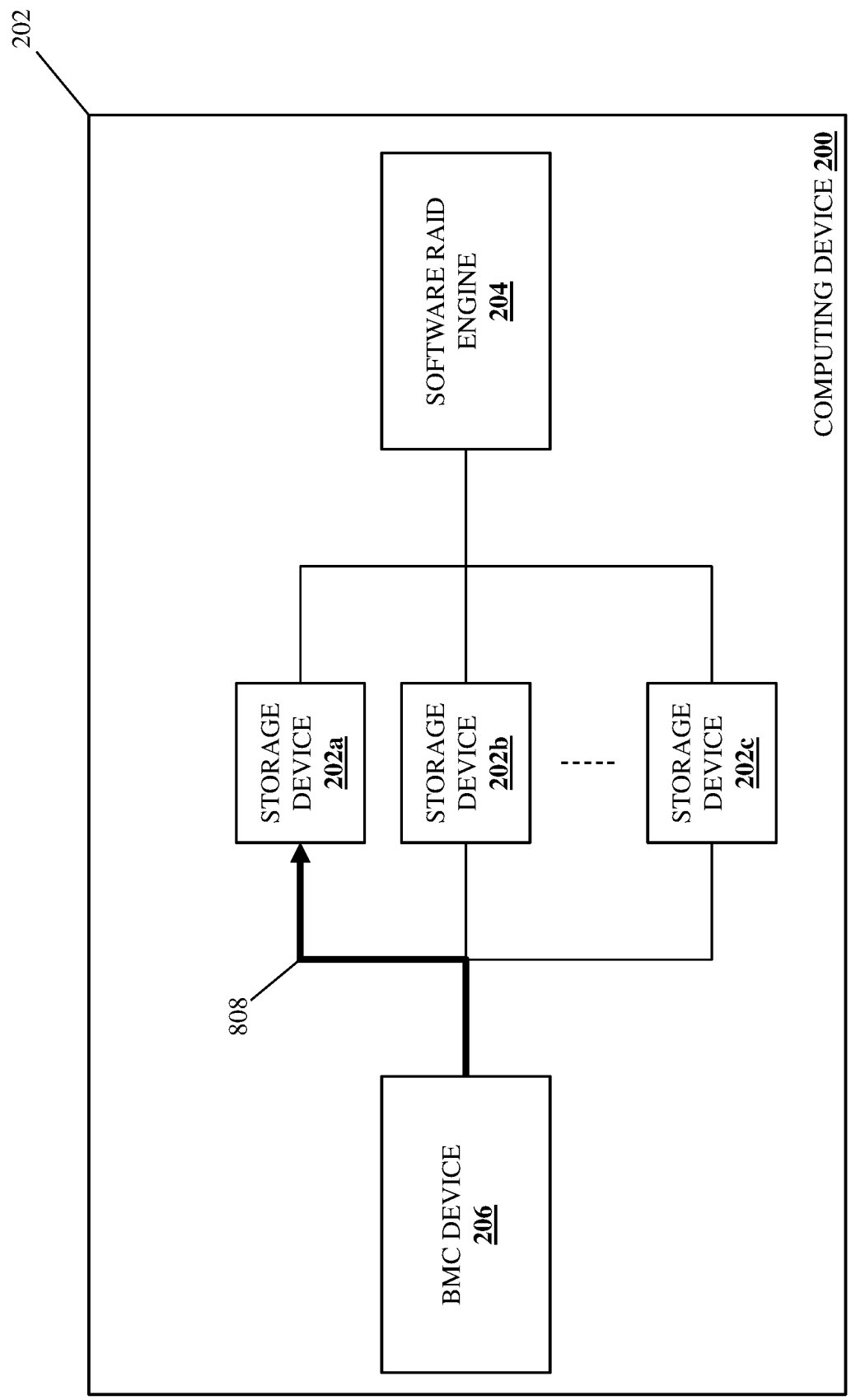

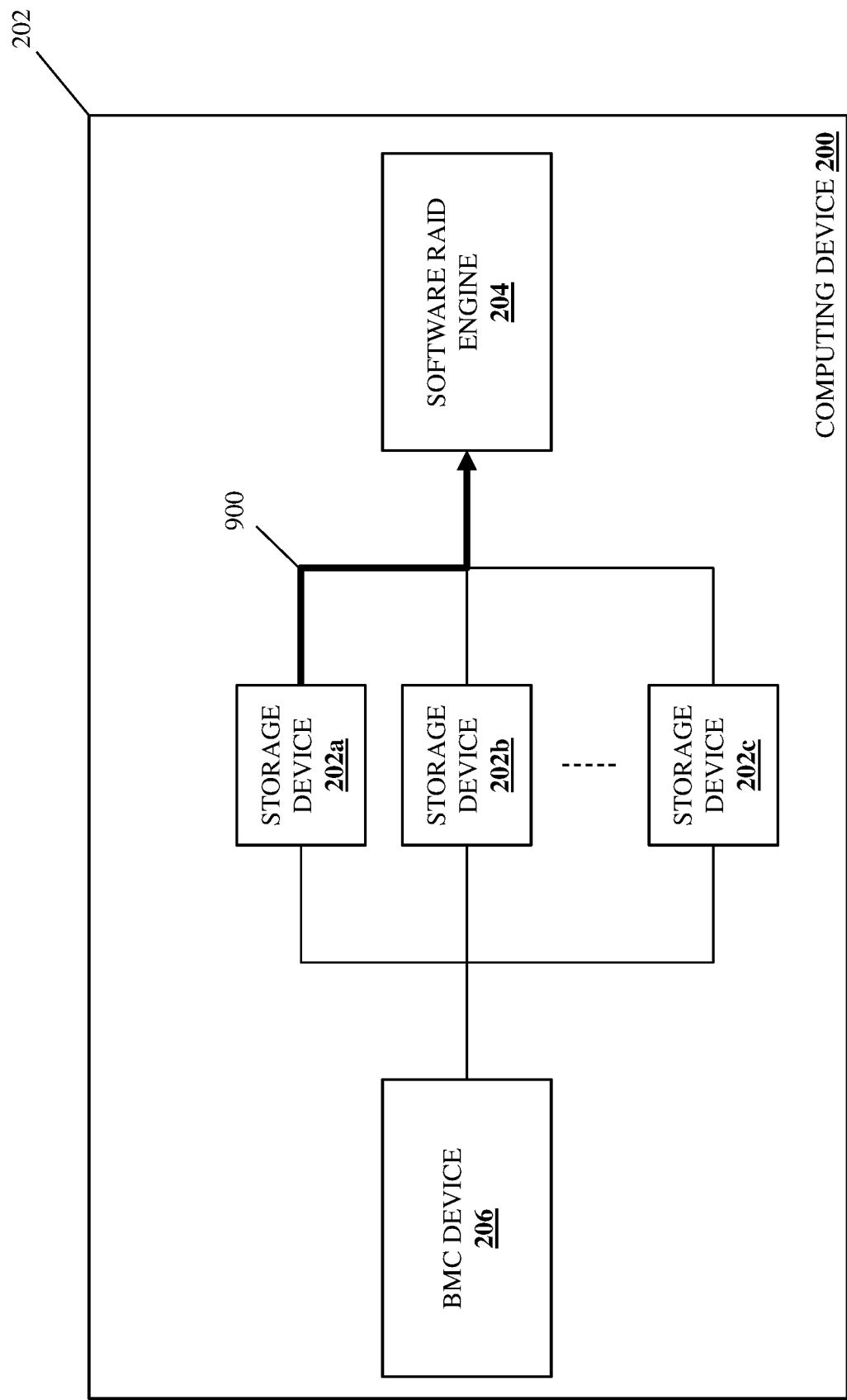

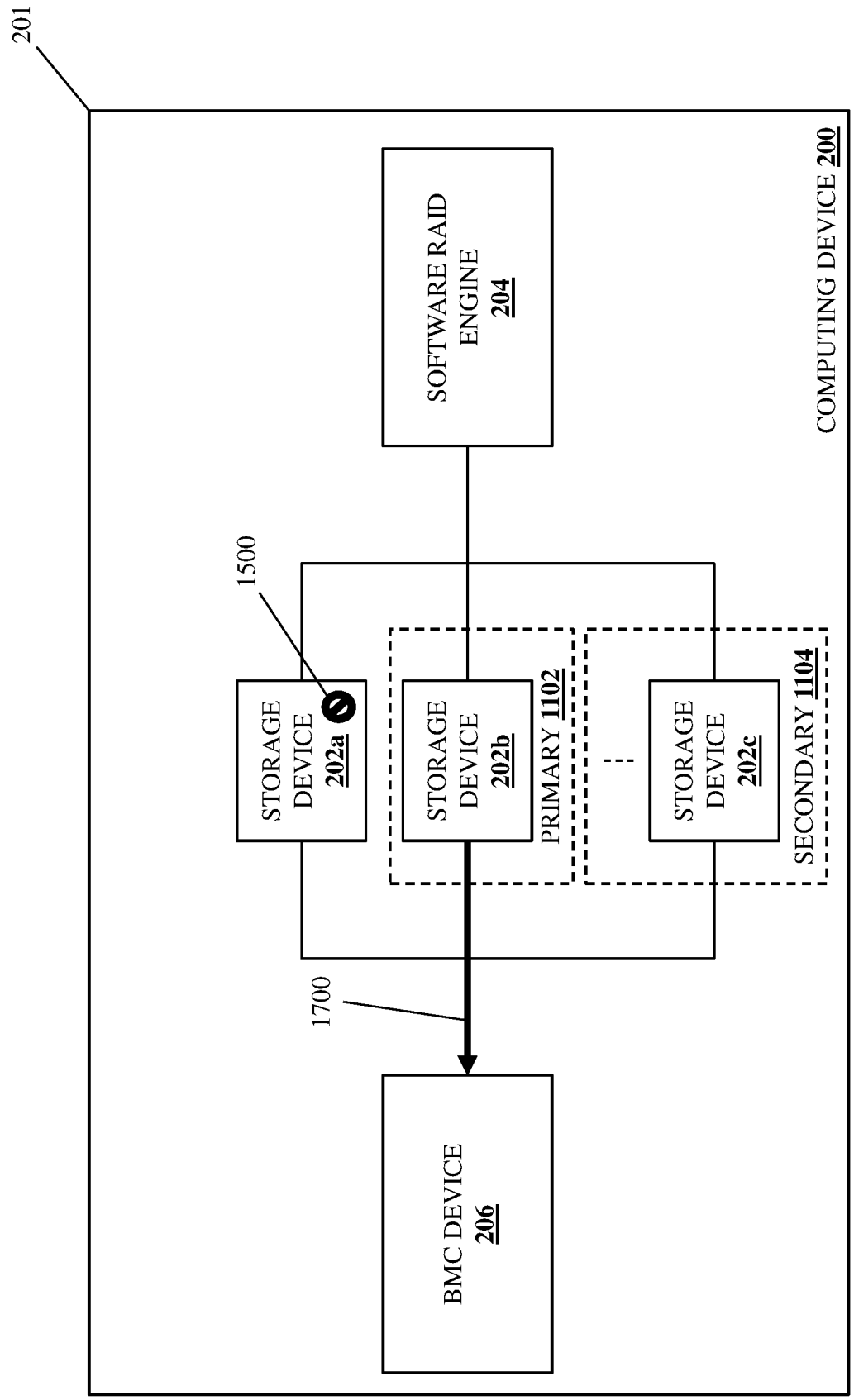

RESILIENT SOFTWARE RAID/MANAGEMENT COMMUNICATION SYSTEM

CROSS-REFERENCE TO RELATED APPLICATIONS

The present application is related to the following applications: (1) U.S. patent application Ser. No. 18/228,136, filed Jul. 31, 2023; (2) U.S. patent application Ser. No. 18/228,374, filed Jul. 31, 2023; (3) U.S. patent application Ser. No. 18/228,538, filed Jul. 31, 2023; (4) U.S. patent application Ser. No. 18/229,360, filed Aug. 2, 2023; and (5) U.S. patent application Ser. No. 18/446,692, filed Aug. 9, 2023.

BACKGROUND

The present disclosure relates generally to information handling systems, and more particularly to providing resilient communication channels between a software Redundant Array of Independent Disk (RAID) subsystem and a management subsystem in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes include a management subsystem such as a Baseboard Management Controller (BMC) device (e.g., an integrated DELL® Remote Access Controller (iDRAC) device included in server devices provided by DELL® Inc. of Round Rock, Texas, United States) and/or other management subsystems known in the art. Furthermore, server devices are sometimes configured to provide a software Redundant Array of Independent Disk (RAID) subsystem (e.g., including a MICROSOFT® software RAID miniport driver available from MICROSOFT® Corp. of Redmond, Washington, United States; an ESXi® software RAID driver available from VMWARE® Inc. of Palo Alto, California, United States; an open-source LINUX® software RAID driver; etc.) that may be configured to utilize hardware resources in the server device (e.g., a processing system such as a Central Processing Unit (CPU) in the server device) in order to provide data storage virtualization technology and perform any of a variety of RAID operations that combine physical storage device(s) into logical storage device(s) for the purposes of data redundancy, perform improvements, and/or other RAID services that would be apparent to one of skill in the art. However, the conventional provisioning of software RAID subsystems in server devices with management systems suffers from several deficiencies.

For example, conventional software RAID subsystems and management subsystems in server devices are relatively limited in their communications. To provide a specific example, the software RAID subsystem and the management subsystem in a server device may benefit from the sharing of relatively critical real-time data such as virtual disk state changes, software RAID critical logs, software RAID initialization failures (e.g., during initialization/boot of the server device, during storage device hot plug operations, etc.), and/or other critical data known in the art, and conventional server devices do not enable the communication of such relatively critical real-time data between the software RAID subsystem and the management subsystem. As such, conventional server devices do not provide any option for a software RAID subsystem to provide software RAID subsystem logs, software RAID subsystem data, Input/Output (I/O) failures, hot-plug information, and/or other software RAID subsystem information in real-time to the management subsystem in its server device.

To provide another specific example, the software RAID subsystem may require information about storage devices that are coupled to the software RAID subsystem via a server backplane. While a System Management Basic Input/Output System (BIOS) (SMBIOS) may be used to read management information available via the BIOS in the server device such as storage device slot-related information (e.g., storage device form factor information, storage device slot length information, etc.) and/or other SMBIOS management information known in the art, the SMBIOS does not make that SMBIOS management information available in real-time, and does not make available a variety of information that would benefit the operation of the software RAID subsystem.

Furthermore, the SMBIOS is implemented according to the SMBIOS specification, and thus any changes/updates to the SMBIOS required to make further information available to the software RAID subsystem will require the relatively long time periods needed for SMBIOS specification change approval and implementation, BIOS implementation, and/or other implementation issues that would be apparent to one of skill in the art, and will then subsequently be dependent on any BIOS updates/releases. Similarly, the Intelligent Platform Management Interface (IPMI) may be used to perform management and monitoring independently of the CPU, BIOS, and operating system in the server device in order to obtain information similar to the SMBIOS management information discussed above, but suffers from similar deficiencies in that that IPMI management information is not made available in real-time, and does not make available a variety of information (e.g., Enterprise and Data Center Standard Form Factor (EDSFF) information) that would benefit the operation of the software RAID subsystem.

The inventors of the present disclosure have developed a software RAID/management communication system that allows software RAID subsystems and the management subsystems in a computing device to utilize a storage device memory subsystem in a storage device in that computing device in order to transmit communications between each other, and that software RAID/management communication system is described in U.S. patent application Ser. No. 18/228,136, filed Jul. 31, 2023, the disclosure of which is incorporated herein by reference in its entirety. However, the inventors of the present disclosure have recognized that the utilization of the storage device memory subsystem in a single storage device for communications between a software RAID subsystem and a management subsystem in a computing device renders that storage device as a single point of failure. For example, that storage device may be removed (e.g., "hot removed") from the computing device, may fail, may enter a recovery mode, and/or otherwise may become unavailable, which one of skill in the art in possession of the present disclosure will recognize will prevent the corresponding communications between the software RAID subsystem and the management subsystem via the software RAID/management communication system.

Accordingly, it would be desirable to provide a resilient software RAID/management communication system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a software Redundant Array of Independent Disk (RAID) engine that is configured to: designate a first storage device in a plurality of storage devices that are coupled to the processing system as a primary storage device, and a second storage device in the plurality of storage devices as a secondary storage device; transmit, using a respective storage device memory subsystem in the first storage device, first management communications with a management subsystem; determine that the first storage device is unavailable; and transmit, in response to determining that the first storage device is unavailable and using a respective storage device memory subsystem in the second storage device, second management communications with the management subsystem.

BRIEF DESCRIPTION OF THE DRAWINGS

FIG. 5A is a flow chart illustrating an embodiment of a portion of a method for providing communication between a software RAID subsystem and a management subsystem in a computing device.

FIG. 7C is a schematic view illustrating an embodiment of the operation of the computing device of FIG. 2 during the method of FIGS. 5A and 5B.

FIG. 7D is a schematic view illustrating an embodiment of the operation of the storage device of FIG. 4 during the method of FIGS. 5A and 5B.

FIG. 8A is a schematic view illustrating an embodiment of the operation of the management subsystem of FIG. 3 during the method of FIGS. 5A and 5B.

FIG. 8D is a schematic view illustrating an embodiment of the operation of the management subsystem of FIG. 3 during the method of FIGS. 5A and 5B.

FIG. 8G is a schematic view illustrating an embodiment of the operation of the management subsystem of FIG. 3 during the method of FIGS. 5A and 5B.

FIG. 8J is a schematic view illustrating an embodiment of the operation of the management subsystem of FIG. 3 during the method of FIGS. 5A and 5B.

FIG. 8K is a schematic view illustrating an embodiment of the operation of the computing device of FIG. 2 during the method of FIGS. 5A and 5B.

FIG. 8N is a schematic view illustrating an embodiment of the operation of the computing device of FIG. 2 during the method of FIGS. 5A and 5B.

FIG. 9A is a schematic view illustrating an embodiment of the operation of the computing device of FIG. 2 during the method of FIGS. 5A and 5B.

FIG. 17B is a schematic view illustrating an embodiment of the operation of the computing device of FIG. 2 during the method of FIG. 10.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
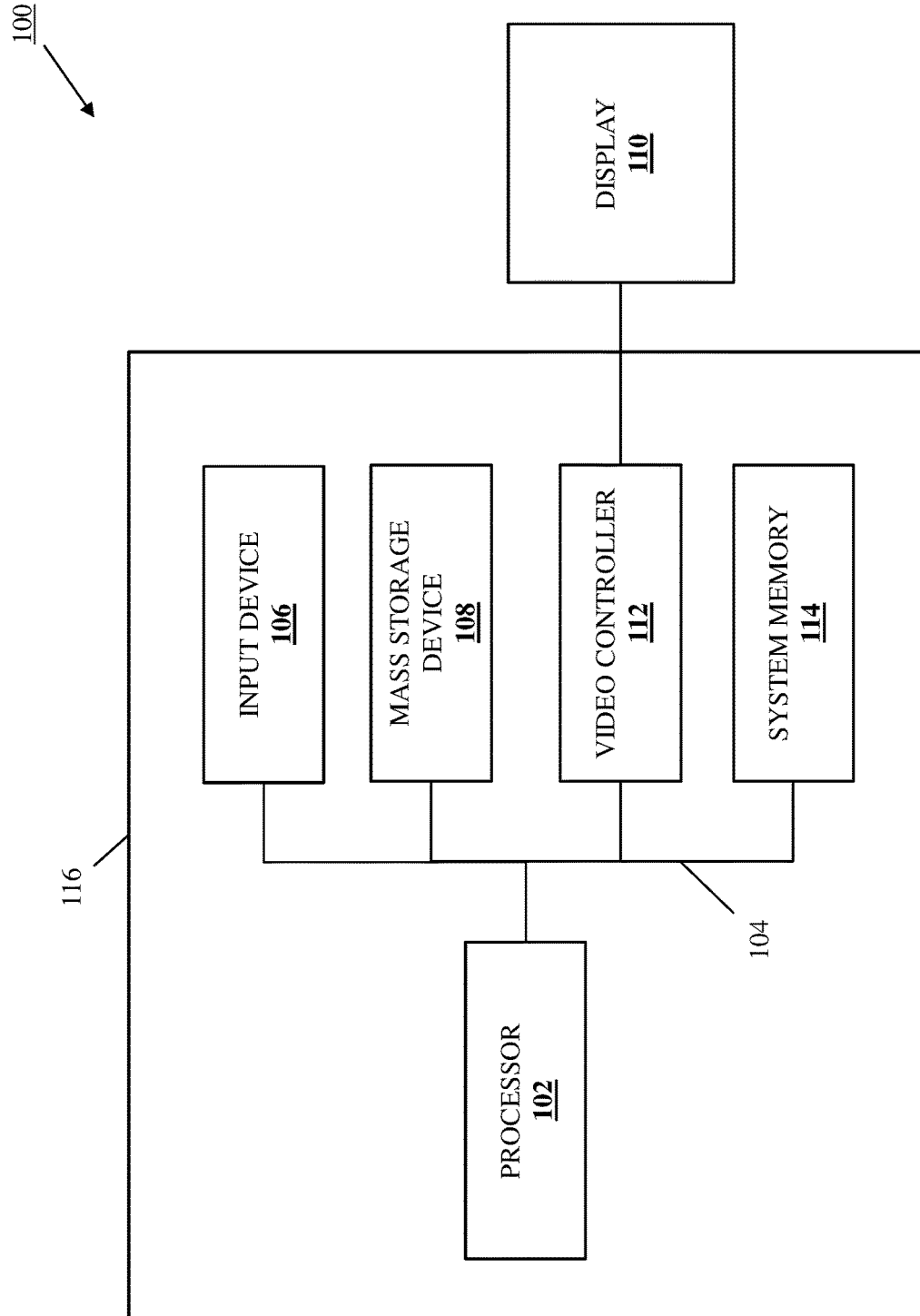
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
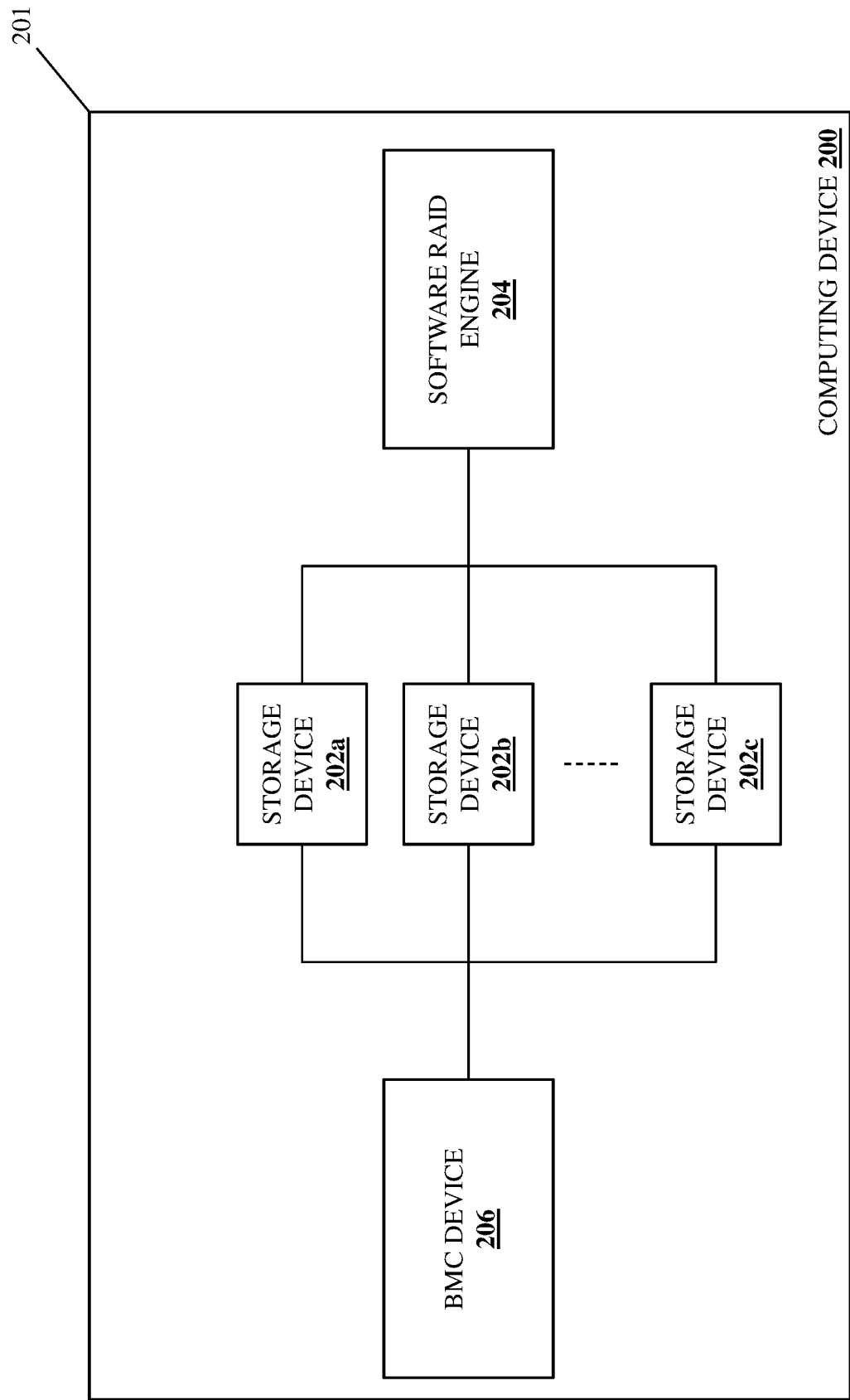
FIG. 2 is a schematic view illustrating an embodiment of a computing device that may provide the software RAID/management communication system of the present disclosure.

Referring now to FIG. 2, an embodiment of a computing device 200 is illustrated that may provide the software RAID/management communication system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 201 that houses the components of the computing device 200, only some of which are illustrated and described below.

In the embodiments illustrated and described below, the chassis 201 houses a plurality of storage devices 202a, 202b, and up to 202c. However, while a plurality of storage devices 202a-202c are illustrated and described, one of skill in the art in possession of the present disclosure will appreciate how embodiments in which a single storage device is provided in the computing device 200 will fall within the scope of the present disclosure as well. In a specific example, the storage devices 202a-202c may be provided by Non-Volatile Memory express (NVMe) storage devices, although one of skill in the art in possession of the present disclosure will appreciate how other types of storage devices (and/or other types of devices with memory subsystem similar to the storage device memory subsystems described below) may allow for the software RAID/management communication functionality described below, and thus will fall within the scope of the present disclosure as well.

The chassis 201 may also house a processing system (not illustrated, but which may include the processor 102 (e.g., a Central Processing Unit (CPU)) discussed above with reference to FIG. 1) and a memory system (not illustrated, but which may include the memory 114 (e.g., Dynamic Random Access Memory (DRAM)) discussed above with reference to FIG. 1) that is coupled to the processing system and that includes instructions that, when executed by the processing system, cause the processing system to provide a software RAID engine 204 that is configured to perform the functionality of the software RAID engines, software RAID subsystems, and/or computing devices discussed below. As illustrated, the software RAID engine 204 is coupled to each of the storage devices 202a-202c (e.g., via a coupling between the processing system and the storage devices 202a-202c).

To provide a specific example, the software RAID engine 204 may be provided by dedicated hardware in the computing device 200 (e.g., a software RAID processing system and software RAID memory system) and may be configured to provide data storage virtualization technology and perform any of a variety of RAID operations that combine physical storage device(s) (e.g., the storage devices 202a-202c) into logical storage device(s) for the purposes of data redundancy, perform improvements, and/or other RAID services that would be apparent to one of skill in the art. However, the inventors of the present disclosure are developing a software RAID engine that may be included in an operating system provided in a computing device, and thus software RAID engines integrated into an operating system provided by a CPU and DRAM in the computing device 200 are envisioned as falling within the scope of the present disclosure as well. However, while a specific software RAID engine and software RAID functionality has been described, one of skill in the art in possession of the present disclosure will appreciate how the software RAID engine of the present disclosure may be provided in a variety of manners to perform a variety of software RAID functionality while remaining within the scope of the present disclosure as well.

The chassis 201 may also house a management subsystem that, in the illustrated embodiment, is provided by a Baseboard Management Controller (BMC) device 206 such as, for example, an integrated DELL® Remote Access Controller (iDRAC) device that is included in server devices available from DELL® Inc. of Round Rock, Texas, United States, and that is configured to provide an out-of-band management platform that utilizes resources that are primarily separate from the resources of the server device, and may provide a browser-based interface and/or Command Line Interface (CLI) for managing and monitoring hardware in the server device. As illustrated, the BMC device 206 is coupled to each of the storage devices 202a-202c. However, while a specific management subsystem is illustrated and described, one of skill in the art in possession of the present disclosure will appreciate how other management subsystems will fall within the scope of the present disclosure as well. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the software RAID/management communication functionality discussed below, while remaining within the scope of the present disclosure as well.

Figure 3:
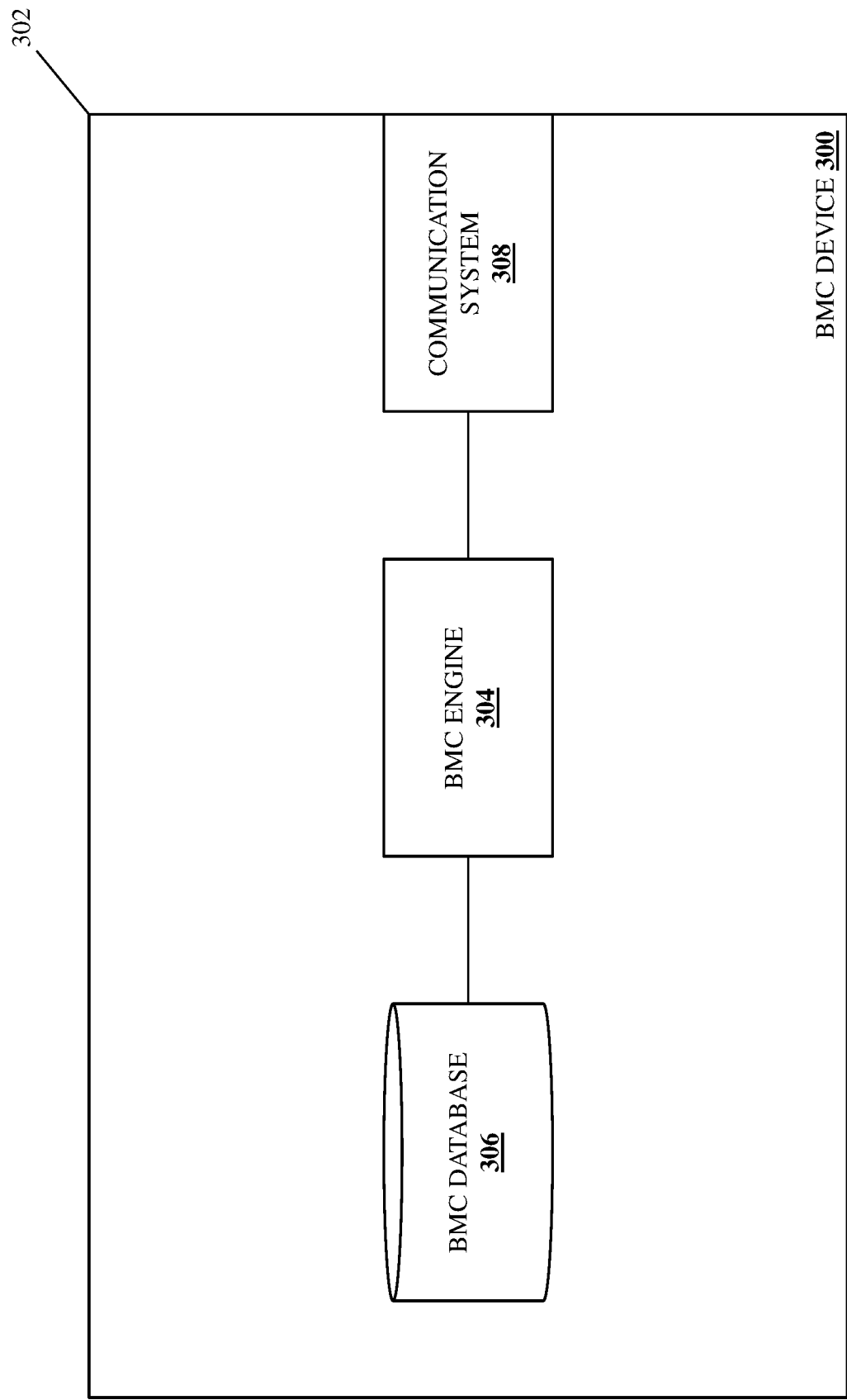
FIG. 3 is a schematic view illustrating an embodiment of a management subsystem that may be included in the computing device of FIG. 2.

Referring now to FIG. 3, an embodiment of a Baseboard Management Controller (BMC) device 300 is illustrated that may provide the BMC device 206 discussed above with reference to FIG. 2. As such, the BMC device 300 may be provided by the IHS 100 discussed above with reference to FIG. 1 and/or may include some or all of the components of the IHS 100, and in specific example, may be provided by the iDRAC device described above. Furthermore, while illustrated and discussed as being provided by a BMC device/iDRAC device, one of skill in the art in possession of the present disclosure will recognize that the functionality of the BMC device 300 discussed below may be provided by other management subsystems that are configured to operate similarly as the BMC device 300 discussed below. In the illustrated embodiment, the BMC device 300 includes a chassis 302 that supports the components of the BMC device 300, only some of which are illustrated and described below. For example, the chassis 302 may support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 304 that is configured to perform the functionality of the BMC engines, management subsystems, and/or BMC devices discussed below.

The chassis 302 may also house a storage system (not illustrated, but which may include the storage 108 discussed above with reference to FIG. 1) that is coupled to the BMC engine 304 (e.g., via a coupling between the storage system and the processing system) and that includes a BMC database 306 that is configured to store any of the information utilized by the BMC engine 304 discussed below. The chassis 302 may also house a communication system 308 that is coupled to the BMC engine 304 (e.g., via a coupling between the communication system 308 and the BMC processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific BMC device 300 has been illustrated and described, one of skill in the art in possession of the present disclosure will recognize that management subsystems (or other devices operating according to the teachings of the present disclosure in a manner similar to that described below for the BMC device 300) may include a variety of components and/or component configurations for providing conventional management device functionality, as well as the software RAID/management communication functionality discussed below, while remaining within the scope of the present disclosure as well.

Figure 4:
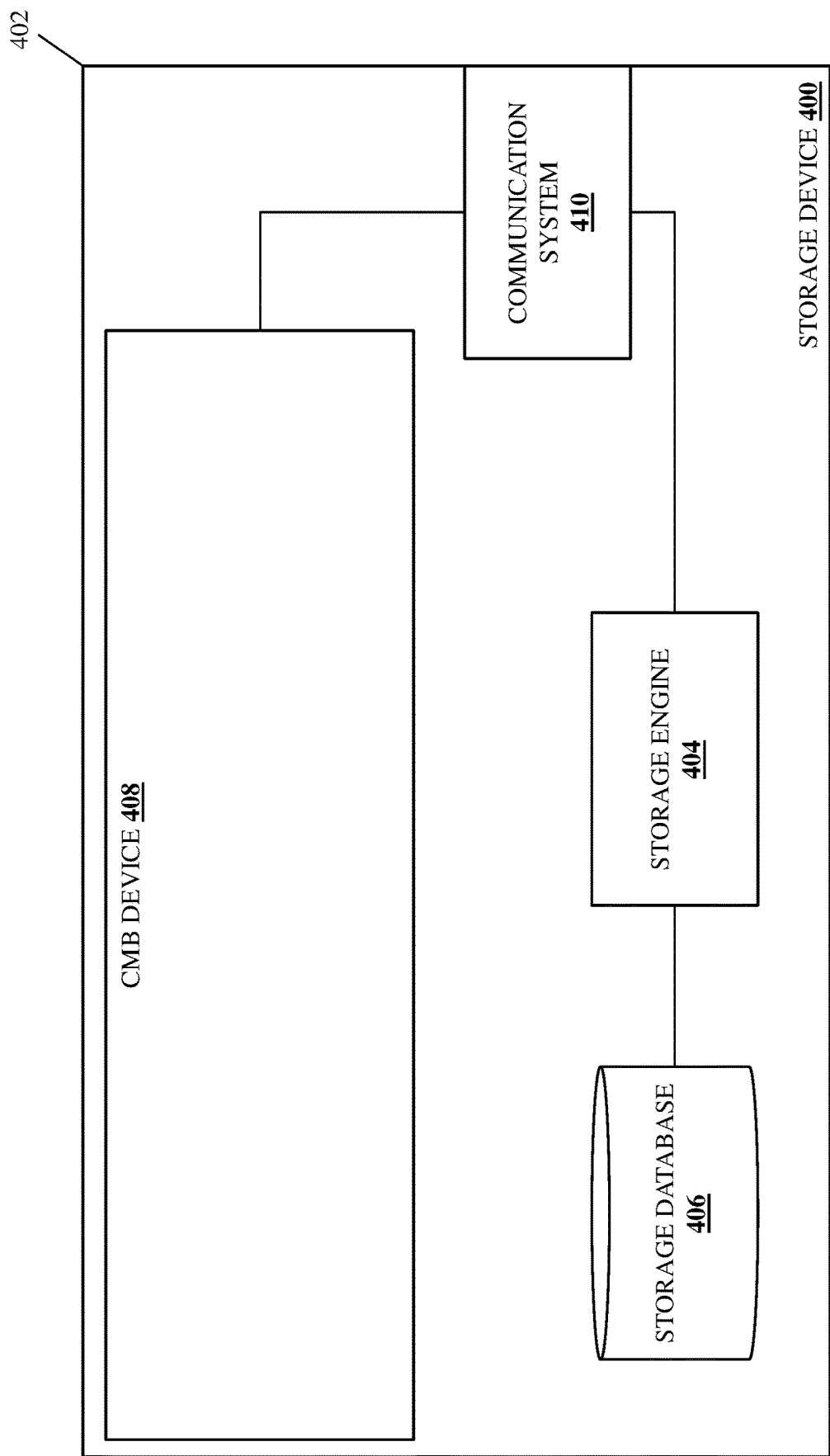
FIG. 4 is a schematic view illustrating an embodiment of a storage device may be included in the computing device of FIG. 2.

Referring now to FIG. 4, an embodiment of a storage device 400 is illustrated that may provide any or each of the storage devices 202a-202c discussed above with reference to FIG. 2. As such, the storage device 400 may be provided by an NVMe storage device in specific examples. However, while illustrated and discussed as being provided by an NVMe storage device, one of skill in the art in possession of the present disclosure will recognize that the functionality of the storage device 400 discussed below may be provided by other types of devices that are configured to operate similarly as the storage device 400 discussed below in order to allow for the software RAID/management communication functionality described below. In the illustrated embodiment, the storage device 400 includes a chassis 402 that houses the components of the storage device 400, only some of which are illustrated and described below.

For example, the chassis 402 may house a storage processing system (not illustrated, but which may be similar to the processor 102 discussed above with reference to FIG. 1 and may be included in a storage controller device) and a storage memory system (not illustrated, but which may be similar to the memory 114 discussed above with reference to FIG. 1 and may be included in a storage controller device) that is coupled to the storage processing system and that includes instructions that, when executed by the storage processing system, cause the storage processing system to provide a storage engine 404 that is configured to perform any of a variety of conventional storage functionality (e.g., NVMe storage functionality) that would be apparent to one of skill in the art in possession of the present disclosure, as well as any of the functionality of the storage engines and/or storage devices described below. The chassis 402 may also house a storage subsystem (not illustrated, but which may be similar to the storage 108 discussed above with reference to FIG. 1) that is coupled to the storage engine 404 (e.g., via a coupling between the storage subsystem and the storage processing system) and that includes a storage database 406 that is configured to store any of the information utilized by the storage engine 404 discussed below.

The chassis 402 may also house a storage device memory subsystem that, in the embodiments illustrated and described below, is provided by a Controller Memory Buffer (CMB) device 408 in an NVMe storage device that is conventionally utilized by a host in a server device to provide Input/Output (I/O) commands for the NVMe storage device in a controller memory subsystem of an NVMe controller in that NVMe storage device, to perform Direct Memory Access (DMA) operations, to store non-persistent data, and/or provide other CMB functionality known in the art, and one of skill in the art in possession of the present disclosure with appreciate how the CMB device 408 may be configured for use with general purpose memory read/write operations to provide those I/O commands. However, while illustrated and described as being provided by a CMB device, one of skill in the art in possession of the present disclosure will appreciate how other memory subsystems in other devices may be utilized to enable the software RAID/management communication functionality described below, and thus will fall within the scope of the present disclosure as well.

The chassis 402 may also house a communication system 410 that is coupled to the storage engine 404 (e.g., via a coupling between the communication system 408 and the processing system) and the CMB device 408 and that may be provided by any of a variety of storage device communication components that would be apparent to one of skill in the art in possession of the present disclosure. However, while a specific storage device 400 has been illustrated and described, one of skill in the art in possession of the present disclosure will recognize that other types of storage devices (or other types of devices operating according to the teachings of the present disclosure in a manner similar to that described below for the storage device 400) may include a variety of components and/or component configurations for providing conventional device functionality, as well as the software RAID/management communication functionality discussed below, while remaining within the scope of the present disclosure as well.

Figure 5B:
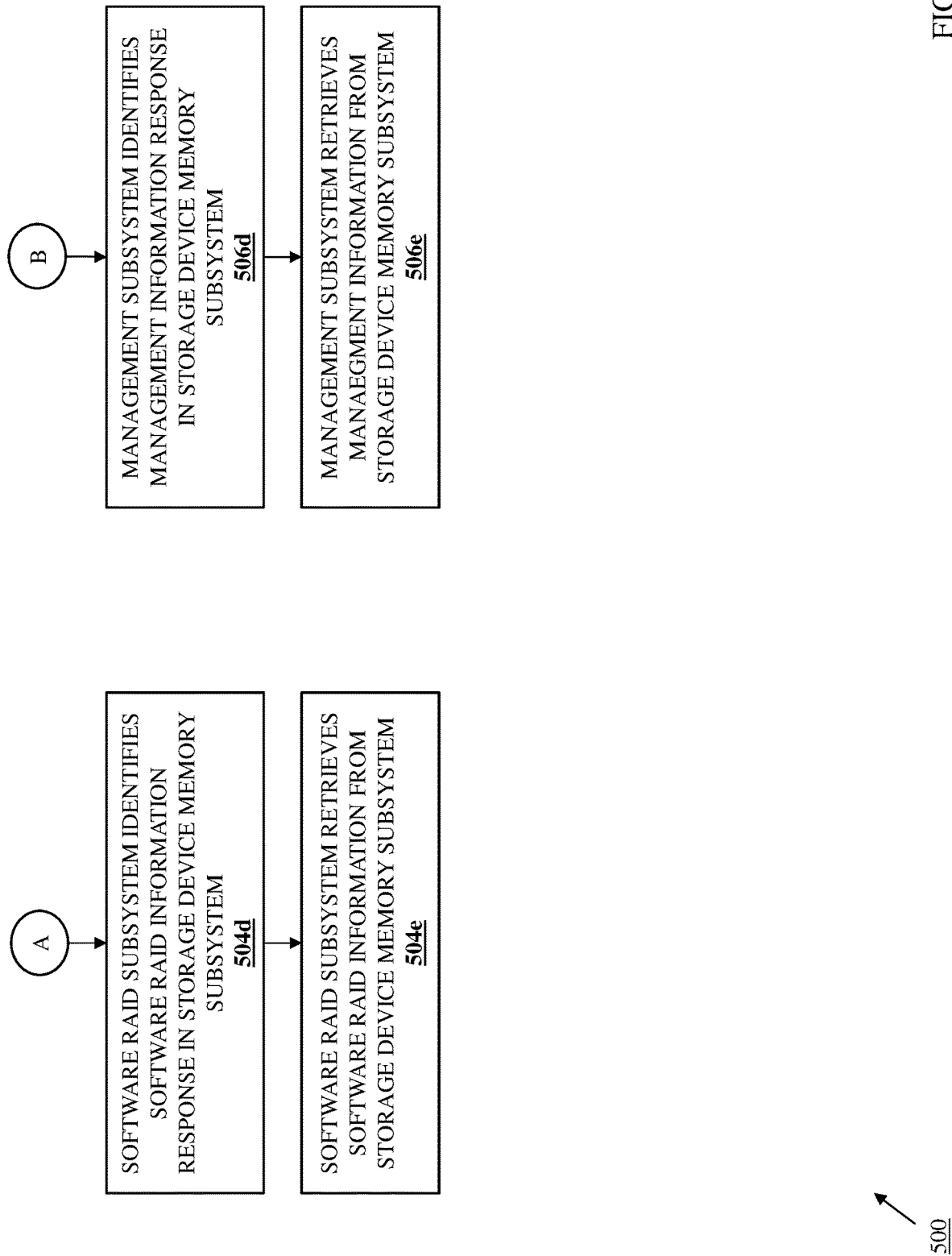
FIG. 5B is a flow chart illustrating an embodiment of a portion of a method for providing communication between a software RAID subsystem and a management subsystem in a computing device.

Referring now to FIGS. 5A and 5B, an embodiment of a method 500 for providing communication between a software Redundant Array of Independent Disk (RAID) subsystem and a management subsystem in a computing device is illustrated. As discussed below, the systems and methods of the present disclosure utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

The method 500 begins at block 502 where a software RAID subsystem configures a storage device memory subsystem for communication with a management subsystem. In an embodiment, prior to the method 500, a "software RAID/management communication" memory space in the CMB device 408 of the storage device 202a/400 may be reserved for software RAID subsystem/management subsystem communications. For example, the software RAID/management communication memory space may be mapped to a "software RAID/management communication" Base Address Register (BAR), and Controller Memory Buffer LOCation (CMBLOC) registers may store information identifying a mapped "software RAID/management communication" BAR number and "software RAID/management communication" memory space offset in the CMB device 408 of the storage device 202a/400 for the software RAID/management communication memory space. As will be appreciated by one of skill in the art in possession of the present disclosure, the software RAID/management communication BAR number and software RAID/management communication memory space offset in the CMBLOC registers may be utilized by the software RAID engine 204 and the BMC engine 304 to establish communications.

As will be appreciated by one of skill in the art in possession of the present disclosure, a storage device provider of the storage device (e.g., a storage device "vendor") may provide vendor-specific memory address areas (e.g., BAR0 and/or BAR1) that may be utilized by the manufacturer of the computing device 200 to provide the software RAID/management communication memory space in the CMB device 408 of the storage device 202a/400. However, in some examples, there may be restrictions on the use of those vendor-specific memory address areas (e.g., restrictions on PCIe read/write operations), and thus the use of other BARs to provide the software RAID/management communication memory space in the CMB device 408 of the storage device 202a/400 will fall within the scope of the present disclosure as well.

For example, as will be appreciated by one of skill in the art in possession of the present disclosure, the CMBLOC registers discussed above may store information identifying a "conventional" CMB memory space offset for a conventional CMB memory space in the CMB device 408 of the storage device 202a/400 that may be used by the storage device 202a/400 for conventional CMB operations, and the software RAID/management communication memory space of the present disclosure may be located inside the conventional CMB memory space that begins at the conventional CMB memory space offset. To provide a specific example, if the conventional CMB memory space offset is provided at a 0x100 memory address in the CMB device 408 of the storage device 202a/400 included in BAR2 (e.g., outside of the vendor-specific memory address areas BAR0 and BAR1), and if the software RAID/management communication memory space offset is 0x200 with a 0x300 size requirement for the software RAID/management communication memory space, then software RAID/management communication memory space may be provided between the 0x300 address and the 0x600 address in the CMB device 408 included in BAR2. However, while a specific example of the use of non-vendor-specific memory address areas for the software RAID/management communication memory space has been described, one of skill in the art in possession of the present disclosure will appreciate how the software RAID/management communication memory space may be provided in a variety of manners that will fall within the scope of the present disclosure as well.

In any of the embodiments discussed above, the software RAID/management communication memory space (e.g., the software RAID/management communication memory space offset and the size of the software RAID/management communication memory space) may be identified to the software RAID engine 204 and the BMC engine 304 in the BMC device 206/300 during or prior to the method 500 in order to enable use of the software RAID/management communication memory space by the software RAID engine 204 and the BMC engine 304. In addition, the software RAID/management communication memory space (e.g., the software RAID/management communication memory space offset and the size of the software RAID/management communication memory space) may be identified to a host (e.g., an operating system) in the computing device 200 to prevent use of the software RAID/management communication memory space by the host. As such, one of skill in the art in possession of the present disclosure will appreciate how the software RAID/management communication memory space in the CMB device 408 may be configured in any of a variety of manners that ensure that it is not utilized for purposes other than the software RAID/management communications described below.

Figure 6A:
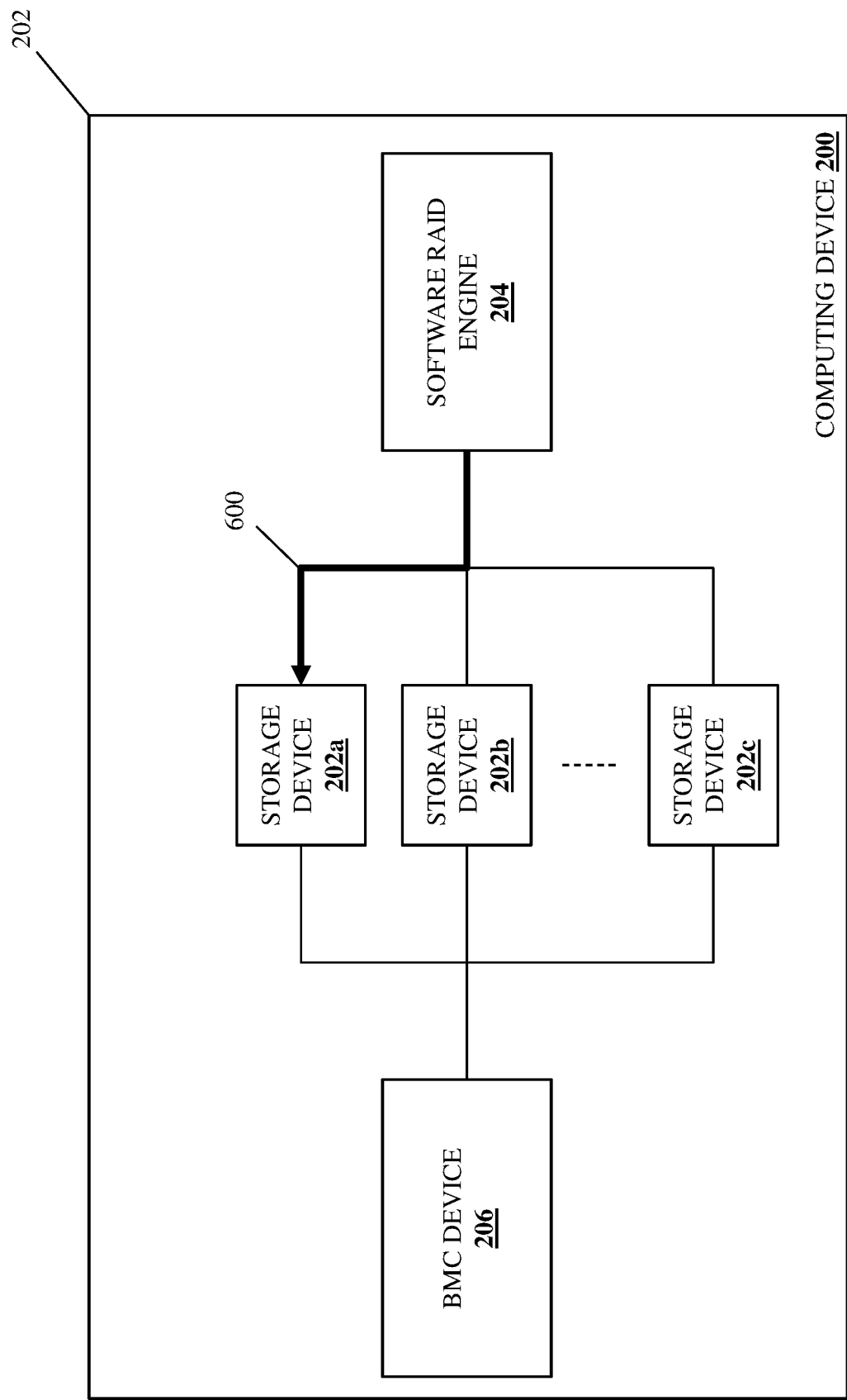
FIG. 6A is a schematic view illustrating an embodiment of the operation of the computing device of FIG. 2 during the method of FIGS. 5A and 5B.
Figure 6B:
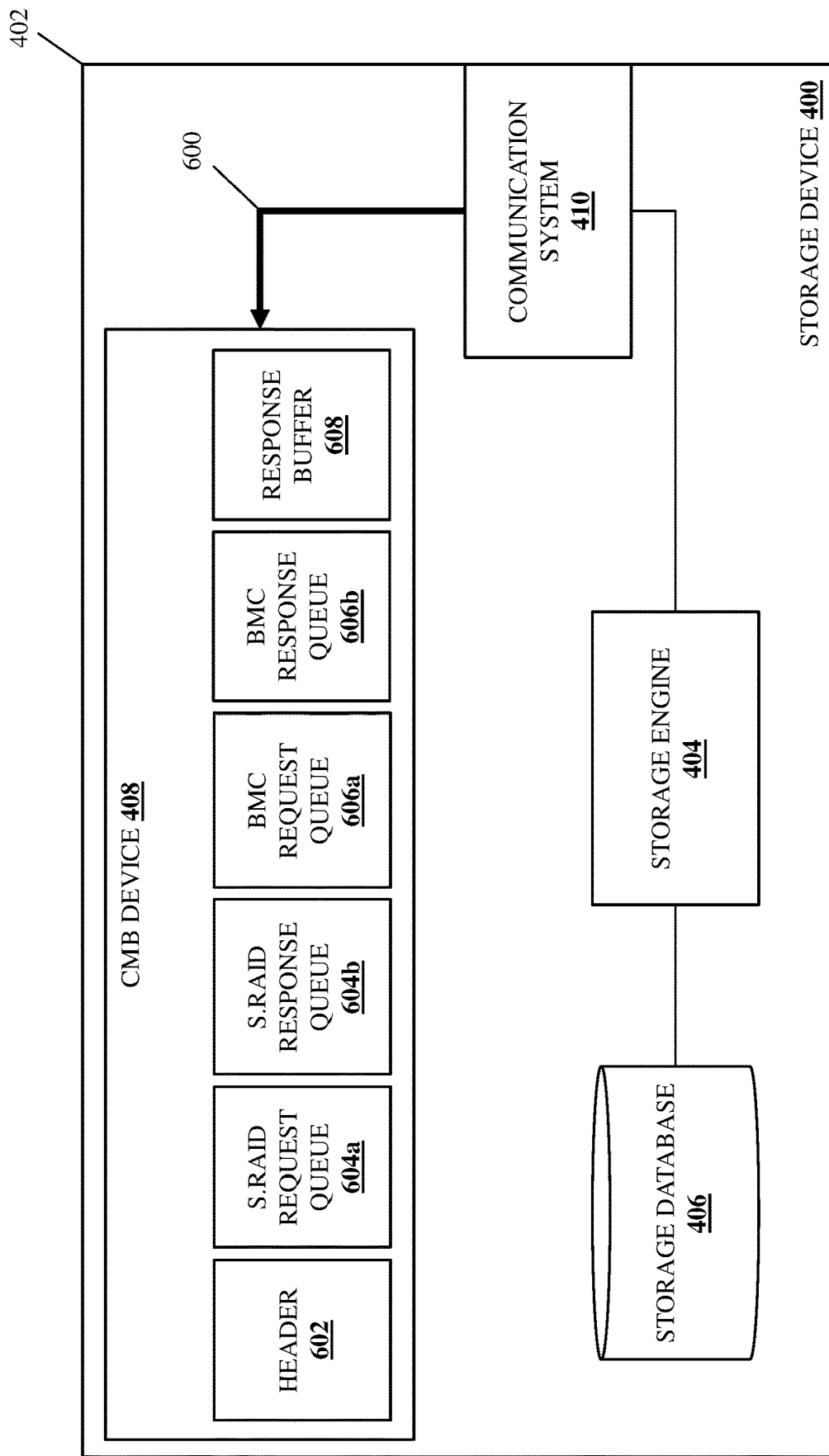
FIG. 6B is a schematic view illustrating an embodiment of the operation of the storage device of FIG. 4 during the method of FIGS. 5A and 5B.

With reference to FIGS. 6A and 6B, in an embodiment of block 502, the software RAID engine 204 in the computing device 200 may perform storage device memory subsystem configuration operations 600 that include configuring the CMB device 408 of the storage device 202a/400 (e.g., the software RAID/management communication memory space discussed above) via the communication system 410 in the storage device 202a/400 with a header 602, a software RAID request queue 604a, a software RAID response queue 604b, a BMC request queue 606a, a BMC response queue 606b, a response buffer 608, and/or any other storage device memory subsystem elements that one of skill in the art in possession of the present disclosure would recognize as providing for the functionality described below.

For example, in response to initialization of the computing device 200, the software RAID engine 204 (e.g., a software RAID driver) may load, the storage device 202a (e.g., an NVMe storage device) may initialize, the CMB device 408 in the storage device 202a/400 may be enabled, and the software RAID engine 204 may create the software RAID request queue 604a, the software RAID response queue 604b, the BMC request queue 606a, and the BMC response queue 606b in the software RAID/management communication memory space of the CMB device 408. The software RAID engine 204 may then provide and/or update the header 602 in the software RAID/management communication memory space of the CMB device 408 with queue address information (e.g., queue base addresses for the software RAID request/response queues and the BMC request/response queues discussed above), CMB device ready information (e.g., indicating that the software RAID/management communication memory space of the CMB device 408 is ready for use), authentication information (e.g., a signature, key, or other authentication information that may be authenticated by the BMC device 206/300 as discussed below), head/tail information (e.g., initially set to "0/0" as discussed below), and/or any other information that would be apparent to one of skill in the art in possession of the present disclosure.

As will be appreciated by one of skill in the art in possession of the present disclosure, the header 602 configured in the software RAID/management communication memory space of the CMB device 408 of the storage device 202a/400 may store any information that is required to use the software RAID/management communication memory space as described below, including queue numbering information, the queue address information discussed above, information about a number of queues, basic communication data, the CMB device ready information discussed above, the head/tail information discussed above, and/or any other information that one of skill in the art in possession of the present disclosure would recognize as enabling the functionality described below. However, while a specific example of a header and the data included therein that enable communications via the software RAID/management communication memory space of the CMB device 408 is provided above, one of skill in the art in possession of the present disclosure will appreciate how communications via the software RAID/management communication memory space of the CMB device 408 may be enabled in a variety of manners that will fall within the scope of the present disclosure as well.

As discussed in further detail below, in a specific example, the software RAID request queue 604a configured in the software RAID/management communication memory space of the CMB device 408 of the storage device 202*a*/400 may provide a management queue (e.g., rather than an Input/Output (I/O) queue) for the submission of software RAID information requests by the software RAID engine 204 in the computing device 200, while the software RAID response queue 604*b* configured in the software RAID/management communication memory space of the CMB device 408 may provide a management queue (e.g., rather than an I/O queue) for submission of software RAID information responses to software RAID information requests by the BMC engine 304 in the BMC device 206/300 in the computing device 200. As such, the software RAID request queue 604*a* and the software RAID response queue 604*b* may include any management queue features that one of skill in the art in possession of the present disclosure would recognize as providing for the functionality described below.

As also discussed in further detail below, in a specific example, the BMC request queue 606*a* configured in the software RAID/management communication memory space of the CMB device 408 of the storage device 202*a*/400 may provide a management queue (e.g., rather than an (I/O) queue) for the submission of management information requests by the BMC engine 304 in the BMC device 206/300 in the computing device 200, while the BMC response queue 606*b* configured in the software RAID/management communication memory space of the CMB device 408 may provide a management queue (e.g., rather than an I/O queue) for submission of management information responses to management information requests by the software RAID engine 204 in the computing device 200. As such, the BMC request queue 606*a* and the BMC response queue 606*b* may include any management queue features that one of skill in the art in possession of the present disclosure would recognize as providing for the functionality described below.

As will be appreciated by one of skill in the art in possession of the present disclosure, in response to configuring the software RAID request/response queues and the BMC request/response queues, the software RAID engine 204 may update any associated queue information in the header 602 of the CMB device 408 of the storage device 202*a*/400. However, while specific software RAID request/response queues and the BMC request/response queues are illustrated and described herein, one of skill in the art in possession of the present disclosure will appreciate how different numbers and/or configurations of the management queues described herein may be provided in the software RAID/management communication memory space of the CMB device 408 while remaining within the scope of the present disclosure as well. For example, one of skill in the art in possession of the present disclosure will appreciate how a minimum of one management queue pair may be provided to allow for the exchange of requests and responses between the software RAID engine 204 and the BMC engine 304 in the BMC device 206/300 while remaining within the scope of the present disclosure as well.

As discussed in further detail below, in a specific example, the response buffer 608 configured in the software RAID/management communication memory space of the CMB device 408 of the storage device 202*a*/400 may provide for the provisioning and retrieval of software RAID information requested by the software RAID engine 204 in the computing device 200, as well as the provisioning and retrieval of management information requested by the BMC engine 304 in the BMC device 206/300 in the computing device 200. However, while a specific example of a response buffer is provided herein, one of skill in the art in possession of the present disclosure will appreciate that the software RAID/management communication memory space of the CMB device 408 may be configured to transfer the software RAID information and/or management information described below in a variety of manners that will fall within the scope of the present disclosure as well.

In some embodiments, the software RAID engine 204 in the computing device 200 may set a register in the CMB device 408 of the storage device 202*a*/400 (e.g., by setting a CMBMSC.CRE register to "1") in order to indicate an intent to utilize the software RAID/management communication memory space of the CMB device 408 for communication with the BMC device 206/300 in the computing device 200. Furthermore, in response to providing the indication of an intent to the utilize the software RAID/management communication memory space of the CMB device 408 for communication with the BMC device 206/300 in the computing device 200, the software RAID engine 204 in the computing device 200 may populate the header 602 in the CMB device 408 (e.g., with any of the information described above) and subsequently begin periodically accessing the header 602 in the CMB device 408 to determine whether the BMC engine 304 has provided a management communication.

Figure 6C:
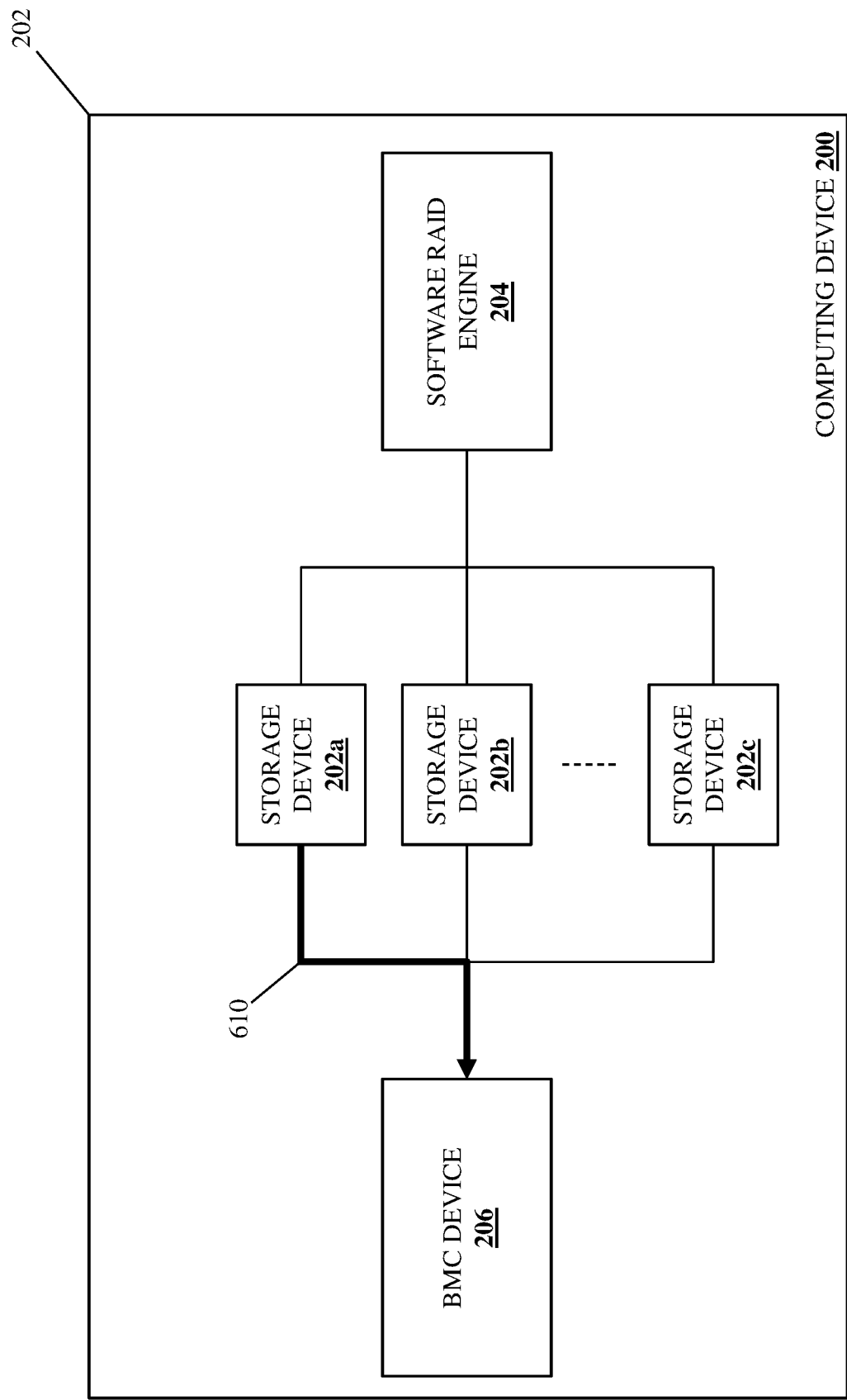
FIG. 6C is a schematic view illustrating an embodiment of the operation of the computing device of FIG. 2 during the method of FIGS. 5A and 5B.
Figure 6D:
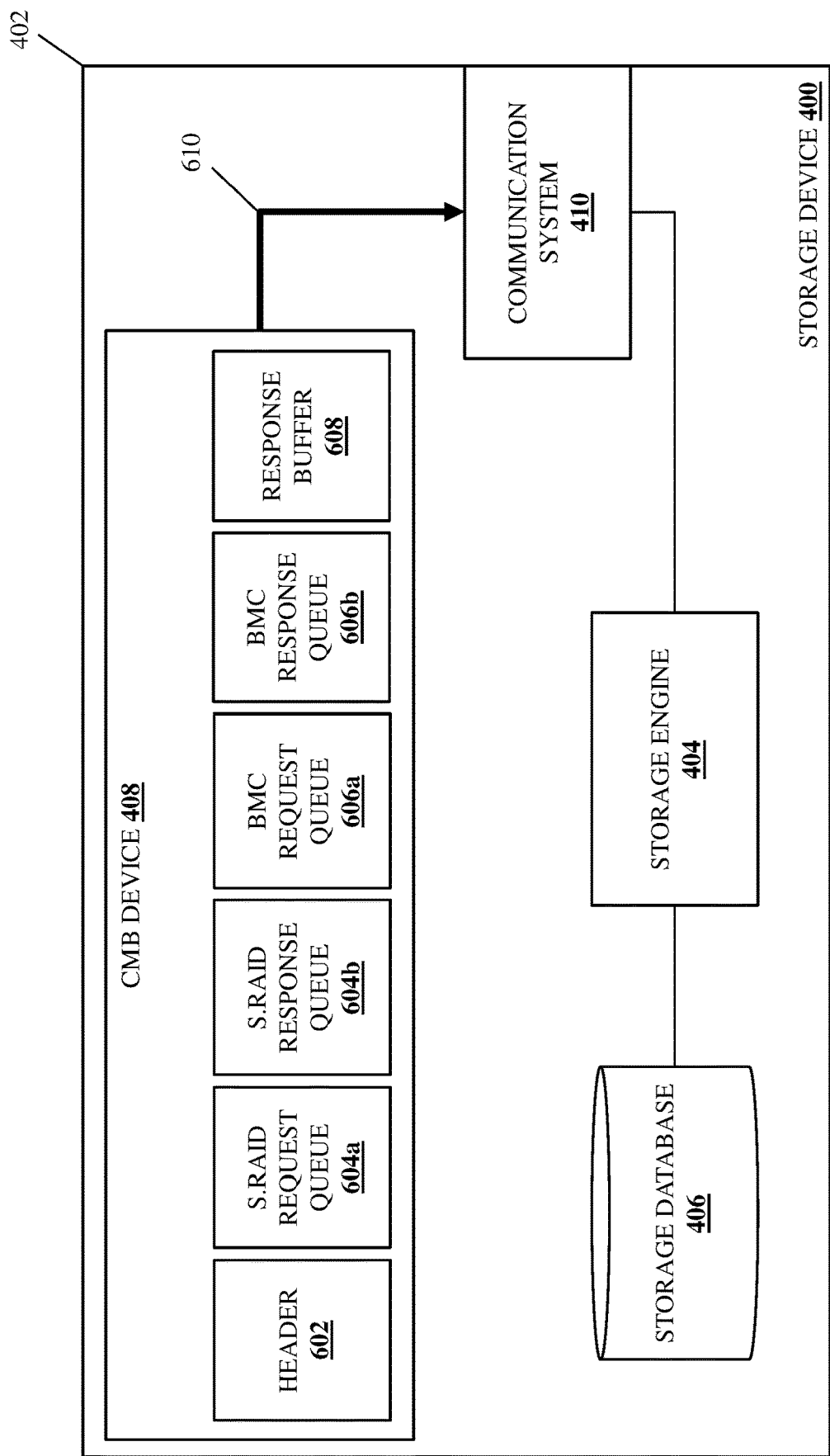
FIG. 6D is a schematic view illustrating an embodiment of the operation of the storage device of FIG. 4 during the method of FIGS. 5A and 5B.

With reference to FIGS. 6C and 6D, the BMC engine 304 in the BMC device 206/300 in the computing device 200 may perform CMB device read operations 610 that include reading any of a variety of information from the CMB device 400 via the communication system 410 in the storage device 202*a*/400. As will be appreciated by one of skill in the art in possession of the present disclosure, the CMB device read operations 610 performed by the BMC engine 304 in the BMC device 206/300 in the computing device 200 may include reading (e.g., via NVMe-Management Interface (MI)-PCIe reads) CMB registers in the CMB device 408 of the storage device 202*a*/400 in order to identify CMB support information, BAR location information, CMB offset information, CMB size information, read/write bit information, and/or other CMB information that one of skill in the art in possession of the present disclosure will recognize enables the use of the CMB device 408 by the BMC engine 304. Furthermore, the CMB device read operations 610 may allow the BMC engine 304 to determine that the register in the CMB device 408 was set by the software RAID engine 204 to indicate an intent to utilize the software RAID/management communication memory space of the CMB device 408 for communication with the BMC device 206/300, and in response the BMC engine 304 in the BMC device 206/300 may determine that it should begin periodically accessing the header 602 in the CMB device 408 (e.g., via NVMe-MI-PCIe reads) to determine whether the software RAID engine 204 has provided a software RAID communication.

In an embodiment, the CMB device read operations 610 may also include the BMC engine 304 accessing the header 602 in the software RAID/management communication memory space of the CMB device 408 to retrieve authentication information (e.g., the signature, key, or other authentication information discussed above), and using any of a variety of authentication technique to authenticate the data provided by the software RAID engine 204 in the software RAID/management communication memory space of the CMB device 408. For example, the authentication information may be provided by the software RAID engine 204 in one or more fields in the header 602 using information that is already known to the BMC engine 304, and following its authentication the BMC engine 304 may proceed with performing the remainder of the method 500. As will be appreciated by one of skill in the art in possession of the present disclosure, if the BMC engine 304 cannot authenticate information retrieved from the header 602 in the CMB device 408, the BMC engine 304 may assume that the software RAID engine 204 has not yet configured the software RAID/management communication memory space of the CMB device 408, and may periodically perform the CMB device read operations 610 until information that can be authenticated is retrieved from the header 602.

The method 500 may then proceed to decision block 504a where the method 500 proceeds depending on whether the management subsystem identifies a software RAID information request in the storage device memory subsystem, as well as to decision block 506a where the method 500 proceeds depending on whether the software RAID subsystem identifies a management information request in the storage device memory subsystem. As will be appreciated by one of skill in the art in possession of the present disclosure, blocks 504a-504e of the method 500 describe embodiments in which the software RAID subsystem may initiate communication with the management subsystem, while blocks 506a-506e of the method 500 describe embodiments in which the management subsystem may initiate communication with the software RAID subsystem, and while the software-RAID-initiated communication of blocks 504a-504e are described in detail below, the management-initiated communication of blocks 506a-506e may be performed in a substantially similar manner except for where detailed below.

Beginning with the software-RAID-initiated communication of blocks 504a-504e, in an embodiment of decision block 504a, the BMC engine 304 in the BMC device 206/300 in the computing device 200 may access the software RAID/management communication memory space in the CMB device 408 of the storage device 202a/400 to determine whether a software RAID information request was provided by the software RAID engine 204 in the CMB device 408. As discussed above, in response to determining that the software RAID engine 204 indicated an intent to utilize the software RAID/management communication memory space of the CMB device 408 for communication with the BMC device 206/300, the BMC engine 304 in the BMC device 206/300 may begin periodically accessing the header 602 in the CMB device 408 to determine whether the software RAID engine 204 has provided a software RAID information request in the software RAID request queue 604a in the CMB device 408.

In a specific example, the software RAID engine 204 may be configured to increment a "tail" portion of the head/tail information stored in the header 602 in the CMB device 408 in response to submitting a software RAID information request in the software RAID request queue 604a in the CMB device 408, and thus the BMC engine 304 may be configured to periodically access the head/tail information stored in the header 602 in the CMB device 408 to determine whether the tail portion of the head/tail information matches a "head" portion of the head/tail information in order to determine whether a software RAID information request was provided by the software RAID engine 204 in the CMB device 408. In other words, if the tail portion is greater than the head portion in the head/tail information, then the software RAID engine 204 has incremented that tail portion following the provisioning of the software RAID information request, while if the tail portion is equal to the head portion in the head/tail information, then the software RAID engine 204 has not provided a software RAID information request.

If, at decision block 504a, the management subsystem does not identify a software RAID information request in the storage device memory subsystem, the method 500 returns to decision block 504a. For example, if at decision block 504a the BMC engine 304 in the BMC device 206/300 in the computing device 200 determines that the tail portion of the head/tail information in the header 602 in the CMB device 408 is equal to the head portion of the head/tail information in the header 602 in the CMB device 408 (e.g., the head/tail information remains as initially set during block 502 at "0/0"), the BMC engine 304 will determine that the software RAID engine 204 in the computing device 200 has not submitted a software RAID information request to the software RAID request queue 604a, and the method 500 will return to decision block 504a. As such, the method 500 may loop such that the BMC engine 304 periodically accesses the header 602 in the CMB device 408 at decision block 504a as long as no software RAID information request is identified in the CMB device 408 (e.g., as long as the tail portion of the head/tail information is equal to the head portion of the head/tail information in the header 602 in the CMB device 408).

With reference now to the management-initiated communication of blocks 506a-506e, similarly as described above, the software RAID engine 204 in the computing device 200 may periodically access the software RAID/management communication memory space in the CMB device 408 of the storage device 202a/400 at decision block 506a to determine whether a management information request was provided by the BMC engine 304 in the CMB device 408. As discussed above, following the configuration of the software RAID/management communication memory space of the CMB device 408 for communication with the BMC device 206/300, the software RAID engine 204 may periodically access the header 602 in the CMB device 408 to determine whether the BMC engine 304 has provided a management information request in the BMC request queue 606a in the CMB device 408.

In a specific example, the BMC engine 304 may be configured to increment the head portion of the head/tail information stored in the header 602 in the CMB device 408 in response to submitting a management information request in the BMC request queue 606a in the CMB device 408, and thus the software RAID engine 204 may be configured to periodically access the head/tail information stored in the header 602 in the CMB device 408 to determine whether the head portion of the head/tail information matches the tail portion of the head/tail information in order to determine whether a management information request was provided by the BMC engine 304 in the CMB device 408. In other words, if the head portion is greater than the tail portion in the head/tail information, then the BMC engine 304 has incremented that head portion following the provisioning of the management information request, while if the head portion is equal to the tail portion in the head/tail information, then the BMC engine 304 has not provided a management information request.

If, at decision block 506a, the software RAID subsystem does not identify a management information request in the storage device memory subsystem, the method 500 returns to decision block 506a. For example, if at decision block 506a the software RAID engine 204 in the in the computing device 200 determines that the head portion of the head/tail information in the header 602 in the CMB device 408 is equal to the tail portion of the head/tail information in the header 602 in the CMB device 408 (e.g., the head/tail information remains as initially set during block 502 at "0/0"), the software RAID engine 204 will determine that the BMC engine 304 in the BMC device 206/300 in the computing device 200 has not submitted a management information request to the BMC request queue 606a, and the method 500 will return to decision block 506a. As such, the method 500 may loop such that the software RAID engine 204 periodically accesses the header 602 in the CMB device 408 at decision block 504a as long as no management information request is identified in the CMB device 408 (e.g., as long as the head portion of the head/tail information is equal to the tail portion of the head/tail information in the header 602 in the CMB device 408).

Figure 7A:
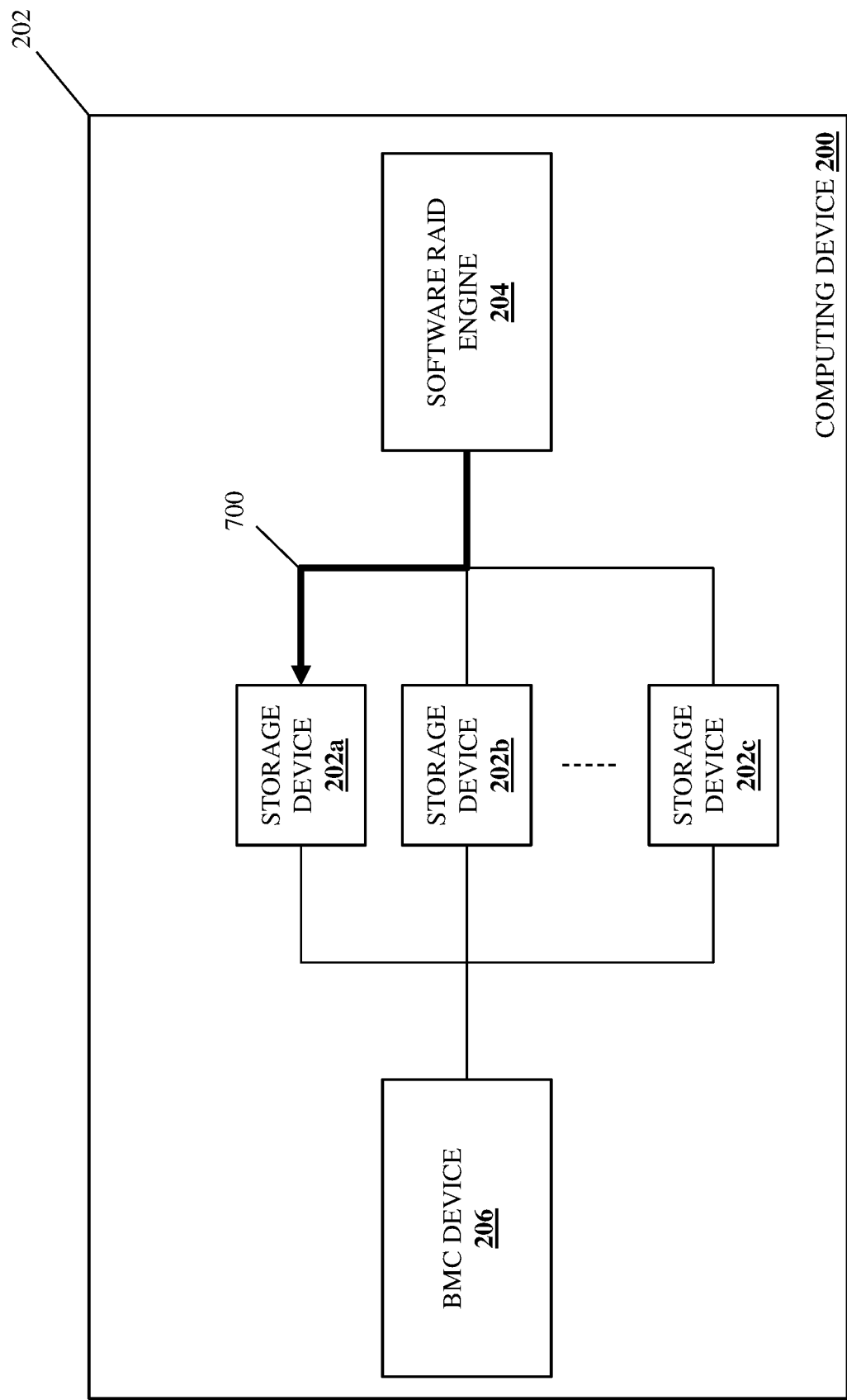
FIG. 7A is a schematic view illustrating an embodiment of the operation of the computing device of FIG. 2 during the method of FIGS. 5A and 5B.
Figure 7B:
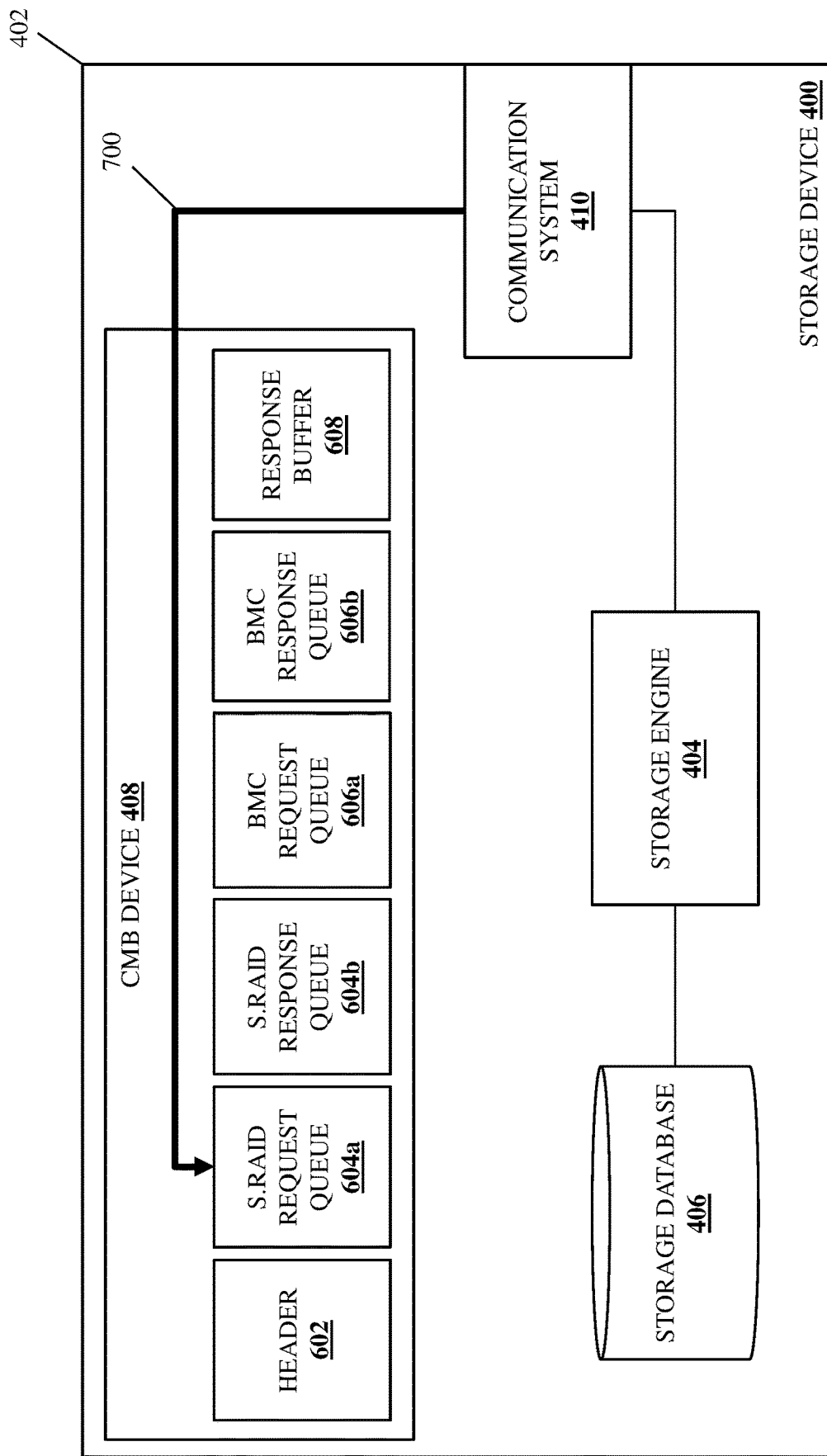
FIG. 7B is a schematic view illustrating an embodiment of the operation of the storage device of FIG. 4 during the method of FIGS. 5A and 5B.

Returning to the software-RAID-initiated communication of blocks 504a-504e, if at decision block 504a the management subsystem identifies a software RAID information request in the storage device memory subsystem, the method 500 proceeds to block 504b where the management subsystem retrieves software RAID information identified in the software RAID information request. With reference to FIGS. 7A and 7B, in an embodiment of decision block 504a, the software RAID engine 204 in the computing device 200 may perform software RAID information request submission operations 700 that include submitting a software RAID information request in the software RAID request queue 604a via the communication system 410 in the storage device 202a/400. For example, the software RAID information request may include any of a variety of formats (e.g., formats that may be defined by a vendor of the storage device 202a/400), and may request any particular software RAID information, may identify the response buffer 608 as the location where the software RAID information should be provided, and/or may include any other information that one of skill in the art in possession of the present disclosure would recognize as allowing for the functionality discussed below.

In the specific examples provided below, the software RAID information request includes a request by the software RAID engine 204 for a bay identifier (e.g., the software RAID information request may include a vendor-defined opcode for "BAYID") of a storage device (e.g., an NVMe storage device) in the computing device 200, but one of skill in the art in possession of the present disclosure will appreciate that the software RAID engine 204 may request any of a variety of software RAID information (e.g., a slot identifier ("SlotID"), a form factor, etc.) while remaining within the scope of the present disclosure as well. As will be appreciated by one of skill in the art in possession of the present disclosure, any software RAID information requests (and/or alignments) submitted at decision block 504a may conform to Management Component Transport Protocol (MCTP) standards.

Furthermore, with reference to FIGS. 7C and 7D, in an embodiment of decision block 504a, the software RAID engine 204 in the computing device 200 may perform software RAID information request header identification operations 702 that include identifying the submission of the software RAID information request in the header 602 configured in the CMB device 408 via the communication system 410 in the storage device 202a/400. Similarly as discussed above, the software RAID engine 204 may increment a tail portion of the head/tail information stored in the header 602 in the CMB device 408 (e.g., from the "0/0" as initially set during block 502 to "0/1") in response to submitting the software RAID information request in the software RAID request queue 604a in the CMB device 408 at decision block 504a.

Figure 8B:
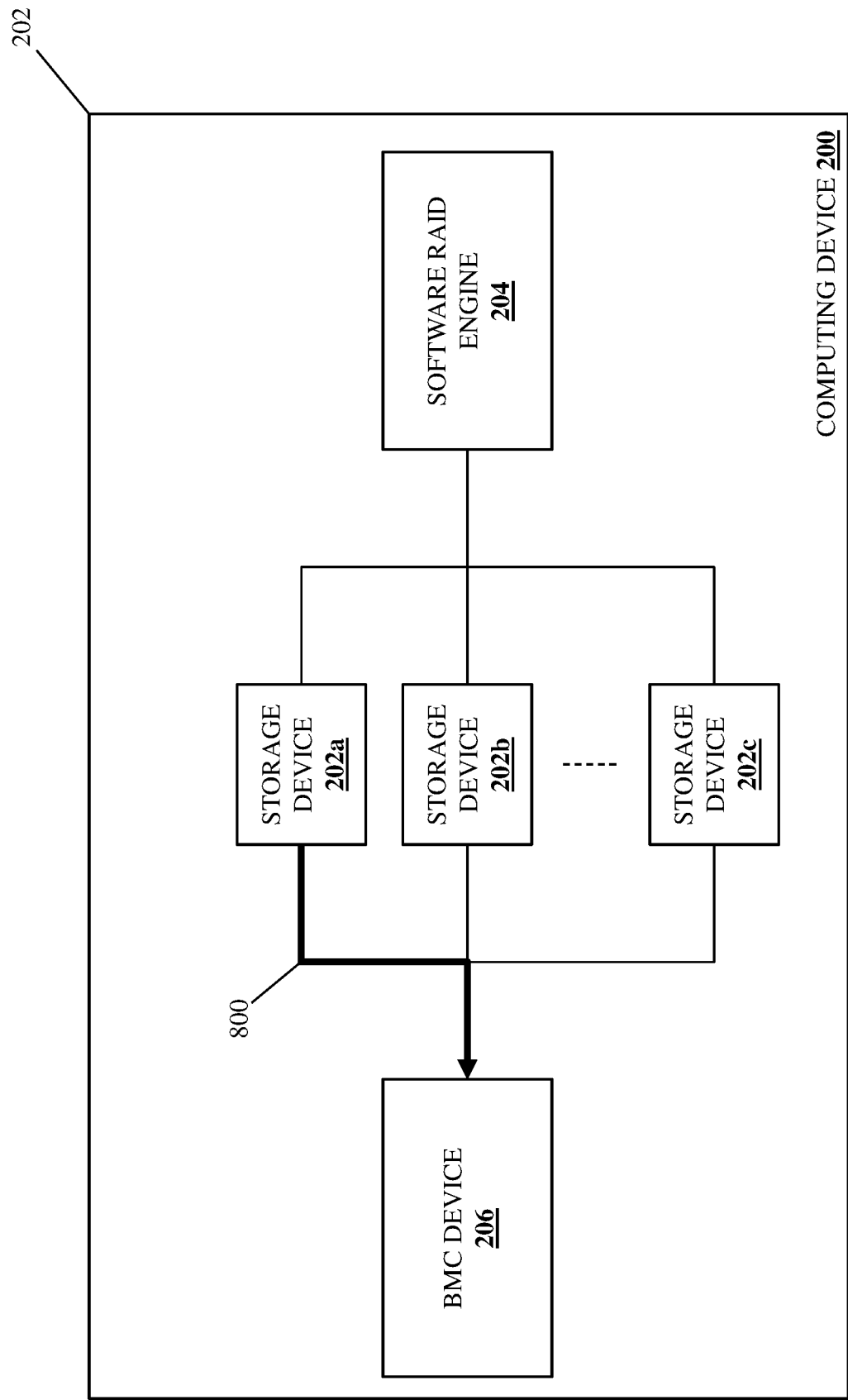
FIG. 8B is a schematic view illustrating an embodiment of the operation of the computing device of FIG. 2 during the method of FIGS. 5A and 5B.
Figure 8C:
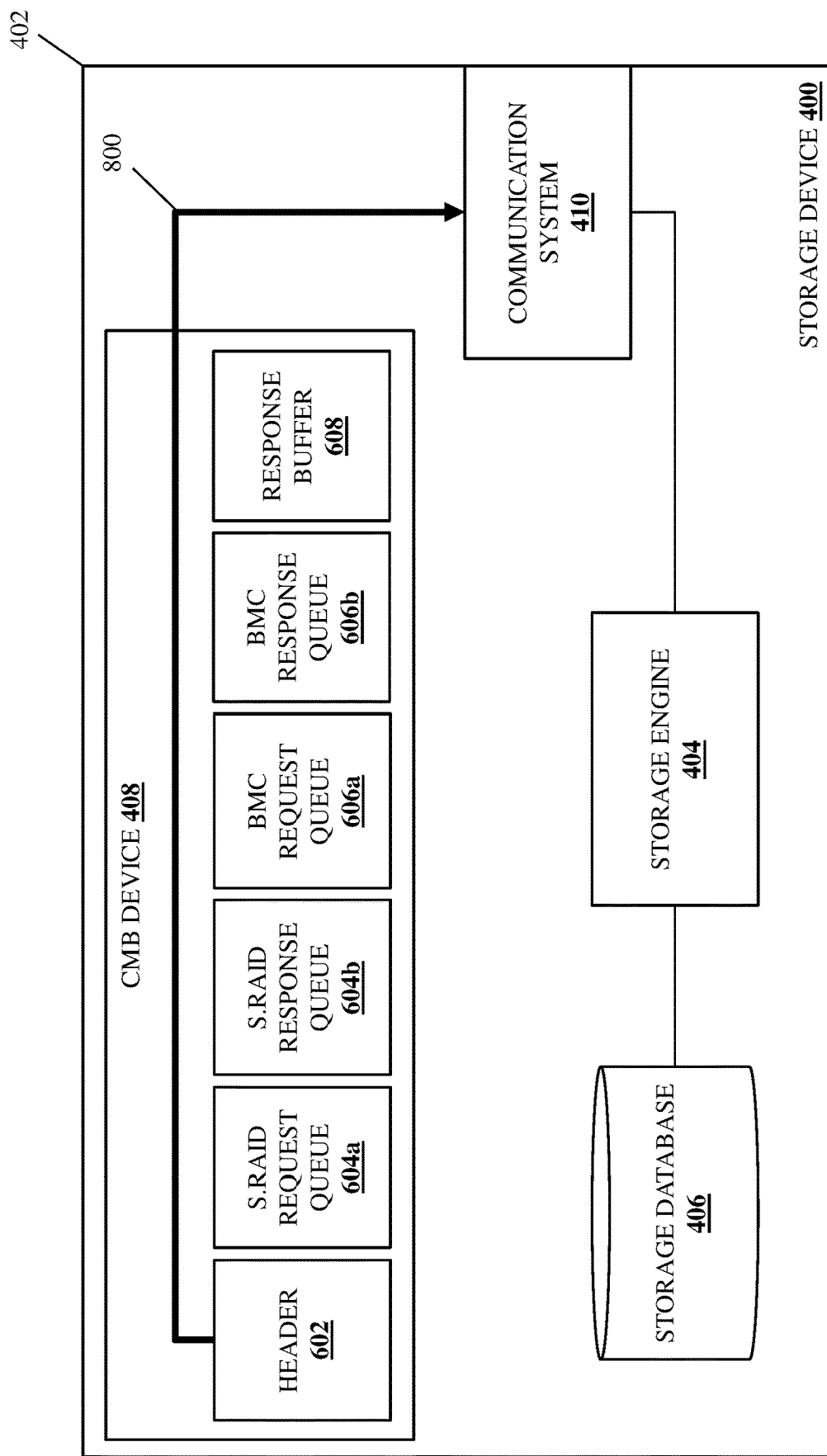
FIG. 8C is a schematic view illustrating an embodiment of the operation of the storage device of FIG. 4 during the method of FIGS. 5A and 5B.

As such, with reference to FIGS. 8A, 8B, and 8C, in an embodiment of decision block 504a and as part of the periodic accesses of the header 602 in the CMB device 408 of the storage device 202a/300, the BMC engine 304 in the BMC device 206/300 in the computing device 200 may perform software RAID information request identification operations 800 that include accessing the header 602 in the CMB device 408 in the storage device 202a/400 via the communication system 410 in the storage device 202a/400 and the communication system 308 in the BMC device 206/300, and determining that the software RAID engine 204 in the computing device 200 has submitted a software RAID information request in the software RAID request queue 604a based on the tail portion not matching the head portion of the head/tail information stored in the header 602 in the CMB device 408 (e.g., head/tail information such as "0/1" following an initial submission of a software RAID information request).

Figure 8E:
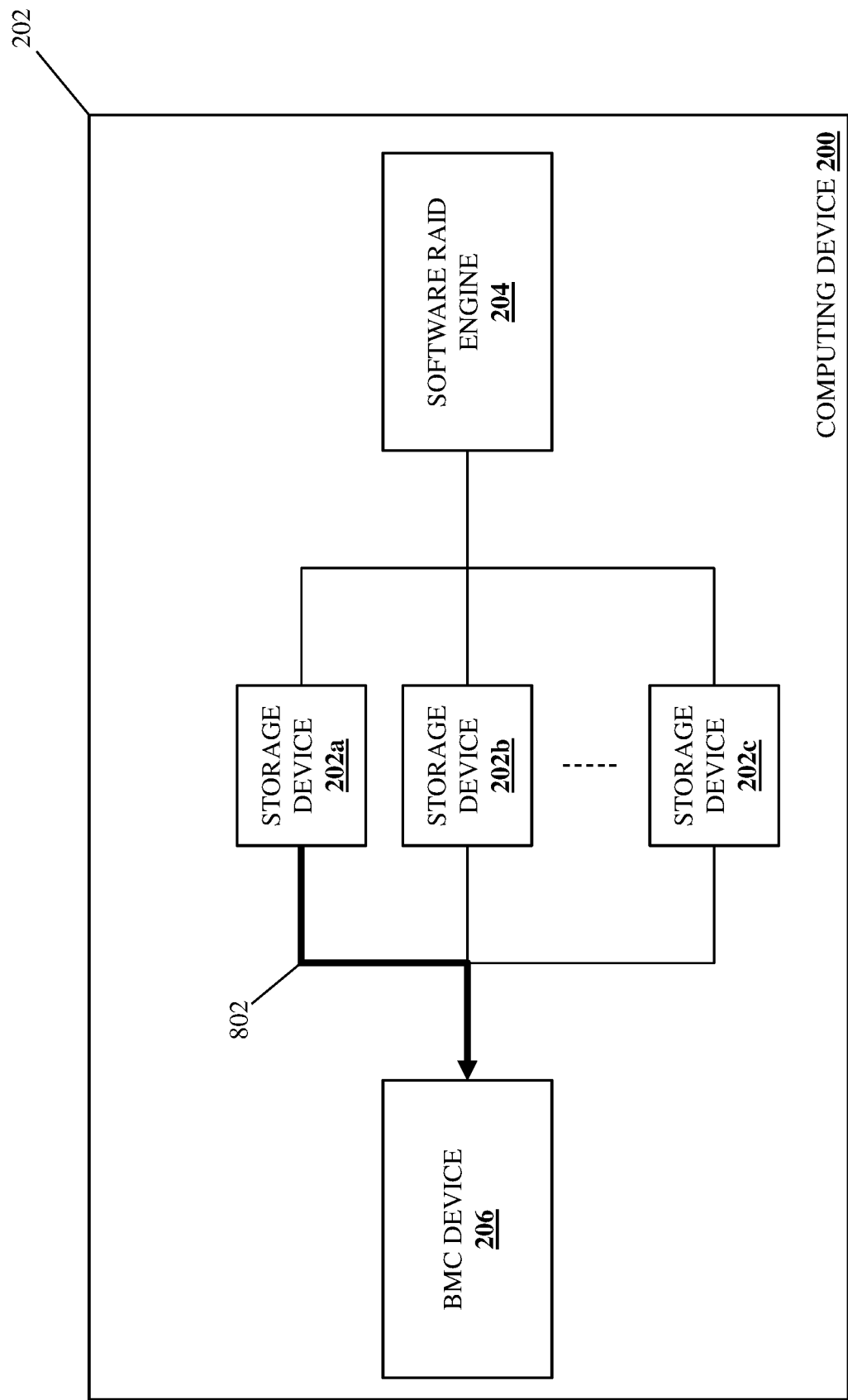
FIG. 8E is a schematic view illustrating an embodiment of the operation of the computing device of FIG. 2 during the method of FIGS. 5A and 5B.
Figure 8F:
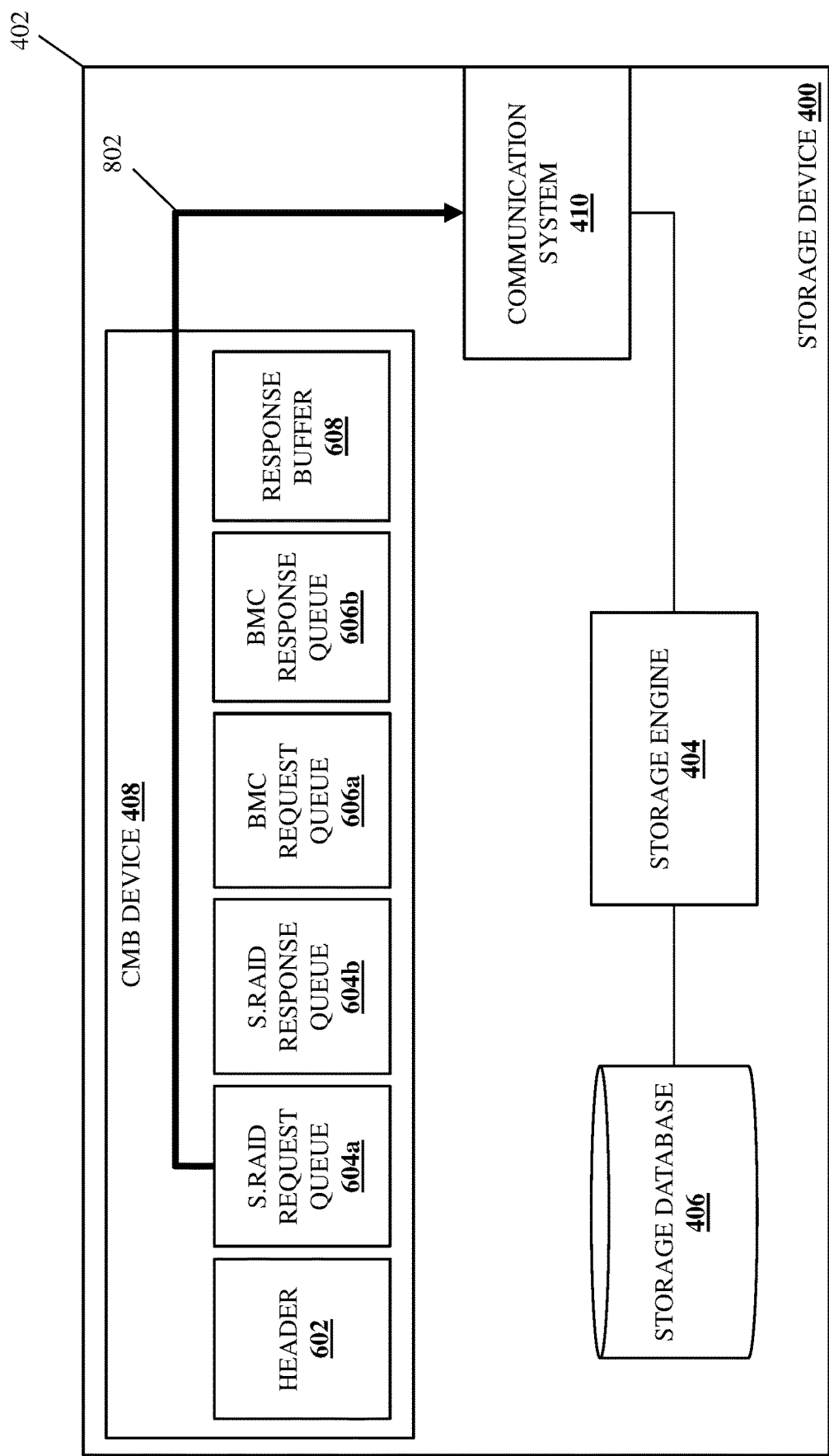
FIG. 8F is a schematic view illustrating an embodiment of the operation of the storage device of FIG. 4 during the method of FIGS. 5A and 5B.

With reference to FIGS. 8D, 8E, and 8F, in an embodiment of block 504b and in response to determining that the software RAID engine 204 in the computing device 200 has submitted a software RAID information request in the software RAID request queue 604a, the BMC engine 304 in the BMC device 206/300 in the computing device 200 may perform software RAID information request retrieval operations 802 that include accessing the software RAID request queue 604a in the CMB device 408 in the storage device 202a/400 via the communication system 410 in the storage device 202a/400 and the communication system 308 in the BMC device 206/300, and retrieving the software RAID information request.

Returning to the management-initiated communication of blocks 506a-506e, and similarly as described above, if at decision block 506a the software RAID subsystem identifies a management information request in the storage device memory subsystem, the method 500 proceeds to block 506b where the software RAID subsystem retrieves management information identified in the management information request. While not illustrated and described in detail, one of skill in the art in possession of the present disclosure will appreciate how decision block 506a and block 506b may be performed by the software RAID engine 204 in the computing device 200 similarly as described above for the performance of decision block 504a and block 504b by the BMC engine 304 in the BMC device 206/300 in the computing device 200. As such, the BMC engine 304 may submit a management information request in the BMC request queue 606a, and any management information requests (and/or alignments) submitted at decision block 506a may conform to MCTP standards. The BMC engine 304 may also identify the submission of the management information request in the header 602 configured in the CMB device 408 by incrementing a head portion of the head/tail information stored in the header 602 in the CMB device 408 in response to submitting the management information request (e.g., from the "0/0" as initially set during block 502 to "1/0").

Subsequently and as part of the periodic accesses of the header 602 in the CMB device 408 of the storage device 202a/300, the software RAID engine 204 in the computing device 200 may access the header 602 and determine that the BMC engine 304 has submitted a management information request in the BMC request queue 606a based on the head portion not matching the tail portion of the head/tail information stored in the header 602 in the CMB device 408 (e.g., head/tail information such as "1/0" following an initial submission of a management information request). The software RAID engine 204 may then access the BMC request queue 606a and retrieve the management information request.

Figure 8H:
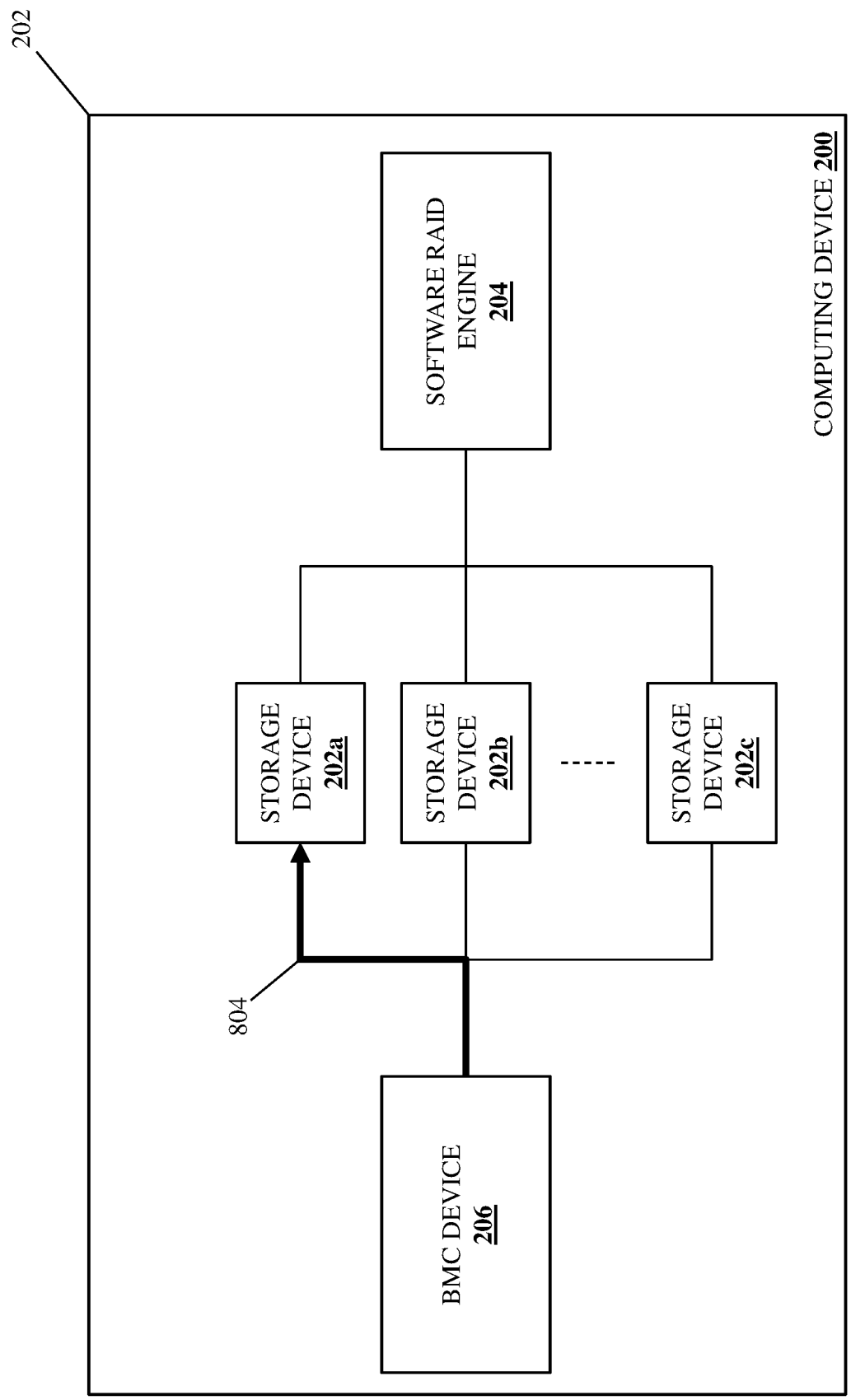
FIG. 8H is a schematic view illustrating an embodiment of the operation of the computing device of FIG. 2 during the method of FIGS. 5A and 5B.
Figure 8I:
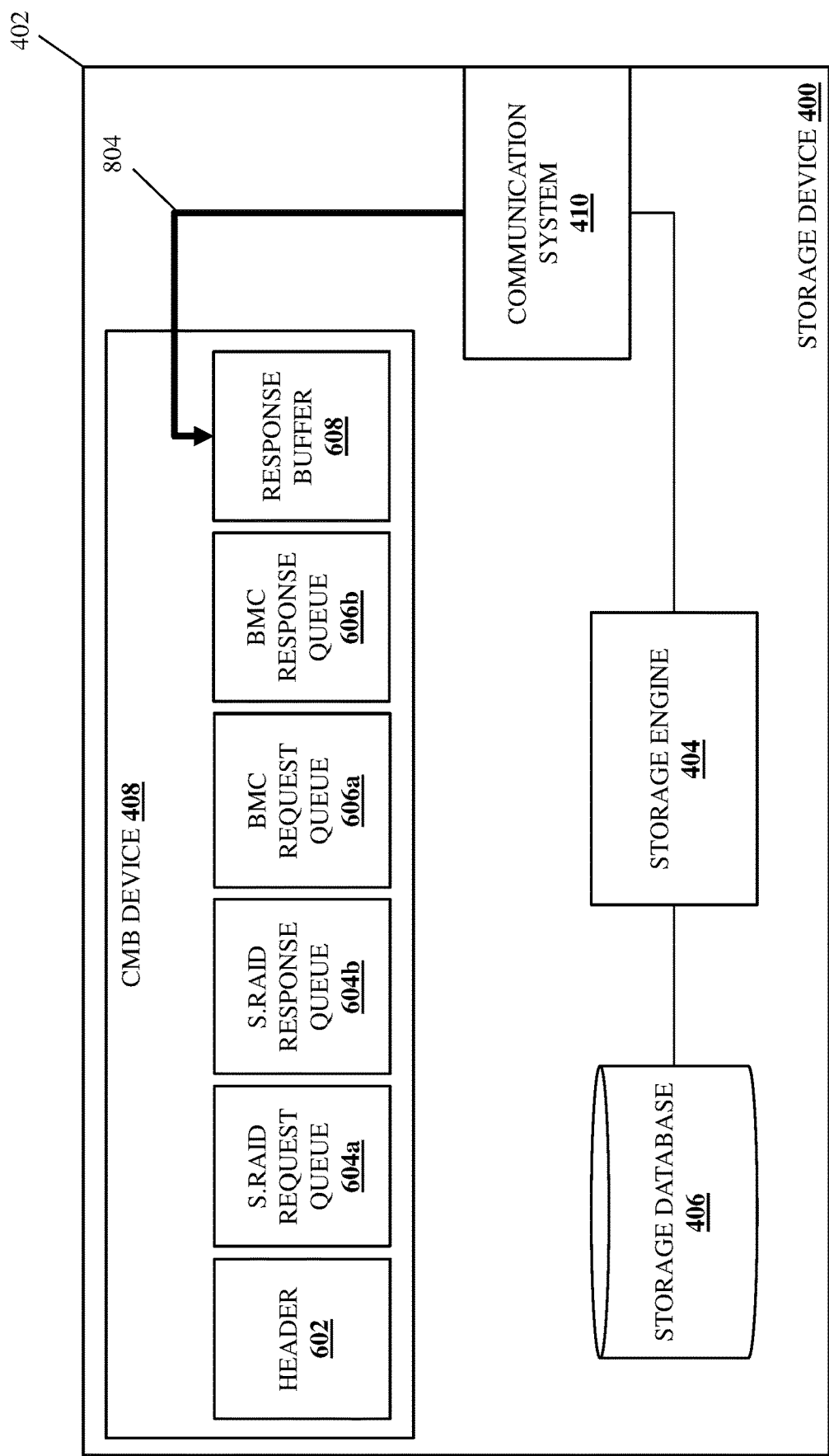
FIG. 8I is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504c where the management subsystem provides the software RAID information and a software RAID information response in the storage device memory subsystem. With reference to FIGS. 8G, 8H, and 8I, in an embodiment of block 504c, the BMC engine 304 in the BMC device 206/300 in the computing device 200 may perform software RAID information provisioning operations 804 that include retrieving the software RAID information (e.g., the BMC engine 304 may identify the vendor-defined opcode for "BAYID" in the software RAID information request and, in response, retrieve the BAYID of the NVMe storage device requested by the software RAID engine 204 in the specific example above), and transmitting that software RAID information via its communication system 308 and the communication system 410 in the storage device 202a/400 to the response buffer 608 in the CMB device 408 in the storage device 202a/400.

Figure 8L:
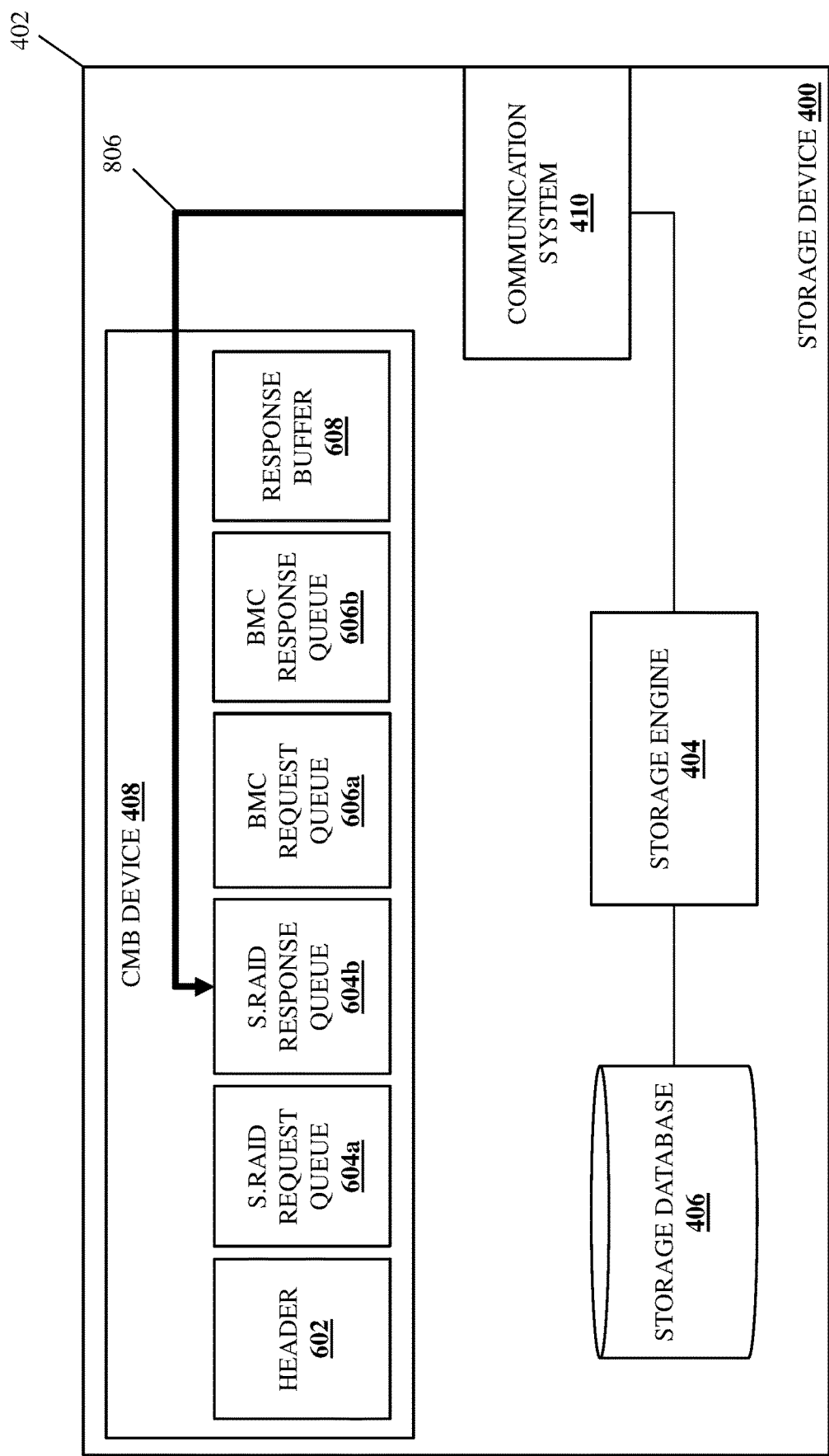
FIG. 8L is a schematic view illustrating an embodiment of the operation of the storage device of FIG. 4 during the method of FIGS. 5A and 5B.
Figure 8M:
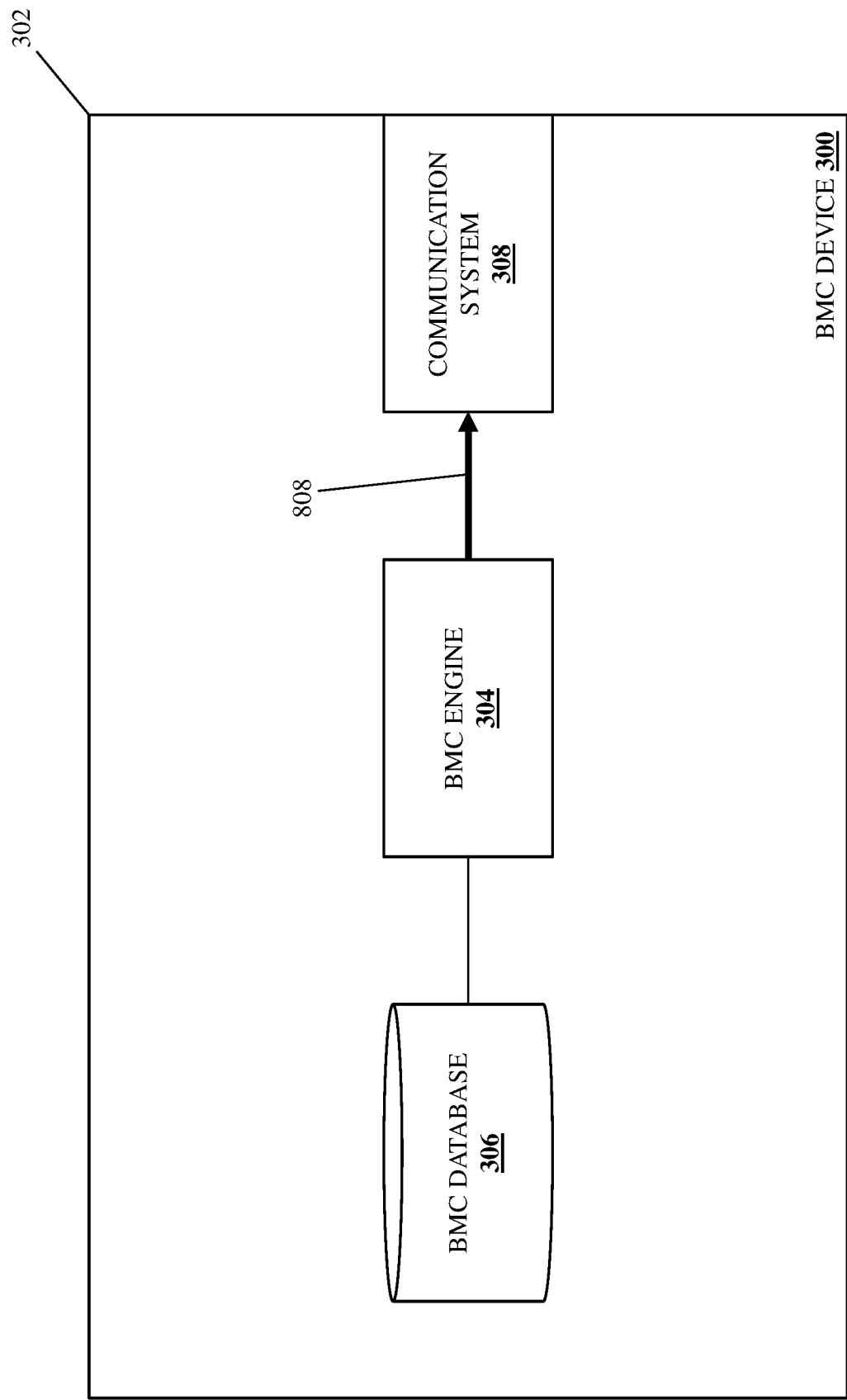
FIG. 8M is a schematic view illustrating an embodiment of the operation of the management subsystem of FIG. 3 during the method of FIGS. 5A and 5B.
Figure 8O:
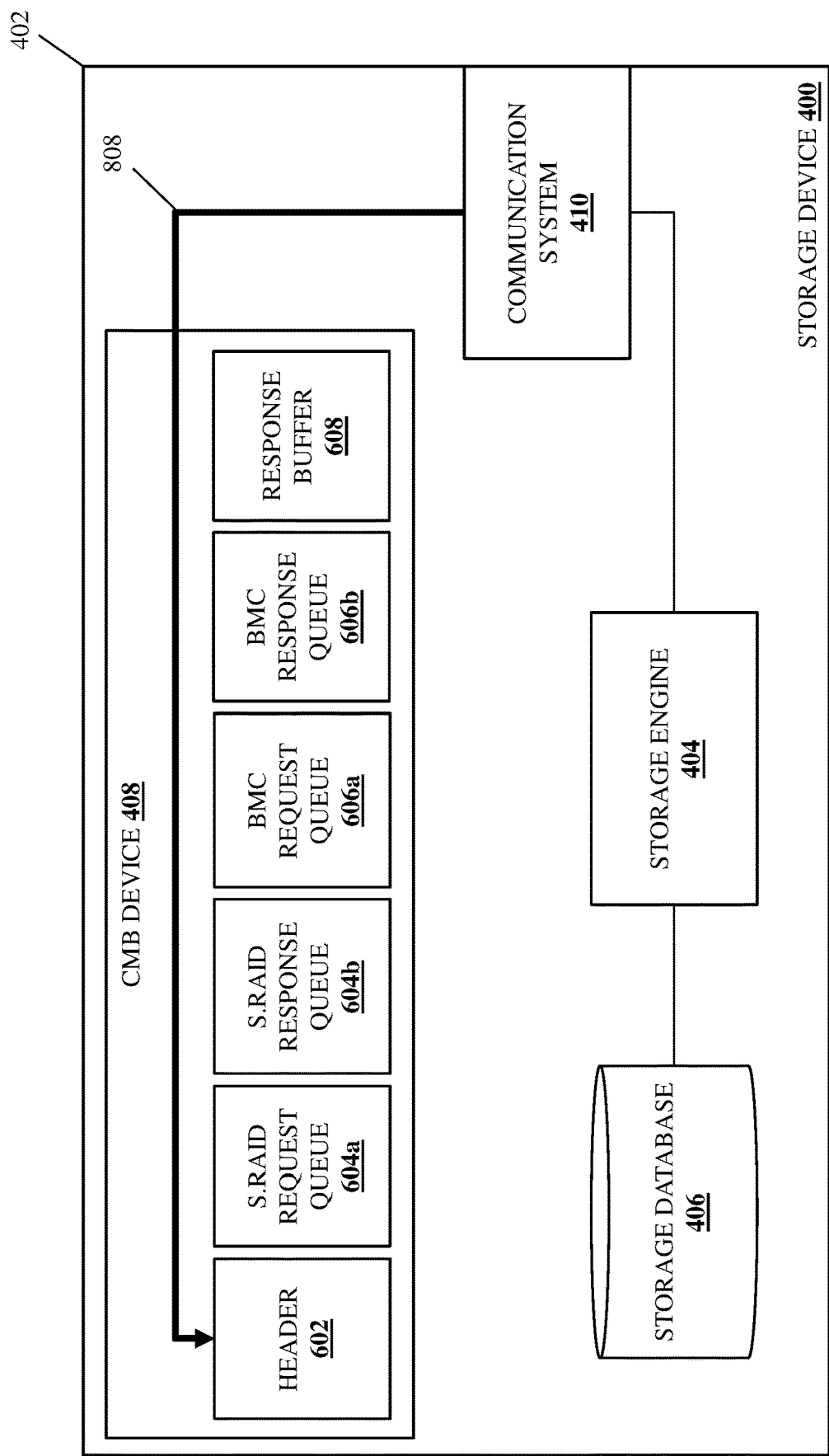
FIG. 8O is a schematic view illustrating an embodiment of the operation of the storage device of FIG. 4 during the method of FIGS. 5A and 5B.

With reference to FIGS. 8J, 8K, and 8L, in an embodiment of block 504c, the BMC engine 304 in the BMC device 206/300 in the computing device 200 may perform software RAID information response provisioning operations 806 that include transmitting a software RAID information response via its communication system 308 and the communication system 410 in the storage device 202a/400 to the software RAID response queue 604b in the CMB device 408 in the storage device 202a/400. Similarly as described above, any software RAID information responses (and/or alignments) submitted at block 504c may conform to MCTP standards. With reference to FIGS. 8M, 8N, and 8O, in an embodiment of block 504c, the BMC engine 304 in the BMC device 206/300 in the computing device 200 may perform software RAID information response identification operations 808 that include accessing the header 602 in the CMB device 408 of the storage device 202a/400 via its communication system 308 and the communication system 410 in the storage device 202a/400, and updating the head portion of the head/tail information in the header 602 (e.g., from the "0/1" following the provisioning of the software RAID information request by the software RAID engine 204 to "1/1") to indicate that the software RAID information response has been provided in response to the software RAID information request.

Returning to the management-initiated communication of blocks 506a-506e, and similarly as described above, at block 506c the software RAID subsystem provides the management information and a management information response in the storage device memory subsystem. While not illustrated and described in detail, one of skill in the art in possession of the present disclosure will appreciate how block 506c may be performed by the software RAID engine 204 in the computing device 200 similarly as described above for the performance of block 504c by the BMC engine 304 in the BMC device 206/300 in the computing device 200. As such, the software RAID engine 204 may retrieve the management information requested by the BMC engine 304, and transmit that management information to the response buffer 608 in the CMB device 408 in the storage device 202a/400. Furthermore, the software RAID engine 204 may transmit management information response to the BMC response queue 606b in the CMB device 408, and any management information responses (and/or alignments) submitted at block 506c may conform to MCTP standards. Finally, the software RAID engine 204 may also access the header 602 in the CMB device 408 of the storage device 202a/400, and update the tail portion of the head/tail information in the header 602 (e.g., from the "1/0" following the provisioning of the management information request by the BMC engine 304 to "1/1") to indicate that the management information response has been provided in response to the management information request.

Figure 9B:
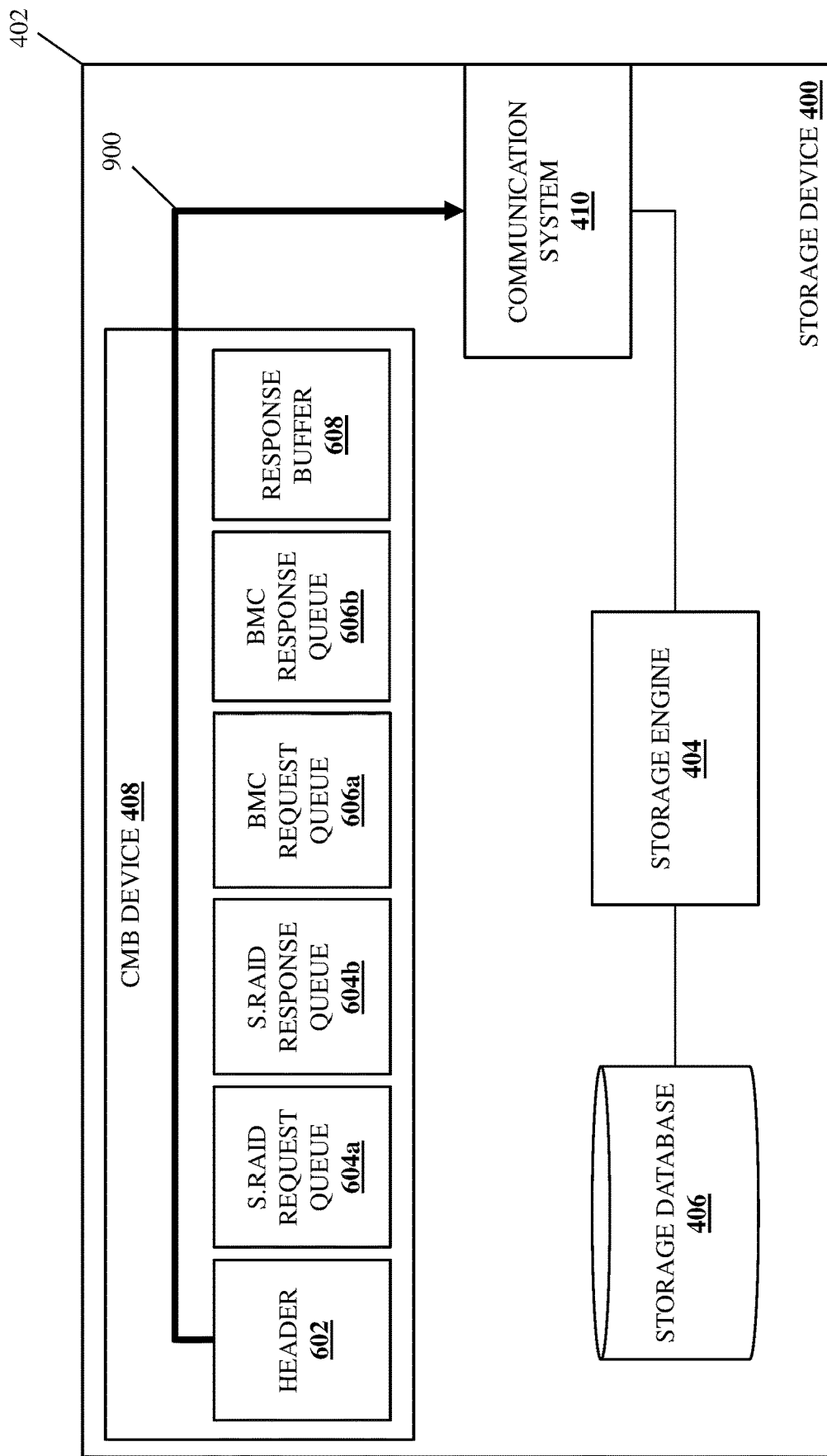
FIG. 9B is a schematic view illustrating an embodiment of the operation of the storage device of FIG. 4 during the method of FIGS. 5A and 5B.

Returning to the software-RAID-initiated communication of blocks 504a-504e, the method 500 then proceeds to block 504d where the software RAID subsystem identifies the software RAID information response in the storage device memory subsystem. With reference to FIGS. 9A and 9B, in an embodiment of block 504d and as part of the periodic accesses of the header 602 in the CMB device 408 of the storage device 202a/300, the software RAID engine 204 in the computing device 200 may perform software RAID information response identification operations 900 that include accessing the header 602 in the CMB device 408 in the storage device 202a/400 via the communication system 410 in the storage device 202a/400, and determining that the BMC engine 304 in the BMC device 206/300 in the computing device 200 has submitted a software RAID information response in the software RAID response queue 604b based on the tail portion being equal to the head portion of the head/tail information stored in the header 602 in the CMB device 408 (e.g., head/tail information such as "1/1" following a software RAID information response to an initial submission of a software RAID information request). In response to determining that the BMC engine 304 has submitted a software RAID information response in the software RAID response queue 604b, the software RAID engine 204 will retrieve the software RAID information response from the software RAID response queue 604b.

Returning to the management-initiated communication of blocks 506a-506e, and similarly as described above, at block 506d the management subsystem identifies the management information response in the storage device memory subsystem. While not illustrated and described in detail, one of skill in the art in possession of the present disclosure will appreciate how block 506d may be performed by the BMC engine 204 in the BMC device 206/300 in the computing device 200 similarly as described above for the performance of block 504d by the software RAID engine 204 in the computing device 200. As such, as part of the periodic accesses of the header 602 in the CMB device 408 of the storage device 202a/300, the BMC engine 304 in the BMC device 206/300 in the computing device 200 may access the header 602 in the CMB device 408 in the storage device 202a/400 and determine that the software RAID engine 204 has submitted a management information response in the management response queue 606b based on the head portion being equal to the tail portion of the head/tail information stored in the header 602 in the CMB device 408 (e.g., head/tail information such as "1/1" following a management information response to an initial submission of a management information request). In response to determining that the software RAID engine 204 has submitted a management information response in the management response queue 606b, the BMC engine 304 will retrieve the management information response from the management response queue 606b.

Returning to the software-RAID-initiated communication of blocks 504a-504e, the method 500 then proceeds to block

Figure 9C:
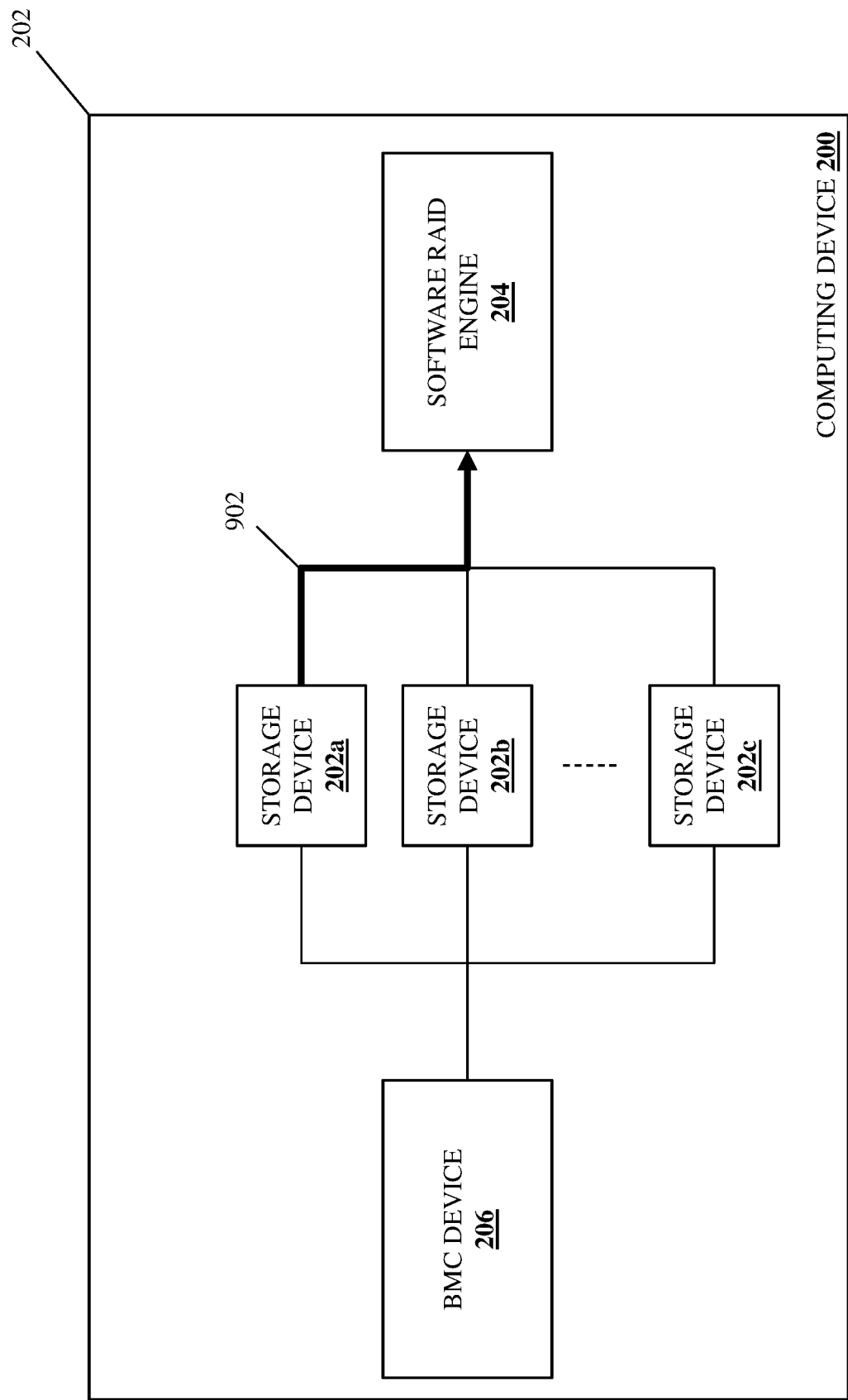
FIG. 9C is a schematic view illustrating an embodiment of the operation of the computing device of FIG. 2 during the method of FIGS. 5A and 5B.
Figure 9D:
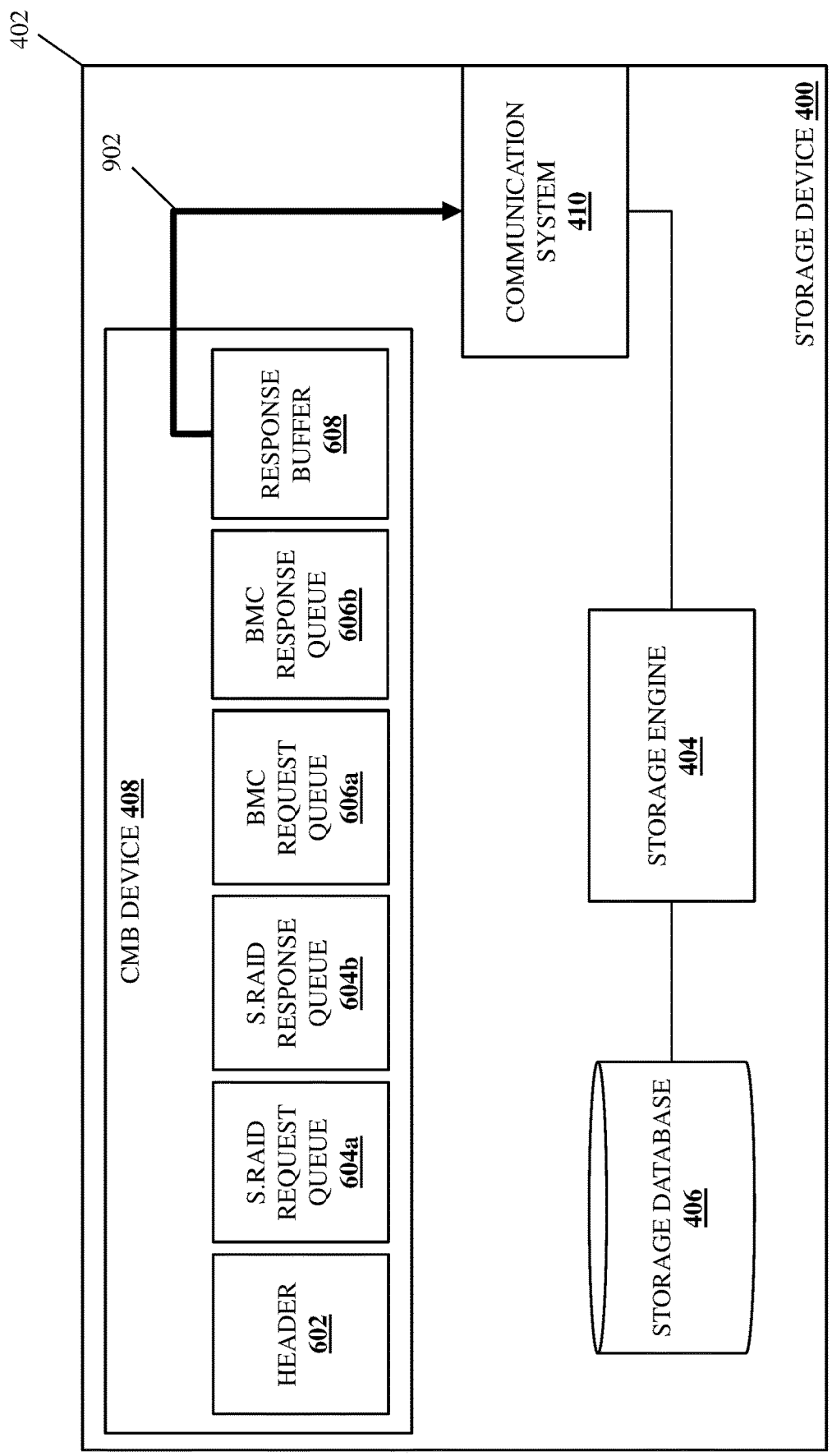
FIG. 9D is a schematic view illustrating an embodiment of the operation of the storage device of FIG. 4 during the method of FIGS. 5A and 5B.

504*e* where the software RAID subsystem retrieves the software RAID information from the storage device memory subsystem. With reference to FIGS. 9C and 9D, in an embodiment of block 504*e* and in response to determining that the BMC engine 304 in the BMC device 206/300 in the computing device 200 has submitted a management information response in the software RAID response queue 604*b*, the software RAID engine 204 in the computing device 200 may perform software RAID information retrieval operations 902 that include retrieving the software RAID information (provided by the BMC engine 304) from the response buffer 608 in the CMB device 408 in the storage device 202*a*/400 via the communication system 410 in the storage device 202*a*/400. As such, the software RAID engine 204 may request and receive software RAID information from the BMC device 206/300 using the CMB device 408 in the storage device 202*a*/400.

Returning to the management-initiated communication of blocks 506*a*-506*e*, and similarly as described above, at block 506*e* the management subsystem retrieves the management information from the storage device memory subsystem. While not illustrated and described in detail, one of skill in the art in possession of the present disclosure will appreciate how block 506*e* may be performed by the BMC engine 204 in the BMC device 206/300 in the computing device 200 similarly as described above for the performance of block 504*e* by the software RAID engine 204 in the computing device 200. As such, in response to determining that the software RAID engine 204 in the computing device 200 has submitted a management information response in the BMC response queue 606*b*, the BMC engine 304 may retrieve the management information (provided by the software RAID engine 204) from the response buffer 608 in the CMB device 408 in the storage device 202*a*/400. As such, the BMC device 206/300 may request and receive management information from the software RAID engine 204 using the CMB device 408 in the storage device 202*a*/400.

Thus, systems and methods have been described that utilize a storage device memory subsystem in a storage device for communications between a software RAID subsystem and a management subsystem. For example, the software RAID/management communication system of the present disclosure may include a chassis housing a software Redundant Array of Independent Disk (RAID) subsystem and a management subsystem that are each coupled to a storage device having a storage device memory subsystem. The software RAID subsystem provides a software RAID information request in the storage device memory subsystem that requests the management subsystem provide software RAID information associated with the operation of a software RAID provided by the software RAID subsystem, the software RAID subsystem then periodically accesses the storage device memory subsystem and, when the software RAID subsystem determines that the management subsystem has provided a management information response in the storage device memory subsystem, the software RAID subsystem retrieves the software RAID information that was provided in the storage device memory subsystem by the management subsystem. As such, critical, real-time data may be exchanged between software RAID subsystems and management subsystems without the need to rely on changes/updates to an SMBIOS, BIOS, and/or IPMI and the corresponding time delays required for such changes/updates.

Figure 10:
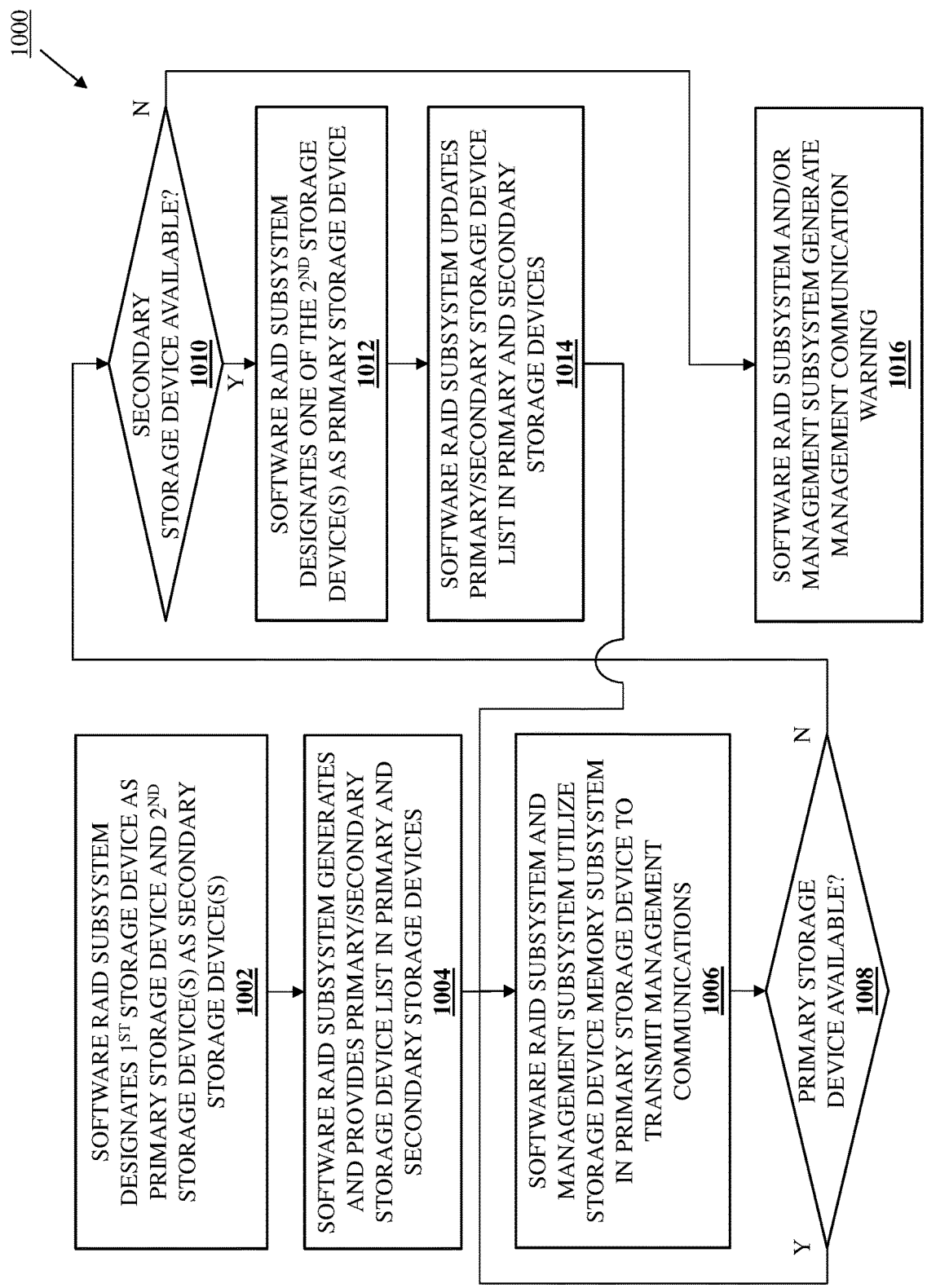
FIG. 10 is a flow chart illustrating an embodiment of a method for providing resilient communication between a software RAID subsystem and a management subsystem in a computing device.

Referring now to FIG. 10, an embodiment of a method 1000 for providing resilient communications between a software Redundant Array of Independent Disk (RAID) subsystem and a management subsystem in a computing device is illustrated. As discussed below, the systems and methods of the present disclosure designate primary and secondary storage devices, and then utilize a storage device memory subsystem in the primary storage device for communications between a software RAID subsystem and a management subsystem until the primary storage device becomes unavailable, at which time a storage device memory subsystem in one of the secondary storage devices is utilized for communications between the software RAID subsystem and the management subsystem. For example, the resilient software RAID/management communication system of the present disclosure may include a chassis housing a software RAID subsystem coupled to a plurality of storage devices that are also coupled to a management subsystem. The software RAID subsystem designates a first storage device in the plurality of storage devices as a primary storage device and a second storage device in the plurality of storage devices as a secondary storage device, and uses the respective storage device memory subsystem in the first storage device to transmit first management communications with the management subsystem. If the software RAID subsystem determines that the first storage device is unavailable, it uses the respective storage device memory subsystem in the second storage device to transmit second management communications with the management subsystem. As such, the software RAID/management communications described above are resilient to the unavailability of a storage device being used to provide those management communications.

As described below, the method 1000 may be integrated with the method 500 discussed above such that, for example, the methods 500 and 1000 are performed at the same time, blocks of the method 500 are performed during blocks of the method 1000, and/or the methods 500 and 1000 are otherwise performed to provide any of the functionality described below. As such, while a few specific examples are described below, one of skill in the art in possession of the present disclosure will appreciate how any portion of the method 500 may be performed to prepare the storage devices 202*a*-202*c*, the software RAID engine 204, and/or the BMC device 206 for the resilient software RAID/management communications, and/or otherwise perform the functionality described below while remaining within the scope of the present disclosure.

Figure 11A:
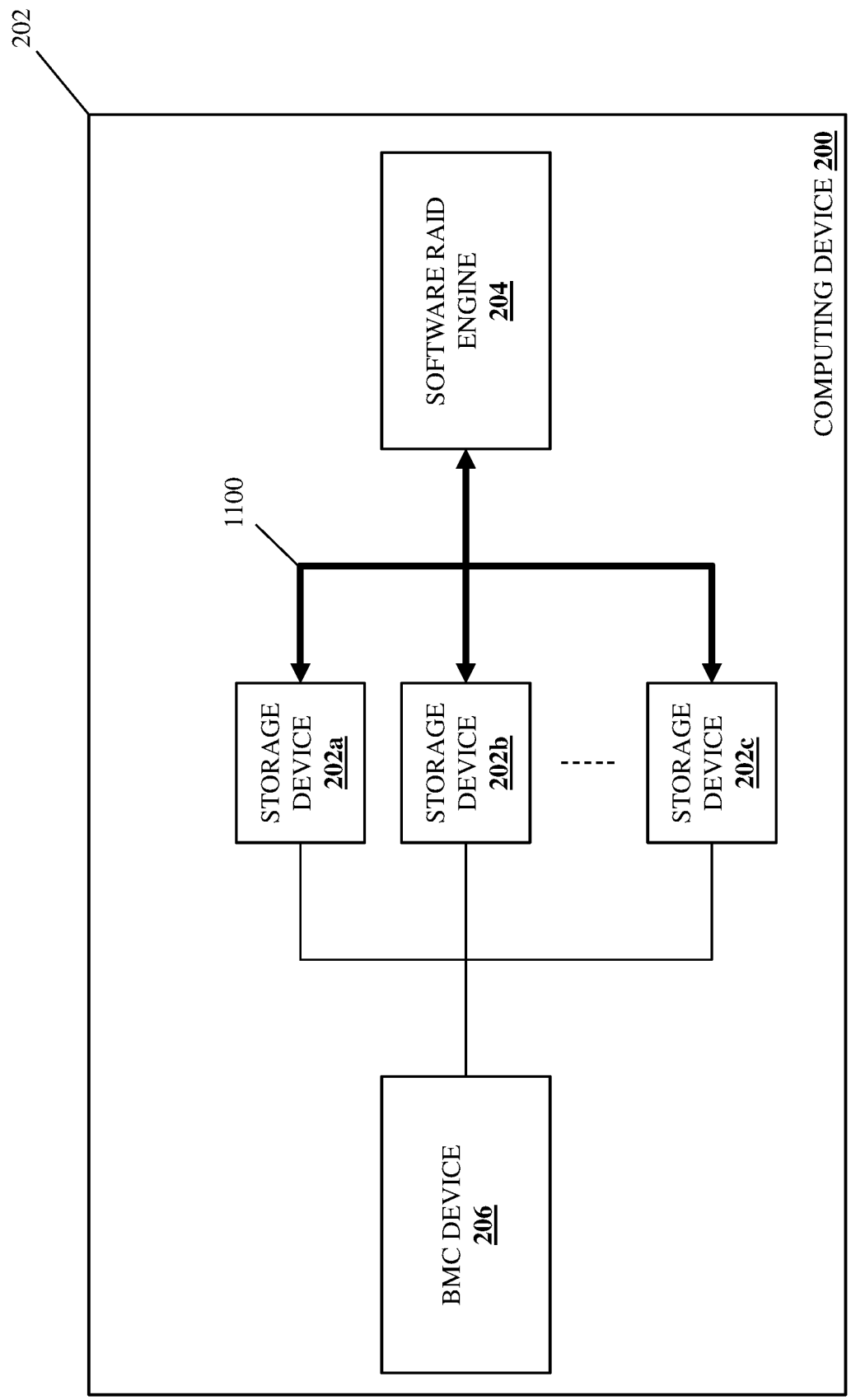
FIG. 11A is a schematic view illustrating an embodiment of the operation of the computing device of FIG. 2 during the method of FIG. 10.
Figure 11B:
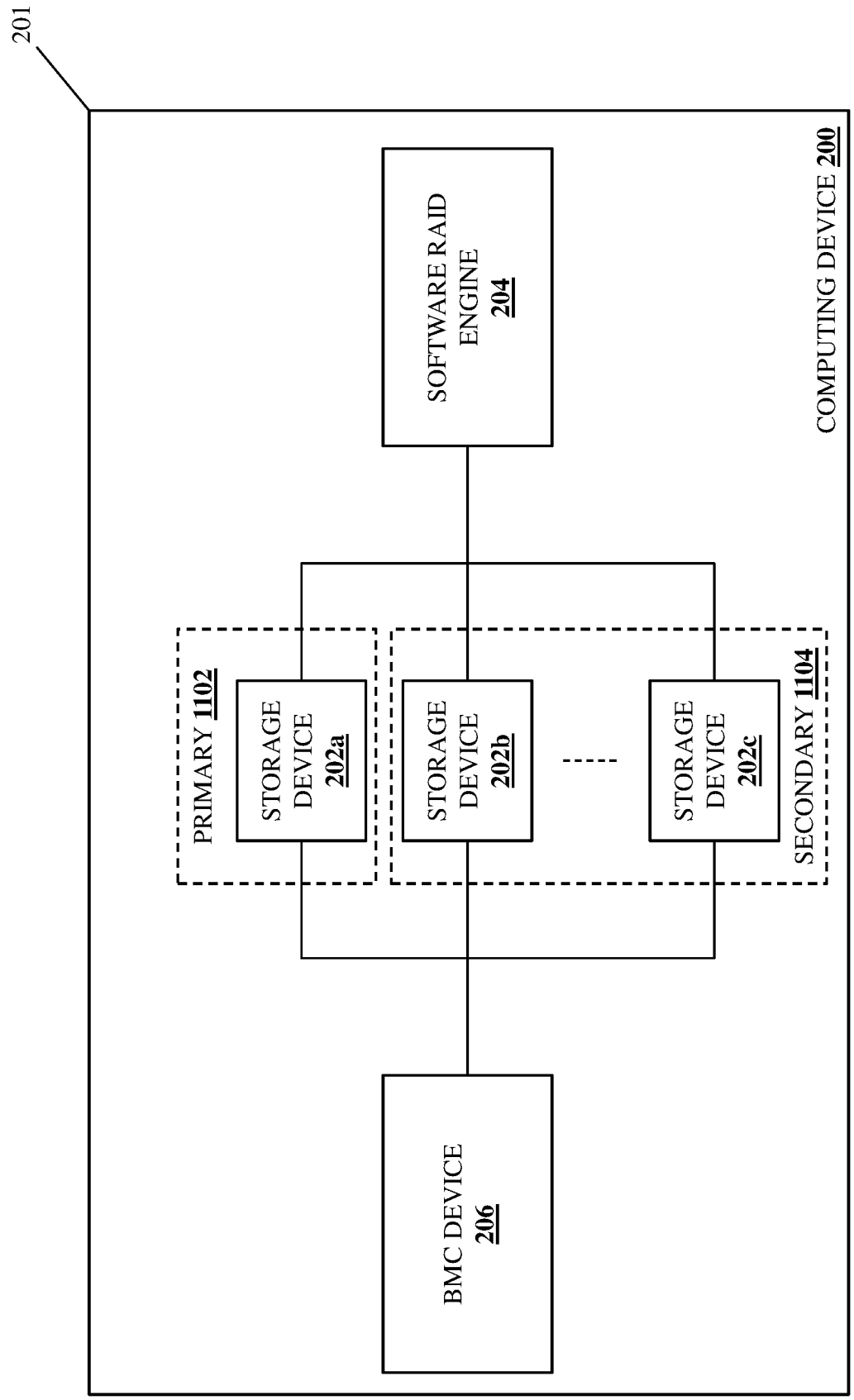
FIG. 11B is a schematic view illustrating an embodiment of the operation of the computing device of FIG. 2 during the method of FIG. 10.

The method 1000 begins at block 1002 where a software RAID subsystem designates a first storage device as a primary storage device and one or more second storage devices as secondary storage devices. With reference to FIGS. 11A and 11B, in an embodiment of block 1002, the software RAID engine 204 in the computing device 200 may perform primary/secondary storage device designation operations 1100 that, in the specific examples provided below, designate the storage device 202*a* as a primary storage device 1102, and designate the storage devices 202*b* and up to 202*c* as secondary storage devices 1104. For example, the primary/secondary storage device designation operations 1100 performed at block 1002 may include the software RAID engine 204 designating the storage device 202*a* as the primary storage device 1102 and the storage devices 202*b*-202*c* as the respective secondary storage devices 1104 based on a storage device enumeration order of the storage devices 202*a*-202*c*; based on an availability, stability, and/or other features of the CMB device 408 in the storage devices 202*a*-202*c*/400; and/or based on any of a variety of factors that one of skill in the art in possession of the present disclosure would recognize as being useful for defining the designation of the primary and secondary storage devices of the present disclosure.

Furthermore, while a plurality of storage devices 202a-202c are illustrated and described such that the primary storage device 1102 and multiple secondary storage devices 1104 are designated at block 1002, one of skill in the art in possession of the present disclosure will appreciate how only two storage devices may be available for designation as the primary storage device 1102 and secondary storage device 1104 described below. Furthermore, the number of storage devices in the computing device 200 may vary depending on the requirements, configuration, and/or other features of the computing device 200, and thus the designation of any number of storage devices as primary and secondary storage devices is envisioned as falling within the scope of the present disclosure as well. As will be appreciated by one of skill in the art in possession of the present disclosure, the primary storage device 1102 operates as an "active" communication channel for the software RAID engine 204 and the BMC engine 304 in the BMC device 206/300, while the secondary storage device(s) 1104 operate as "backup" communication channel(s) for the software RAID engine 204 and the BMC engine 304 in the BMC device 206/300 in the event the active communication channel becomes unavailable.

In some embodiments, the primary/secondary storage device designation operations 1100 performed at block 1002 may include the software RAID engine 204 performing block 502 of the method 500 on each of the storage devices 202a-202c in order to configure the storage device memory subsystem in each of the storage devices 202a-202c/400 in substantially the same manner as described above for the storage device 202a/400 with reference to FIGS. 6A and 6B. As such, following block 1002 of the method 1000, the CMB device 408 in each of the storage devices 202a-202c/400 may include a header 602, a software RAID request queue 604a, a software RAID response queue 604b, a BMC request queue 606a, a BMC response queue 606b, a response buffer 608, and/or any other storage device memory subsystem elements that one of skill in the art in possession of the present disclosure would recognize as providing for the functionality described below.

Figure 12A:
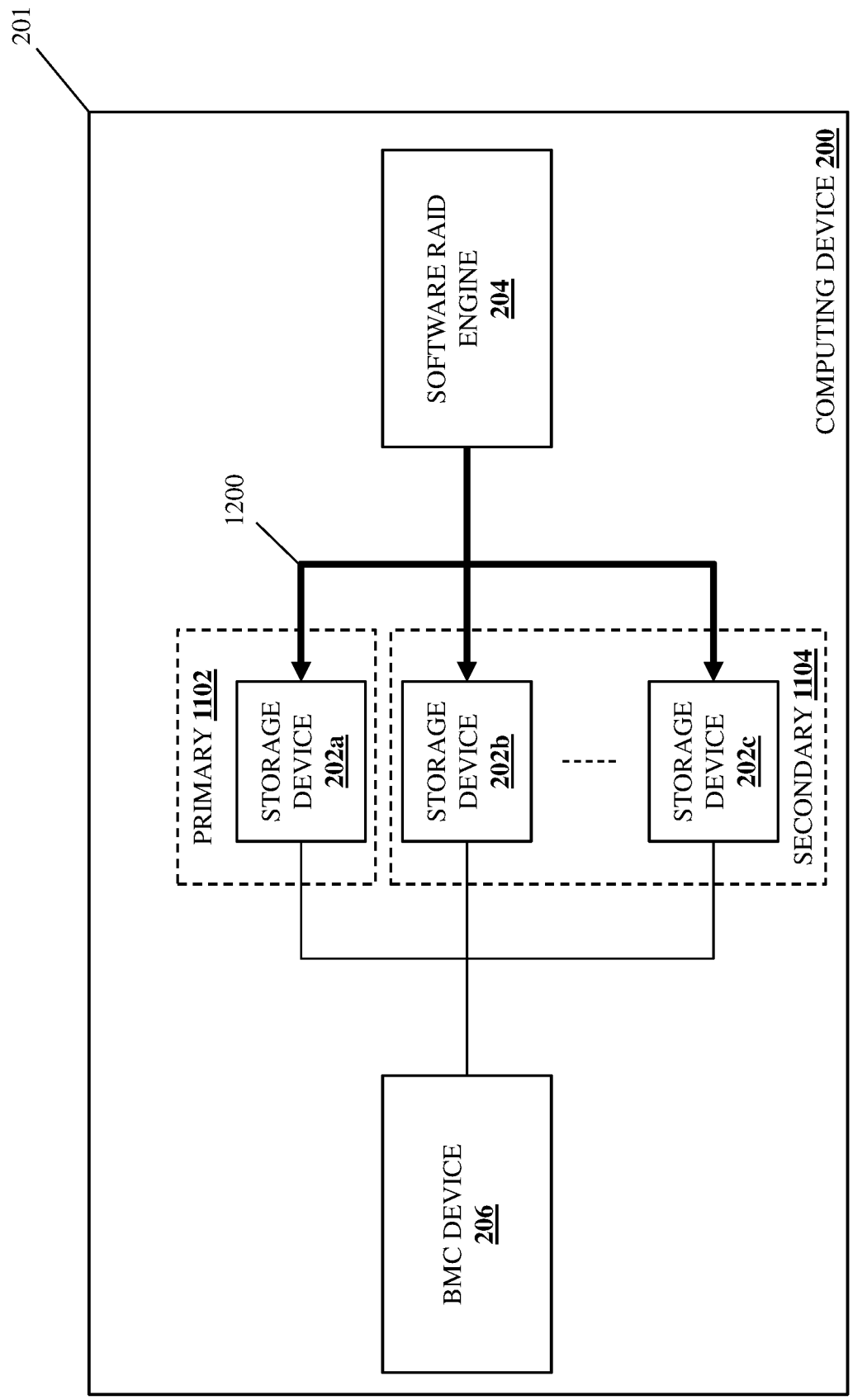
FIG. 12A is a schematic view illustrating an embodiment of the operation of the computing device of FIG. 2 during the method of FIG. 10.
Figure 12B:
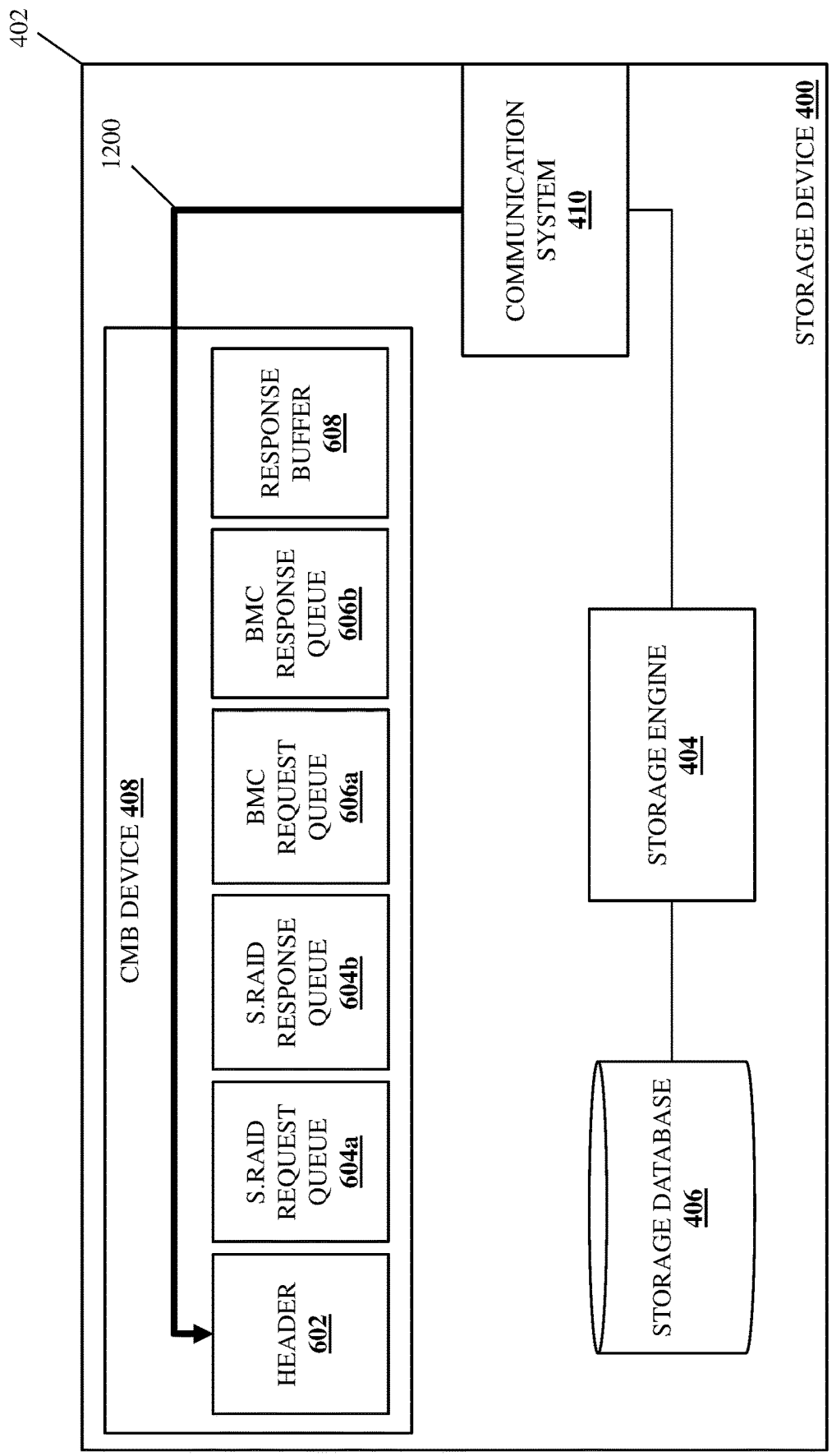
FIG. 12B is a schematic view illustrating an embodiment of the operation of the storage device of FIG. 4 during the method of FIG. 10.

The method 1000 then proceeds to block 1004 where the software RAID subsystem generates and provides a primary/secondary storage device list in the primary and secondary storage devices. With reference to FIGS. 12A and 12B, in an embodiment of block 1004, the software RAID engine 204 in the computing device 200 may perform primary/secondary storage device list provisioning operations 1200 that may include generating the primary/secondary storage device list that identifies the primary storage device 1102 and secondary storage devices 1104 (i.e., the storage device 202a and the storage devices 202b-202c), and transmitting the primary/secondary storage device list via the communication system 410 in each of the storage devices 202a-202c for storage in the header 602 included in the CMB device 408 in each of the storage devices 202a-202c. As will be appreciated by one of skill in the art in possession of the present disclosure, the primary/secondary storage device list provided in each of the primary storage device 1102 and secondary storage devices 1104 (i.e., the storage device 202a and the storage devices 202b-202c) at block 1004 may include any information that is configured to identify (e.g., to the BMC engine 304 in the BMC device 206/300) the storage device 202a as the primary storage device 1102 and the storage devices 202b-202c as the secondary storage devices 1104, as well as provide for any of the other functionality described below.

Figure 13A:
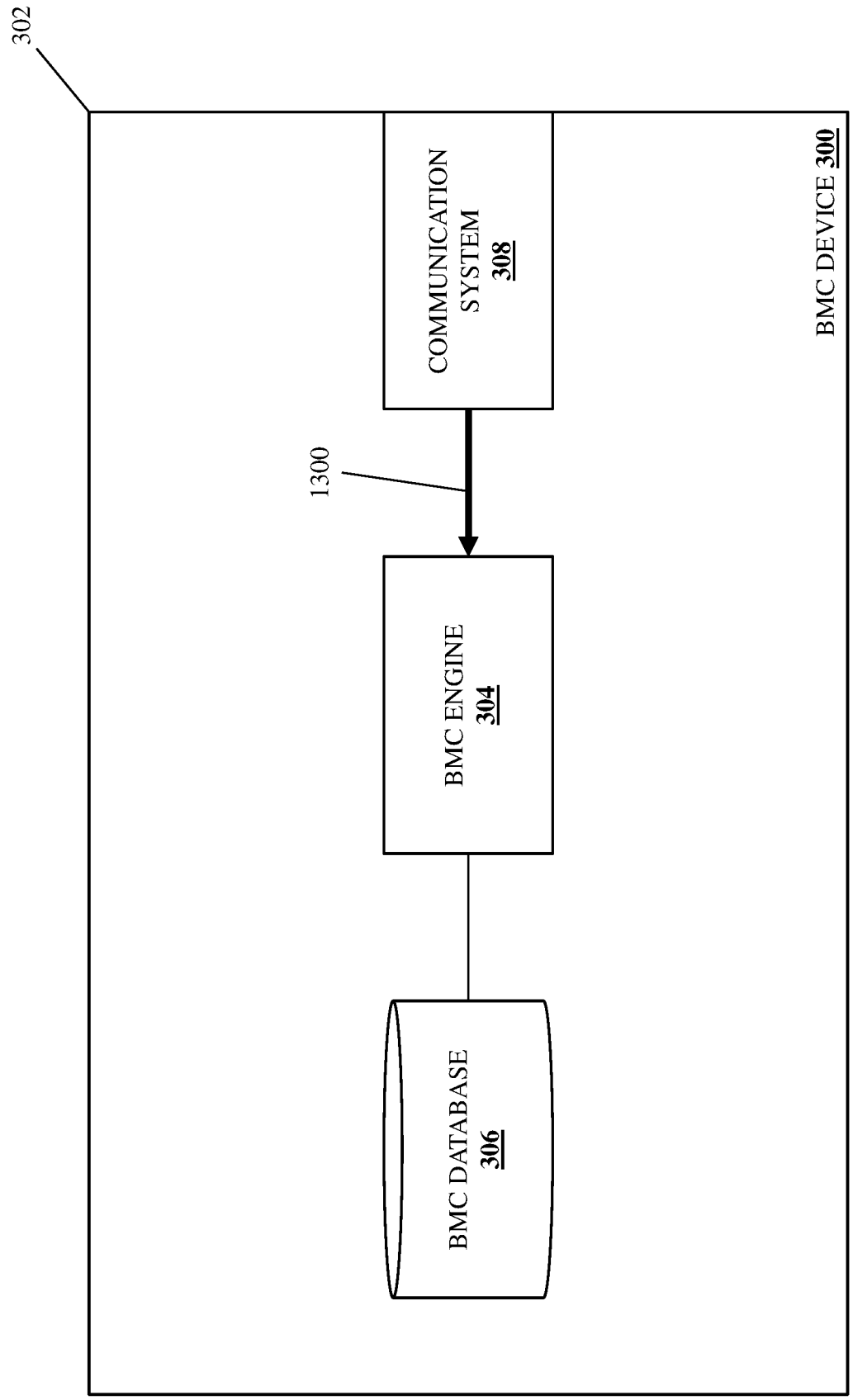
FIG. 13A is a schematic view illustrating an embodiment of the operation of the management subsystem of FIG. 3 during the method of FIG. 10.
Figure 13B:
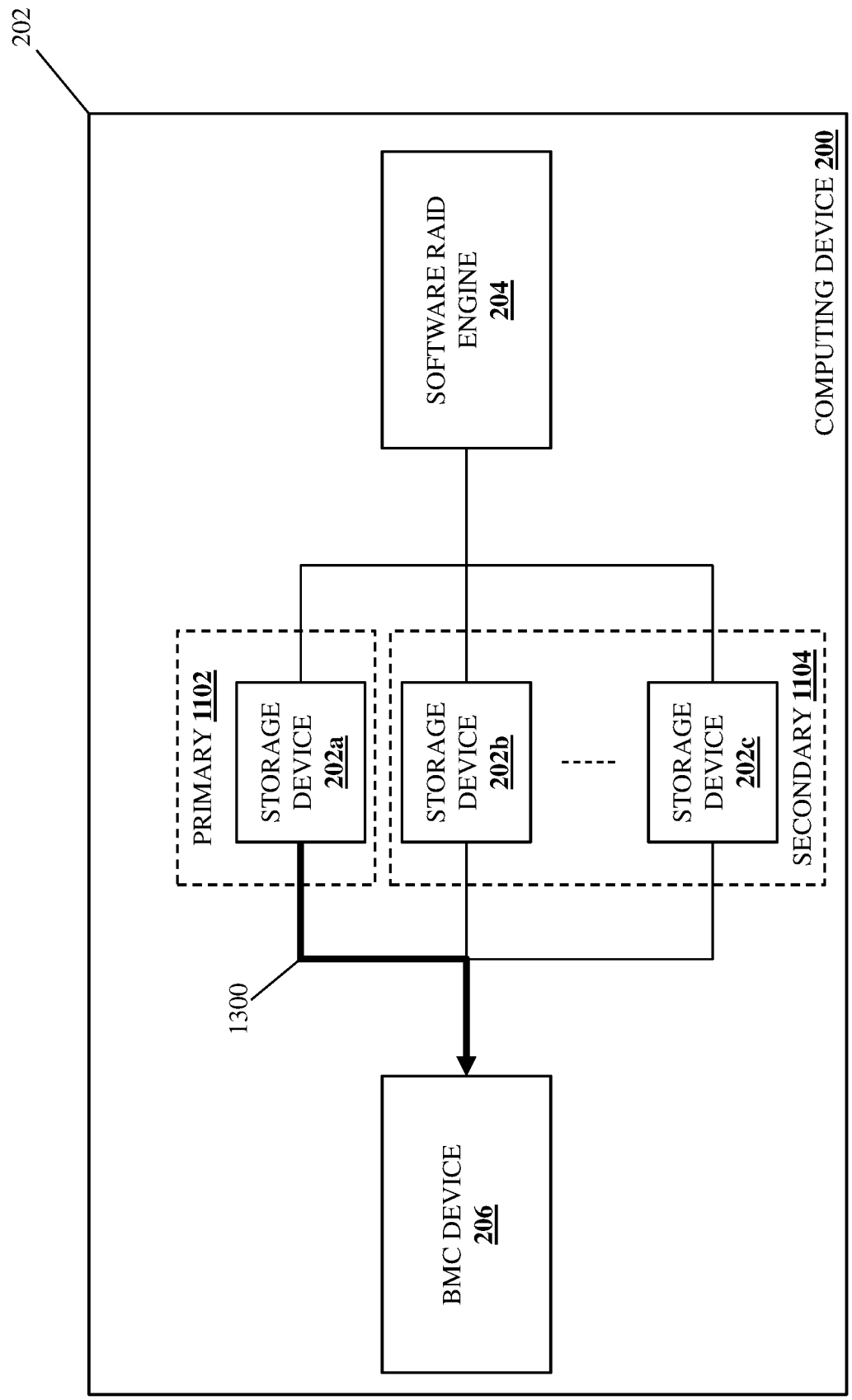
FIG. 13B is a schematic view illustrating an embodiment of the operation of the computing device of FIG. 2 during the method of FIG. 10.
Figure 13C:
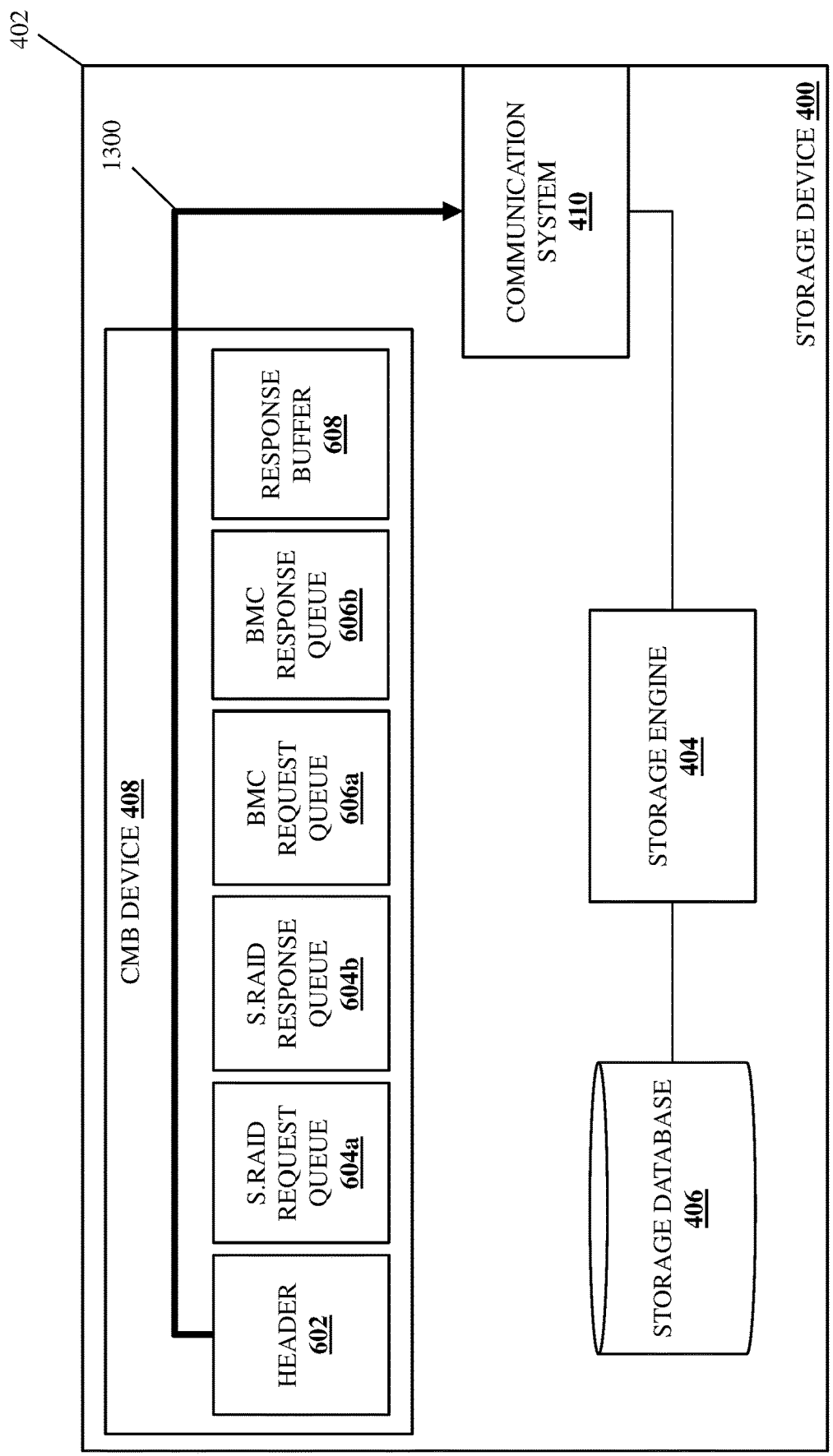
FIG. 13C is a schematic view illustrating an embodiment of the operation of the storage device of FIG. 4 during the method of FIG. 10.

With reference to FIGS. 13A, 13B, and 13C, in an embodiment and as part of (or following) block 1004 of the method 1000, the BMC engine 304 in the BMC device 206/300 of the computing device 200 may perform primary/secondary storage device list retrieval operations 1300 that include retrieving, via its communication system 308, the primary/secondary storage device list from the header 602 included in the CMB device 408 of the storage device 202a/400 via the communication system 410 in the storage device 202a/400. For example, as part of the CMB device read operations 610 discussed above with reference to block 502 of the method 500, the BMC engine 304 in the BMC device 206/300 of the computing device 200 may determine that the software RAID engine 204 has indicated an intent to utilize the software RAID/management communication memory space of the CMB device 408 for communication with the BMC device 206/300 and, in response, may begin periodically accessing the header 602 in the CMB device 408 (e.g., via NVMe-MI-PCIe reads) until authentication information (e.g., the signature, key, or other authentication information discussed above) provided by the software RAID engine 204 in the software RAID/management communication memory space of the CMB device 408 is retrieved and authenticated. In response to retrieving and authenticating authentication information from the CMB device 408 in the storage device 202a/400, the BMC engine 304 may retrieve the primary/secondary storage device list from the header 602 in that CMB device 408.

Figure 14A:
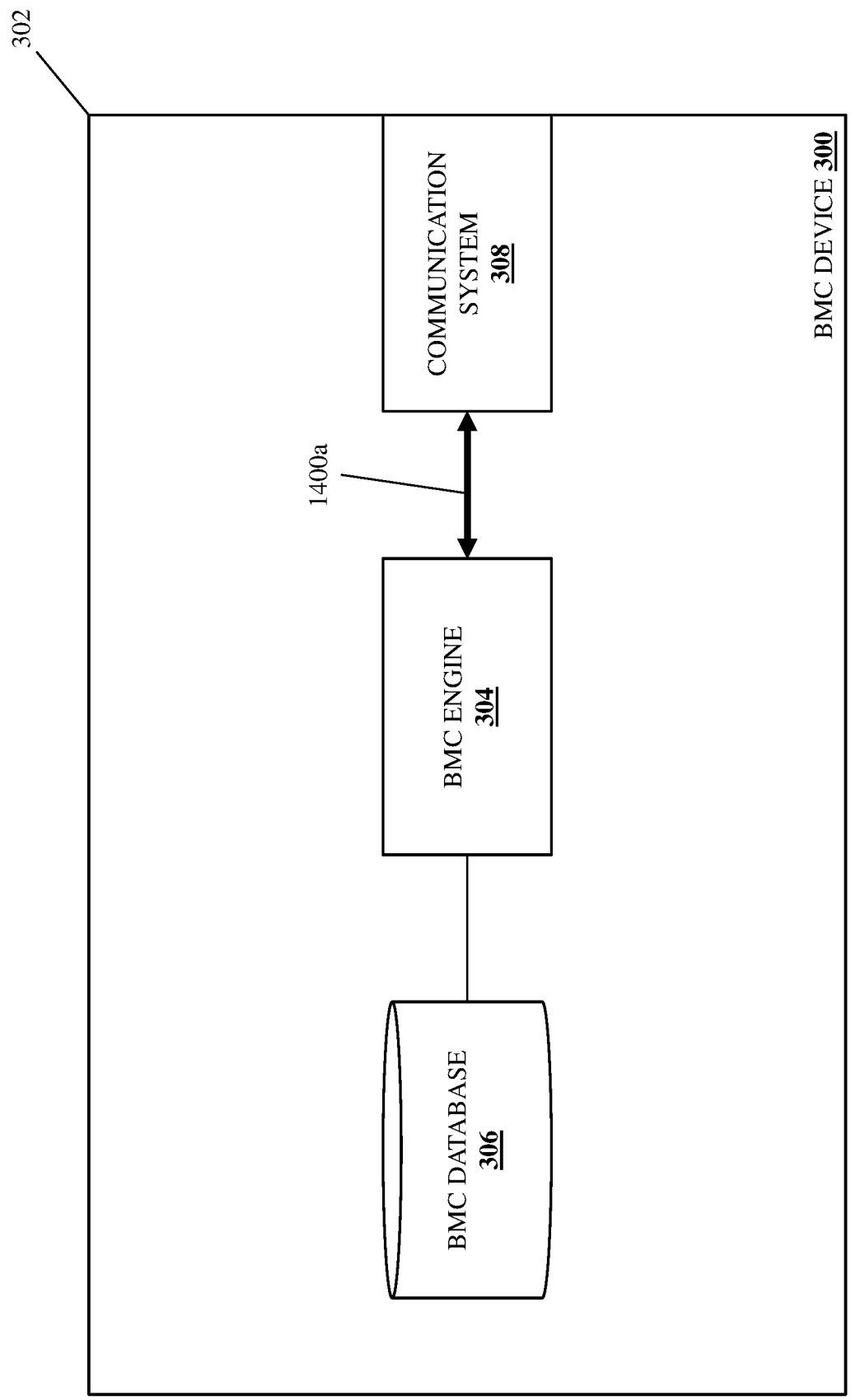
FIG. 14A is a schematic view illustrating an embodiment of the operation of the management subsystem of FIG. 3 during the method of FIG. 10.
Figure 14B:
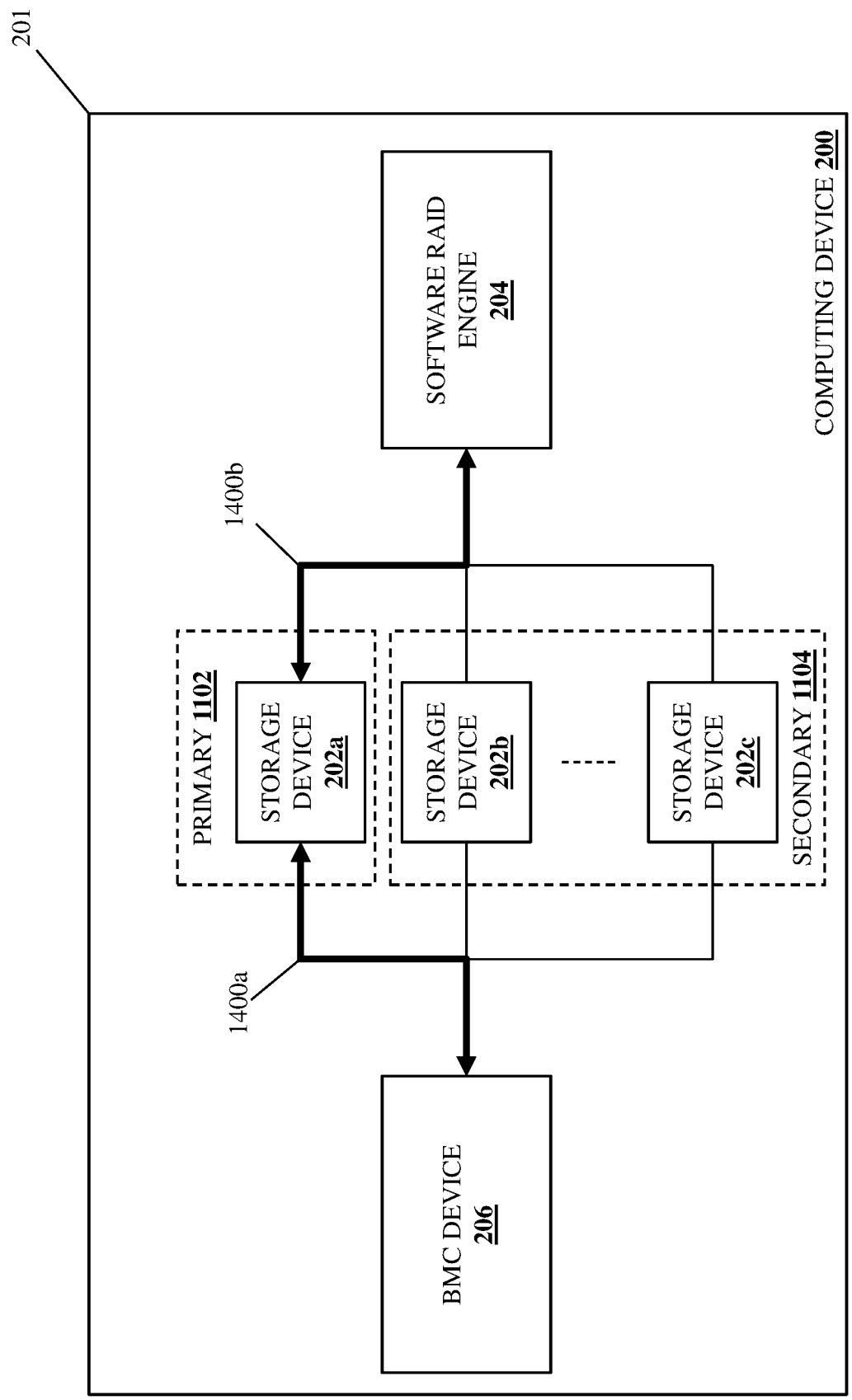
FIG. 14B is a schematic view illustrating an embodiment of the operation of the computing device of FIG. 2 during the method of FIG. 10.

The method 1000 then proceeds to block 1006 where the software RAID subsystem and a management subsystem utilize a storage device memory subsystem in the primary storage device to transmit management communications. With reference to FIGS. 14A and 14B, in an embodiment of block 1006, the BMC engine 304 in the BMC device 206/300 of the computing device 200 may use the storage device 202a/400 to perform management communication transmission operations 1400a via its communication system 308 and the communication system 408 in the storage device 202a/400, while the software RAID engine 204 in the computing device 200 may use the storage device 202a/400 to perform management communication transmission operations 1400b via the communication system 408 in the storage device 202a/400. As will be appreciated by one of skill in the art in possession of the present disclosure, the management communication transmission operations 1400a and 1400b performed by the BMC engine 304 and the software RAID engine 204 may be performed substantially as described above with reference to blocks 504a-504e and/or blocks 506a-506e of the method 500.

As such, using the primary/secondary storage device list retrieved at block 1004, the BMC engine 304 may identify the storage device 202a/400 as the primary storage device 1002 and, in response, use the CMB device 408 in the storage device 202a/400 to transmit management communications with the software RAID engine 204 at block 1006. Similarly, using the primary/secondary storage device list generated at block 1004, the software RAID engine 204 may identify the storage device 202a/400 as the primary storage device 1002 and, in response, use the CMB device 408 in the storage device 202a/400 to transmit management communications with the BMC engine 304 at block 1006.

The method 1000 then proceeds to decision block 1008 where it is determined whether the primary storage device is available. In an embodiment, at decision block 1008, each of the software RAID engine 204 in the computing device 200 and the BMC engine 304 in the BMC device 206/300 of the computing device 200 may monitor to determine whether the storage device 202a that was designated as the primary storage device 1102 is available. For example, the determination of whether the storage device 202a that was designated as the primary storage device 1102 is available at decision block 1008 may be based on whether a software RAID information request or management information request (e.g., submitted at decision blocks 504a or 506a of the method 500 as discussed above) has timed out.

To provide a specific example, at decision block 1006, the software RAID engine 204 may provide a software RAID information request in the CMB device 408 of the storage device 202a/400 similarly as described above, and then may monitor to determine whether a software RAID information response is received from the BMC engine 304 within a threshold time period following the provisioning of the software RAID information request. Similarly, at decision block 1006, the BMC engine 304 may provide a management information request in the CMB device 408 of the storage device 202a/400 similarly as described above, and then may monitor to determine whether a management information response is received from the software RAID engine 204 within a threshold time period following the provisioning of the management information request. In different embodiments, the threshold time period for receiving the software RAID/management information response following the provisioning of the software RAID/management information request may be measured by an amount of time, a number of software RAID/management information request retry operations, and/or other "time" period measurements that would be apparent to one of skill in the art in possession of the present disclosure.

In another example, the determination of whether the storage device 202a that was designated as the primary storage device 1102 is available at decision block 1008 may be based on whether a software RAID information request or management information request may be submitted. To provide a specific example, at decision block 1006, the software RAID engine 204 may attempt to provide a software RAID information request in the CMB device 408 of the storage device 202a/400 similarly as described above, and then may monitor to determine whether the software RAID information request was successfully submitted. Similarly, at decision block 1006, the BMC engine 304 may attempt to provide a management information request in the CMB device 408 of the storage device 202a/400 similarly as described above, and then may monitor to determine whether that management information request was successfully submitted. As will be appreciated by one of skill in the art in possession of the present disclosure, the software RAID engine 204 and BMC engine 304 may be configured to retry the provisioning of the software RAID/management information requests some number of times before determining that the software RAID/management information requests have not been successfully submitted.

In yet another example, the determination of whether the storage device 202a designated as the primary storage device 1102 is available at decision block 1008 may be based on whether polling of the primary storage device 1102 was successful. To provide a specific example, at decision block 1006, the software RAID engine 204 may perform any of a variety of polling operations with the storage device 202a/400, and then may monitor to determine whether those polling operations were successful. Similarly, at decision block 1006, the BMC engine 304 may perform any of a variety of polling operations with the storage device 202a/400, and then may monitor to determine whether those polling operations were successful. As will be appreciated by one of skill in the art in possession of the present disclosure, the software RAID engine 204 and BMC engine 304 may be configured to retry the polling operations some number of times before determining that those polling operations were unsuccessful. However, while several specific examples of determining whether the primary storage device 1102 is available at decision block 1008 have been described, one of skill in the art in possession of the present disclosure will appreciate how other techniques for determining storage device availability will fall within the scope of the present disclosure as well.

If, at decision block 1008, it is determined that the primary storage device is available, the method 1000 returns to block 1006. As such, the method 1000 may loop such that, as long as the storage device 202a that was designated as the primary storage device 1102 is available, the software RAID engine 204 in the computing device 200 and the BMC engine 304 in the BMC device 206/300 of the computing device 200 may continue to utilize the CMB device 408 in the storage device 202a/400 in order to transmit management communications with each other.

Figure 15:
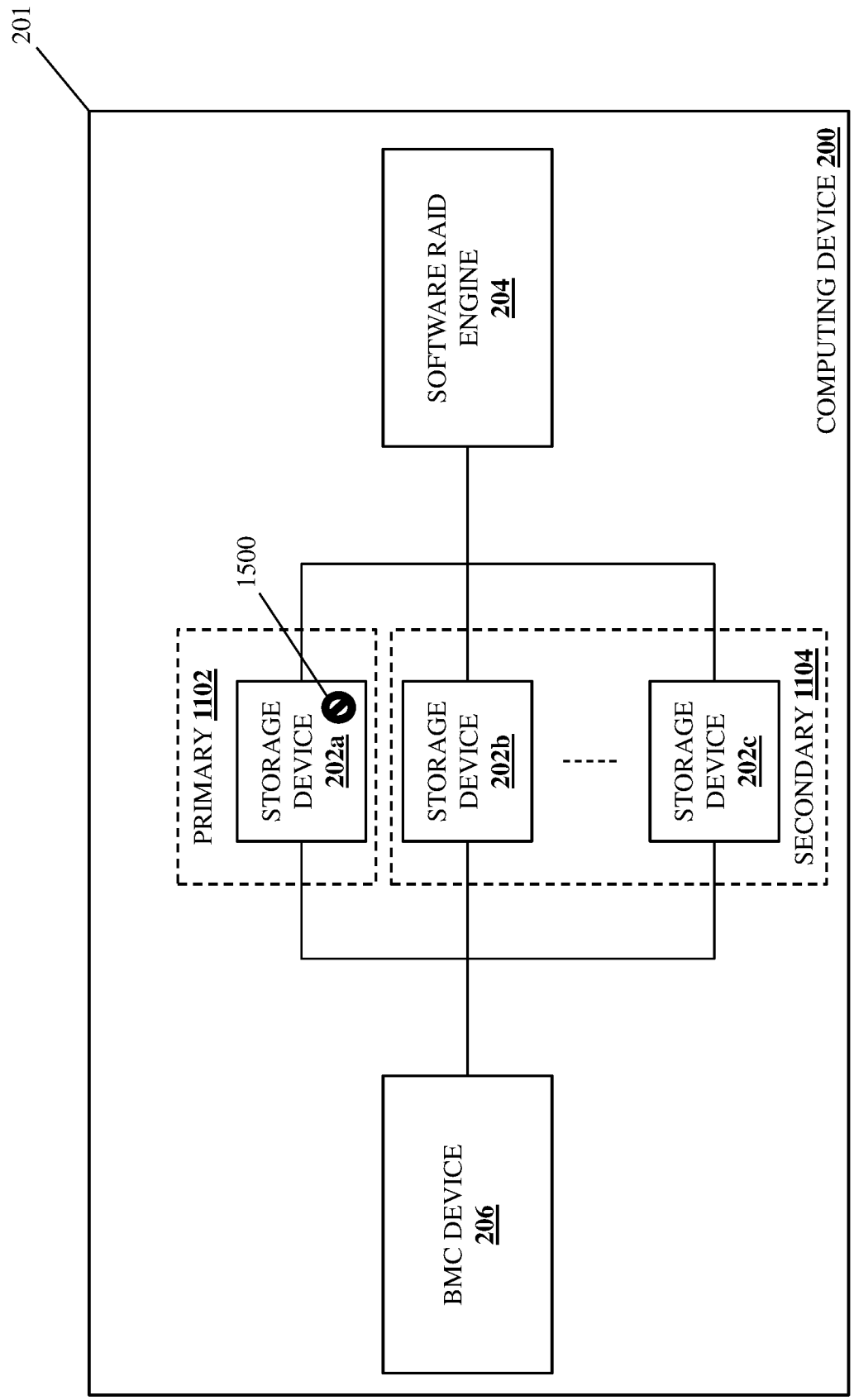
FIG. 15 is a schematic view illustrating an embodiment of the operation of the computing device of FIG. 2 during the method of FIG. 10.

If, at decision block 1008, it is determined that the primary storage device is unavailable, the method 1000 proceeds to decision block 1010 where it is determined whether a secondary storage device is available. With reference to FIG. 15, in an embodiment of decision block 1008, the storage device 202a/400 that was designated as the primary storage device 1102 may become unavailable (as illustrated by the element 1500 in FIG. 15). For example, the storage device 202a/400 may fail, may be disconnected (e.g., "hot removed") from the computing device, may enter a storage device recovery mode, and/or may be subject to any of a variety of other unavailability issues that would be apparent to one of skill in the art in possession of the present disclosure and, in response, each of the software RAID engine 204 in the computing device 200 and the BMC engine 304 in the BMC device 206/300 of the computing device 200 may determine that the storage device 202a/400 that was designated as the primary storage device 1102 has become unavailable and the method 1000 may proceed to decision block 1010.

In an embodiment, at decision block 1010, the software RAID engine 204 may determine whether at least one of the storage devices 202b-202c that were designated as the secondary storage devices 1104 are available using any of a variety of storage device availability determination techniques that would be apparent to one of skill in the art in possession of the present disclosure. As will be appreciated by one of skill in the art in possession of the present disclosure, in this example of the first iteration of the method 1000, one of the storage devices 202b-202c designated as the secondary storage devices 1104 will be available. However, as storage devices become unavailable, and particularly when the computing device 200 only includes two storage devices, subsequent iterations of the method 1000 may result in a determination at decision block 1010 that no secondary storage devise are available.

Figure 16A:
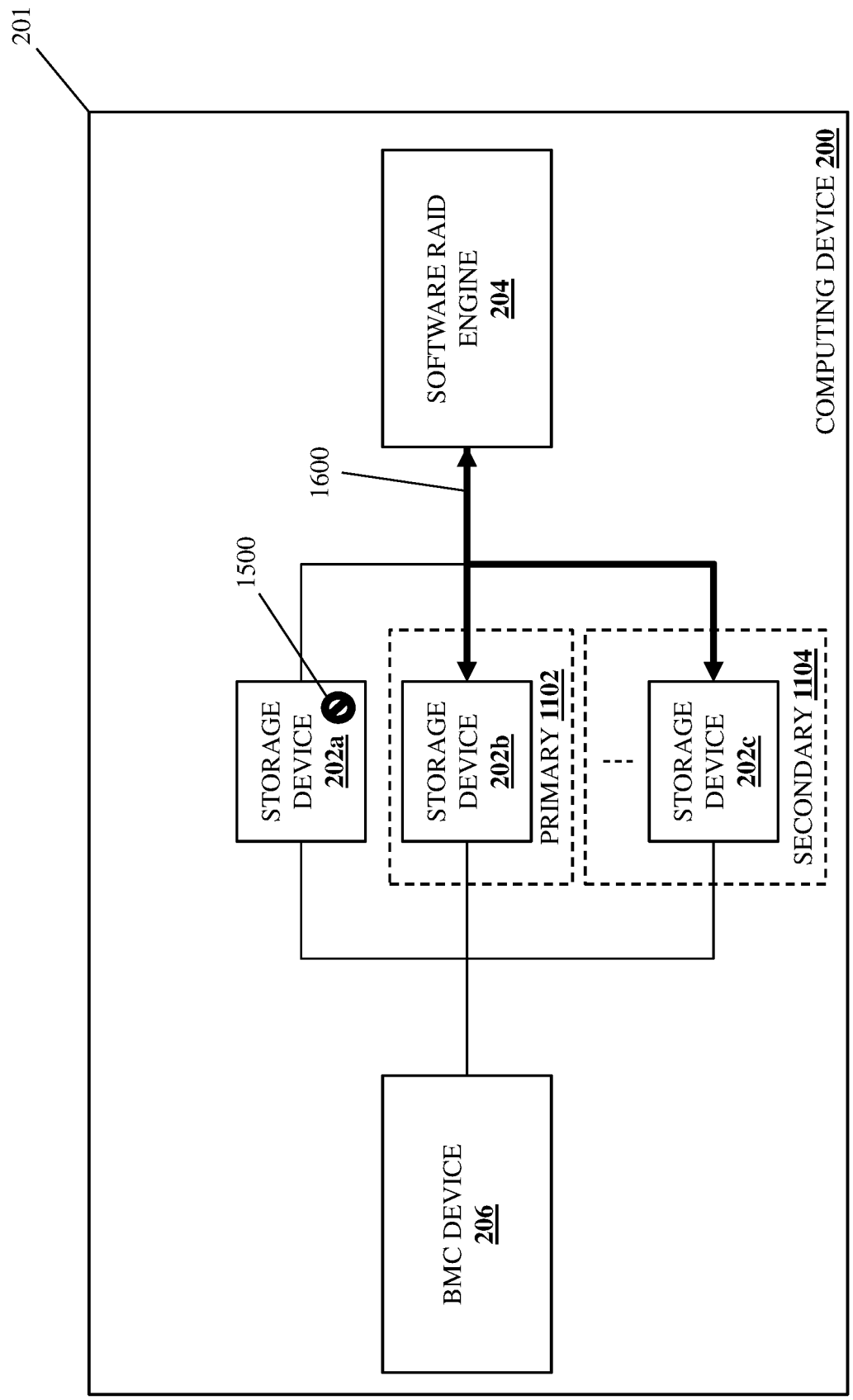
FIG. 16A is a schematic view illustrating an embodiment of the operation of the computing device of FIG. 2 during the method of FIG. 10.

If, at decision block 1010, it is determined that the second storage device is available, the method 1000 proceeds to block 1012 where the software RAID subsystem designates one of the second storage device(s) as the primary storage device. With reference to FIG. 16A, in an embodiment of block 1012 and in response to determining that the storage device 202a/400 is unavailable at decision block 1010, the software RAID engine 204 in the computing device 200 may perform primary/secondary storage device designation operations 1600 that, in the specific examples provided below, designates the storage device 202b as a primary storage device 1102, with the remaining the storage device (s) 202c continuing to be designated as the secondary storage devices 1104. For example, the primary/secondary storage device designation operations 1600 performed at block 1012 may include the software RAID engine 204 removing the primary storage device designation from the storage device 202a (e.g., by marking the storage device 202a as unavailable and removing the storage device 202a from the primary/secondary storage device list), and then designating the storage device 202b as the primary storage device 1102 based on a storage device enumeration order of the storage devices 202b-202c; based on an availability, stability, and/or other features of the CMB device 408 in the storage devices 202b-202c/400; and/or based on any of a variety of factors that one of skill in the art in possession of the present disclosure would recognize as useful for defining the designation of the primary and secondary storage devices of the present disclosure.

Furthermore, as discussed above, while a plurality of storage devices 202b-202c are illustrated and described as being available following the unavailability of the storage device 202a, one of skill in the art in possession of the present disclosure will appreciate how only two storage devices may have been initially available for designation as the primary storage device 1102 and secondary storage device 1104 described below, and thus the storage device 202b may be designated as the primary storage device 1102 at block 1012 with no corresponding designation of any secondary storage devices 1104 while remaining within the scope of the present disclosure as well. As such, the storage device 202b/400 designated at block 1002 as the secondary storage device 1104 operates as backup communication channel for the software RAID engine 204 and the BMC engine 304 in the BMC device 206/300 in the event the active communication channel provided by the storage device 202a/400 that was designated at block 1002 as the primary storage device 1102 becomes unavailable.

Figure 16B:
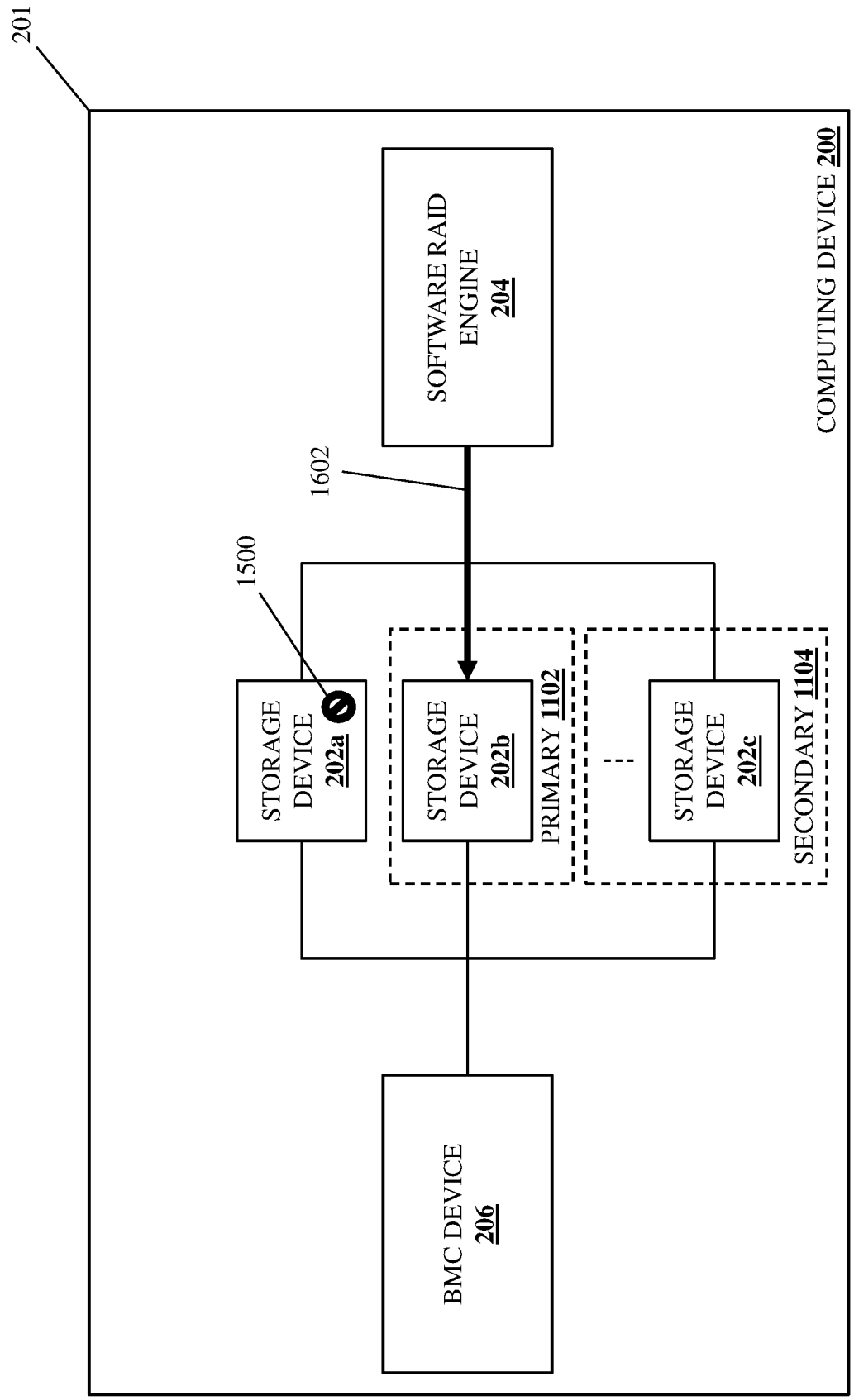
FIG. 16B is a schematic view illustrating an embodiment of the operation of the computing device of FIG. 2 during the method of FIG. 10.
Figure 16C:
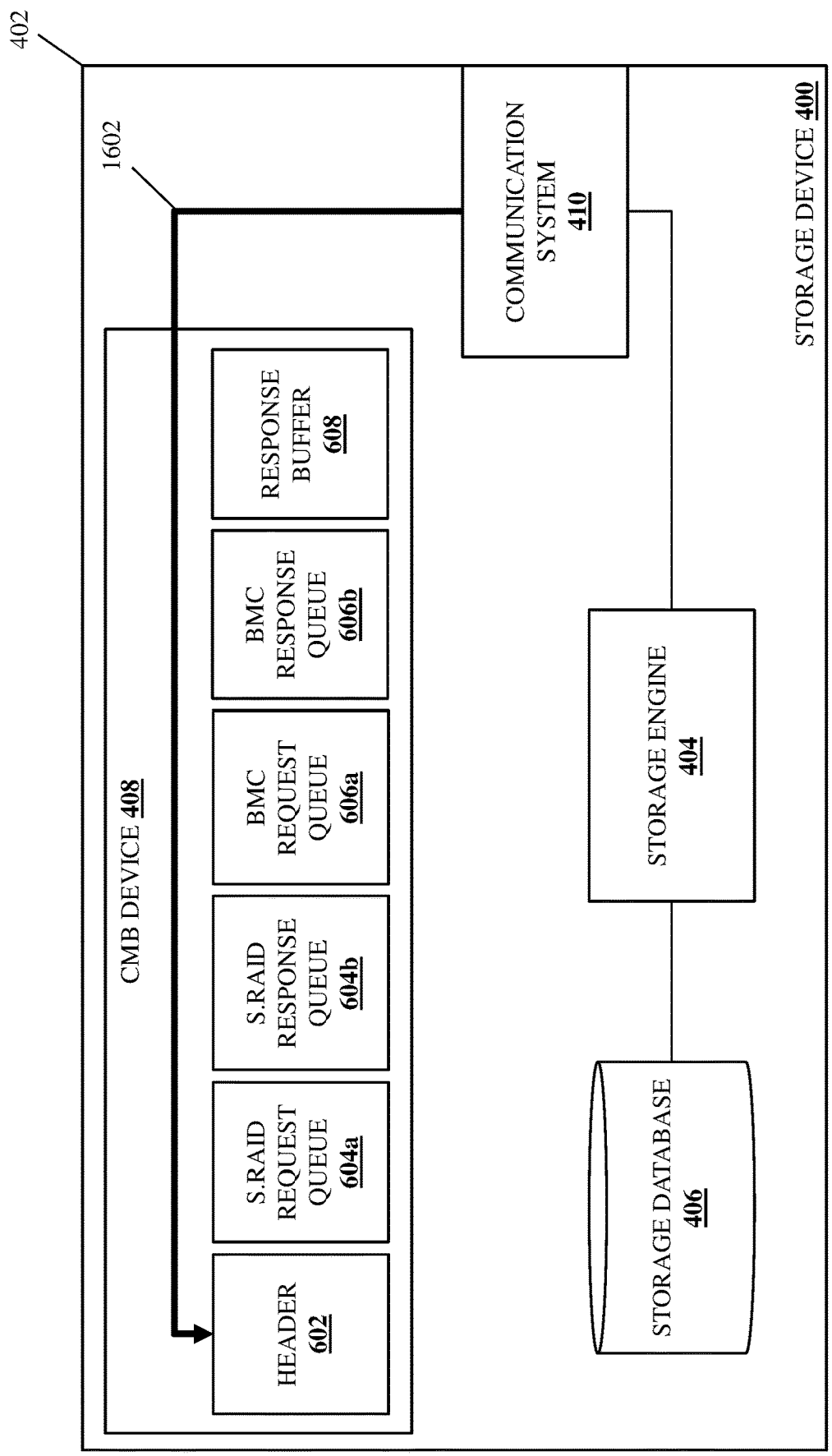
FIG. 16C is a schematic view illustrating an embodiment of the operation of the storage device of FIG. 4 during the method of FIG. 10.

The method 1000 then proceeds to block 1014 where the software RAID subsystem updates the primary/secondary storage device list in the primary and secondary storage devices. With reference to FIGS. 16B and 16C, in an embodiment of block 1014, the software RAID engine 204 in the computing device 200 may perform primary/secondary storage device list update operations 1602 that may include updating the primary/secondary storage device list that identifies the primary storage device 1102 and secondary storage devices 1104 (i.e., the storage device 202b and the storage device(s) 202c following block 1012 of the method 1000), and transmitting the primary/secondary storage device list via the communication system 410 in each of the storage devices 202b-202c for storage in the header 602 included in the CMB device 408 in each of the storage devices 202a-202c. As will be appreciated by one of skill in the art in possession of the present disclosure, the primary/secondary storage device list updated in each of the primary storage device 1102 and secondary storage devices 1104 (i.e., the storage device 202b and the storage device(s) 202c) at block 1014 may include any information that is configured to identify (e.g., to the BMC engine 304 in the BMC device 206/300) the storage device 202b as the primary storage device 1102 and the storage device(s) 202c as the secondary storage devices 1104, as well as provide for any of the other functionality described below.

Furthermore, while the software RAID engine 204 in the computing device 200 is described as updating the primary/secondary storage device list in response to the unavailability of the storage device 202a/400 that was designated as the primary storage device 1102, one of skill in the art in possession of the present disclosure will appreciate how the updating of the primary/secondary storage device list may be performed in other situations as well. For example, the primary/secondary storage device list may be updated in a similar manner in response to the unavailability of any storage devices designated as secondary storage devices 1104 (e.g., by removing those storage devices from the primary/secondary storage device list), in response to a storage device being added (e.g., "hot plugged") to the computing device 200 (e.g., by adding that storage device to the primary/secondary storage device list), and/or in any other primary/secondary storage device list update scenarios that would be apparent to one of skill in the art in possession of the present disclosure.

Figure 17A:
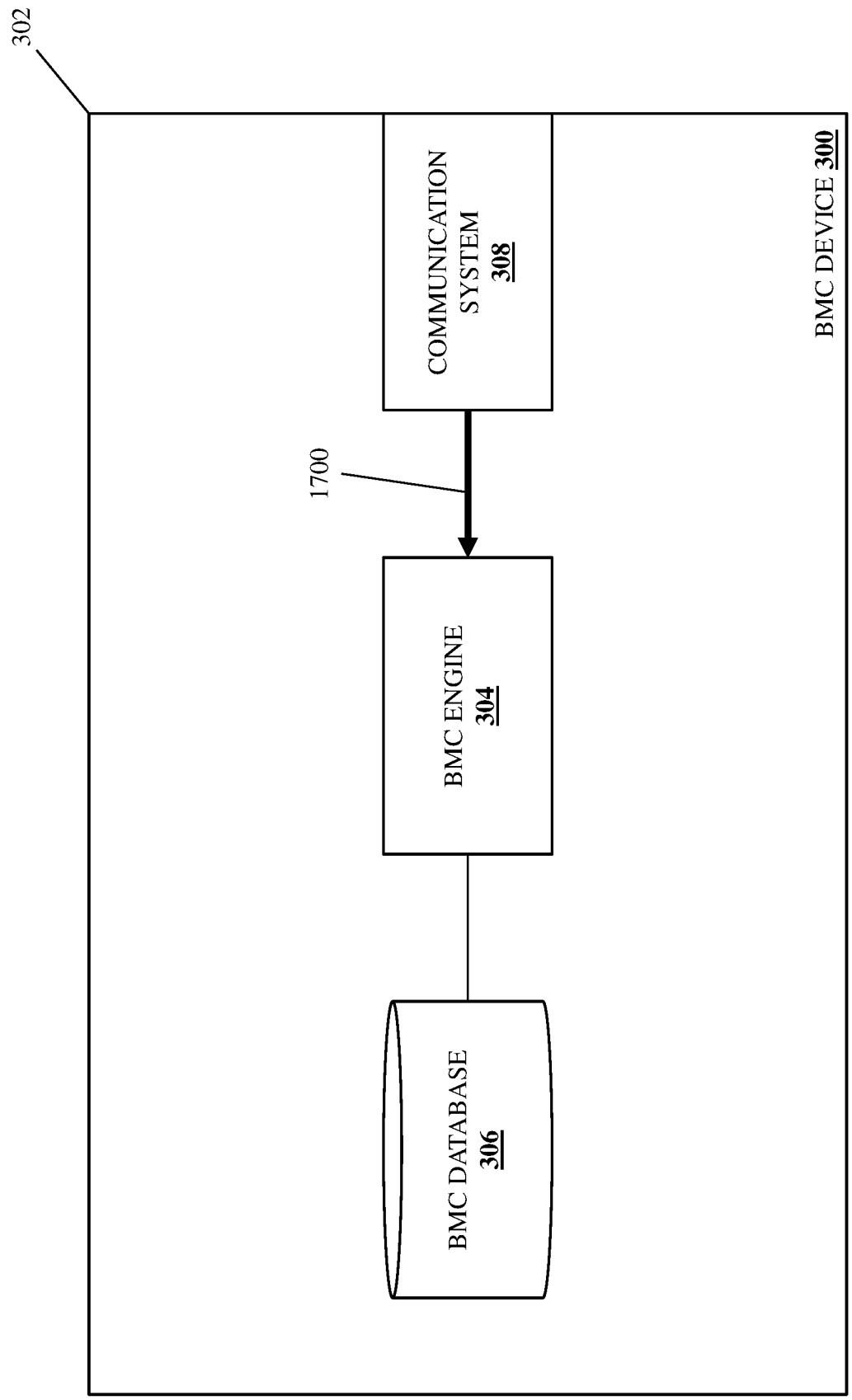
FIG. 17A is a schematic view illustrating an embodiment of the operation of the management subsystem of FIG. 3 during the method of FIG. 10.

With reference to FIGS. 17A and 17B, in an embodiment and as part of (or following) block 1014 of the method 1000, the BMC engine 304 in the BMC device 206/300 of the computing device 200 may perform primary/secondary storage device list retrieval operations 1700 that include retrieving, via its communication system 308, the primary/secondary storage device list from the header 602 included in the CMB device 408 of the storage device 202b/400 via the communication system 410 in the storage device 202b/400. For example, in response to determining that the storage device 202a/400d that was designated as the primary storage device 1102 has become unavailable, the BMC engine 304 in the BMC device 206/300 of the computing device 200 may access the header 602 in the CMB device 408 of the storage device 202b that was designated as one of the secondary storage devices 1104 (e.g., via NVMe-MI-PCIe reads) and may retrieve the updated primary/secondary storage device list from the header 602 in that CMB device 408. As such, following block 1014, both the software RAID engine 204 and the BMC engine 304 may have an updated primary/secondary storage device list identifying the current primary and secondary storage devices (e.g., the storage devices 202b and 202c) for use in the software RAID/ management communications of the present disclosure.

The method 1000 then returns to block 1006. As such, the method 1000 may loop such that the software RAID engine 204 in the computing device 200 and the BMC engine 304 in the BMC device 206/300 of the computing device 200 utilize the CMB device 408 in the storage device 202b/400 that is now designated as the primary storage device 1102 for the transmission of management communications as long as that storage device 202b/400 remains available. Furthermore, in the event the storage device 202b designated as the primary storage device 1102 become unavailable and secondary storage device(s) is/are available, one of those secondary storage devices 1104 may be designated as the primary storage device 1102 and used by the software RAID engine 204 and the BMC engine 304 for the transmission of management communications until no secondary storage devices are available following the unavailability of the primary storage device 1102.

Figure 18A:
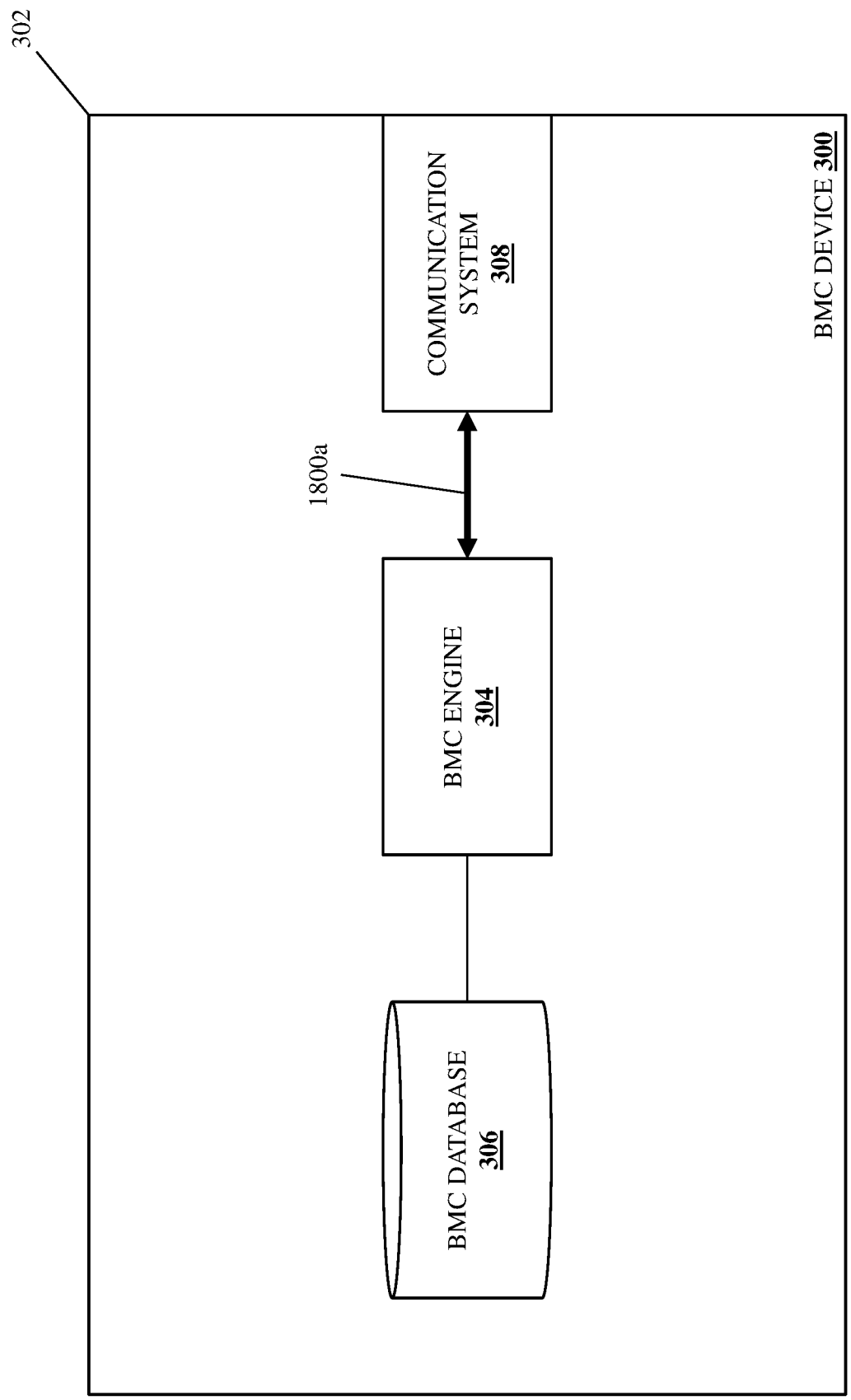
FIG. 18A is a schematic view illustrating an embodiment of the operation of the management subsystem of FIG. 3 during the method of FIG. 10.
Figure 18B:
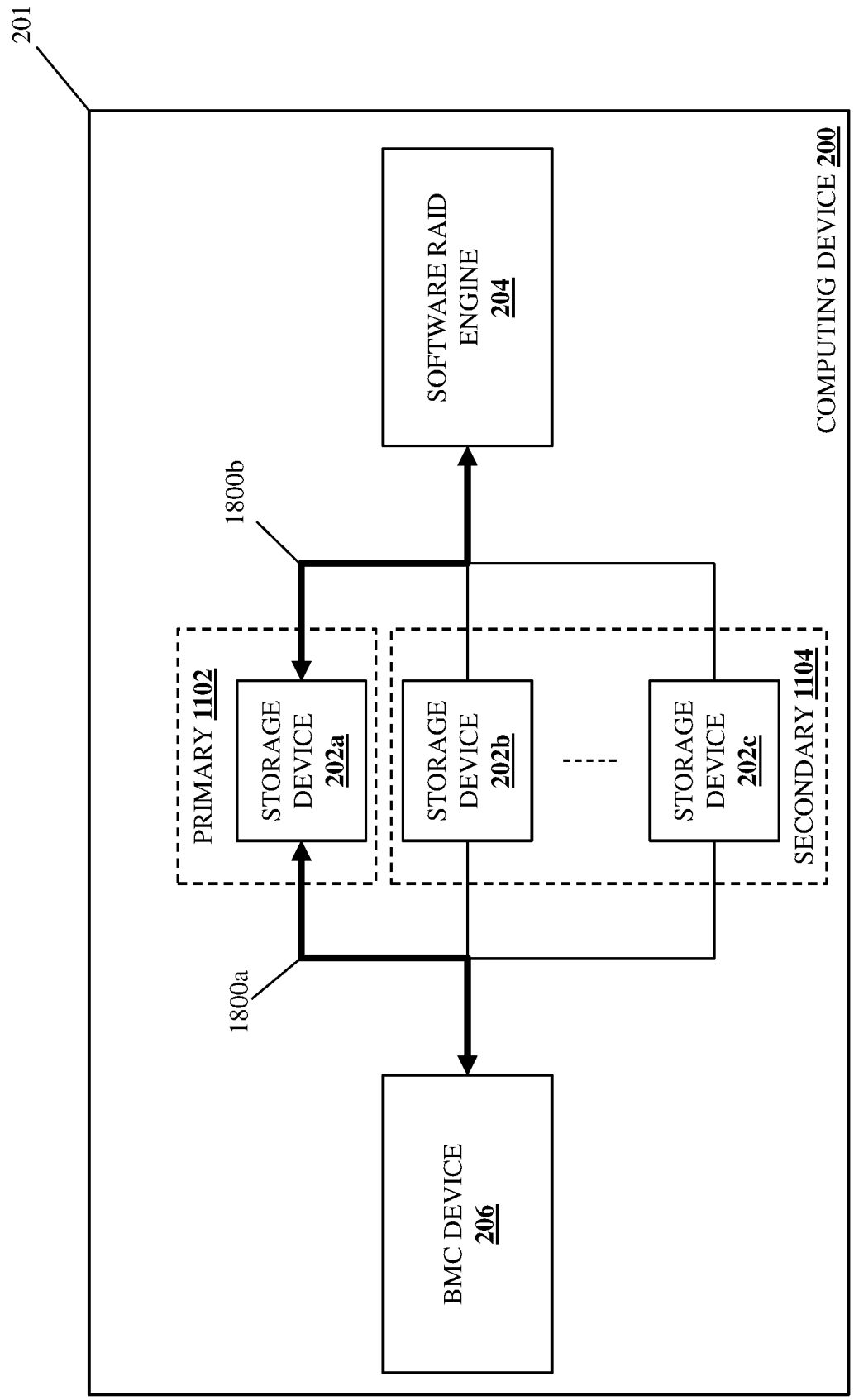
FIG. 18B is a schematic view illustrating an embodiment of the operation of the computing device of FIG. 2 during the method of FIG. 10.

For example, with reference to FIGS. 18A and 18B, in this embodiment of block 1006, the BMC engine 304 in the BMC device 206/300 of the computing device 200 may perform management communication transmission operations 1800a using the storage device 202b/400 via its communication system 308 and the communication system 408 in the storage device 202b/400, while the software RAID engine 204 in the computing device 200 may perform management communication transmission operations 1800b using the storage device 202b/400 via the communication system 408 in the storage device 202a/400. As will be appreciated by one of skill in the art in possession of the present disclosure, the management communication transmission operations 1800a and 1800b performed by the BMC engine 304 and the software RAID engine 204 may be performed substantially as described above with reference to blocks 504a-504e and/or blocks 506a-506e of the method 500.

In a specific example, and in the event that the determination that the storage device 202a/400 that was designated as the primary storage device 1102 was unavailable based on a software RAID information request or management information request having timed out, that software RAID information request or management information request may be resubmitted to CMB device 408 in the storage device 202b/400 as part of the management communication transmission operations 1800a or 1800b. For example, the software RAID engine 204 in the computing device 200 may resubmit the software RAID information request (which was originally submitted to the CMB device 408 in the storage device 202a/400 before timing out) to the CMB device 408 in the storage device 202b/400, and then may access the CMB device 408 in the storage device 202b/400 to determine that the BMC engine 304 in the BMC device 206/300 of the computing device 200 has provided a software RAID information response in the CMB device 408 in the storage device 202b/400 and, in response, retrieve the software RAID information that was provided in the CMB device 408 in the storage device 202b/400 by the BMC engine 304 similarly as described above.

If, at decision block 1010, it is determined that the second storage device is unavailable, the method 1000 proceeds to block 1016 where the software RAID subsystem and/or the management subsystem generates a management communication warning. In an embodiment, at block 1016 and in response to the primary storage device 1102 becoming unavailable and no secondary storage devices being available, the software RAID engine 204 in the computing device 200 and/or the BMC engine 304 in the BMC device 206/300 of the computing device 200 may generate and transmit a management communication warning to an administrator or user of the computing device 200 that identifies the unavailability of a communication channel between the software RAID engine 204 and the BMC engine 304.

Thus, systems and methods have been described that designate primary and secondary storage devices, and then utilize a storage device memory subsystem in the primary storage device for communications between a software RAID subsystem and a management subsystem until the primary storage device becomes unavailable, at which time a storage device memory subsystem in one of the secondary storage devices is utilized for communications between the software RAID subsystem and the management subsystem. For example, the resilient software RAID/management communication system of the present disclosure may include a chassis housing a software RAID subsystem coupled to a plurality of storage devices that are also coupled to a management subsystem. The software RAID subsystem designates a first storage device in the plurality of storage devices as a primary storage device and a second storage device in the plurality of storage devices as a secondary storage device, and uses the respective storage device memory subsystem in the first storage device to transmit first management communications with the management subsystem. If the software RAID subsystem determines that the first storage device is unavailable, it uses the respective storage device memory subsystem in the second storage device to transmit second management communications with the management subsystem. As such, the software RAID/management communications described above are resilient to the unavailability of a storage device being used to provide those management communications.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A resilient software Redundant Array of Independent Disk (RAID)/management communication system, comprising:
 a chassis;
 a management subsystem that is housed in the chassis;
 a plurality of storage devices that are housed in the chassis, that are coupled to the management subsystem, and that each include a respective storage device memory subsystem; and
 a software Redundant Array of Independent Disk (RAID) subsystem that is housed in the chassis and that is coupled to the plurality of storage devices, wherein the software RAID subsystem is configured to:
  designate a first storage device in the plurality of storage devices as a primary storage device and a second storage device in the plurality of storage devices as a secondary storage device;
  provide, in the respective storage device memory subsystem in the first storage device, a software RAID information request that requests the management subsystem provide software RAID information associated with the operation of a software RAID provided by the software RAID subsystem;
  determine that a software RAID information response to the software RAID information request is not received in a threshold time period following the provisioning of the software RAID information request in the respective storage device memory subsystem in the first storage device;
  provide, in the respective storage device memory subsystem in the second storage device in response to determining that the software RAID information response is not received in the threshold time period, the software RAID information request that requests the management subsystem provide the software RAID information associated with the operation of the software RAID provided by the software RAID subsystem;
  determine that the management subsystem has provided a software RAID information response in the storage device memory subsystem of the second storage device; and
  retrieve, from the storage device memory subsystem of the second storage device, the software RAID information response.

2. The system of claim 1, wherein the software RAID subsystem is configured to:
 periodically access the respective storage device memory subsystem of the first storage device and, in response, determine that the software RAID information response to the software RAID information request is not received in the threshold time period following the provisioning of the software RAID information request in the respective storage device memory subsystem in the first storage device.

3. The system of claim 1, wherein the software RAID subsystem is configured to:
periodically access the respective storage device memory subsystem of the second storage device and, in response, determine that the management subsystem has provided the software RAID information response in the storage device memory subsystem of the second storage device.

4. The system of claim 1, wherein the respective storage device memory subsystems in each of the first storage device and the second storage device are provided by respective Controller Memory Buffer (CMB) devices.

5. A resilient software Redundant Array of Independent Disk (RAID)/management communication system, comprising:
a chassis;
a management subsystem that is housed in the chassis;
a plurality of storage devices that are housed in the chassis, that are coupled to the management subsystem, and that each include a respective storage device memory subsystem; and
a software Redundant Array of Independent Disk (RAID) subsystem that is housed in the chassis and that is coupled to the plurality of storage devices, wherein the software RAID subsystem is configured to:
designate a first storage device in the plurality of storage devices as a primary storage device and a second storage device in the plurality of storage devices as a secondary storage device;
generate, in response to designating the first storage device as the primary storage device and the second storage device as the secondary storage device, a primary/secondary storage device list that identifies the first storage device as the primary storage device and the second storage device as the secondary storage device;
provide the primary/secondary storage device list in each of the respective storage device memory subsystem in the first storage device and the respective storage device memory subsystem in the second storage device, wherein the management subsystem is configured to retrieve the primary/secondary storage device list from either of the respective storage device memory subsystem in the first storage device and the respective storage device memory subsystem in the second storage device;
transmit, using the respective storage device memory subsystem in the first storage device, first management communications with the management subsystem;
determine that the first storage device is unavailable; and
transmit, in response to determining that the first storage device is unavailable and using the respective storage device memory subsystem in the second storage device, second management communications with the management subsystem.

6. The system of claim 5, wherein the software RAID subsystem is configured to:
update, in response to determining that the first storage device is unavailable, the primary/secondary storage device list to designate the second storage device as the primary storage device and a third storage device in the plurality of storage devices as the secondary storage device; and
update, subsequent to determining that the first storage device is unavailable, the primary/secondary storage device list in each of the respective storage device memory subsystem in the second storage device and the respective storage device memory subsystem in the third storage device, wherein the management subsystem is configured to retrieve the primary/secondary storage device list from either of the respective storage device memory subsystem in the second storage device and the respective storage device memory subsystem in the third storage device.

7. An Information Handling System (IHS), comprising:
a processing system; and
a memory system that is coupled to the processing system and that includes instructions that, when executed by the processing system, cause the processing system to provide a software Redundant Array of Independent Disk (RAID) engine that is configured to:
designate a first storage device in a plurality of storage devices that are coupled to the processing system as a primary storage device, and a second storage device in the plurality of storage devices as a secondary storage device;
provide, in a respective storage device memory subsystem in the first storage device, a software RAID information request that requests the management subsystem provide software RAID information associated with the operation of a software RAID provided by the software RAID subsystem;
determine that a software RAID information response to the software RAID information request is not received in a threshold time period following the provisioning of the software RAID information request in the respective storage device memory subsystem in the first storage device;
provide, in a respective storage device memory subsystem in the second storage device in response to determining that the software RAID information response is not received in the threshold time period, the software RAID information request that requests the management subsystem provide the software RAID information associated with the operation of the software RAID provided by the software RAID subsystem;
determine that the management subsystem has provided a software RAID information response in the storage device memory subsystem of the second storage device; and
retrieve, from the storage device memory subsystem of the second storage device, the software RAID information response.

8. The IHS of claim 7, wherein the software RAID subsystem is configured to:
periodically access the respective storage device memory subsystem of the first storage device and, in response, determine that the software RAID information response to the software RAID information request is not received in the threshold time period following the provisioning of the software RAID information request in the respective storage device memory subsystem in the first storage device.

9. The IHS of claim 7, wherein the software RAID subsystem is configured to:

periodically access the respective storage device memory subsystem of the second storage device and, in response, determine that the management subsystem has provided the software RAID information response in the storage device memory subsystem of the second storage device.

10. The IHS of claim 7, wherein the respective storage device memory subsystems in each of the first storage device and the second storage device are provided by respective Controller Memory Buffer (CMB) devices.

11. The IHS of claim 7, wherein the software RAID subsystem is configured to determine that the first storage device is unavailable in response to at least one of:
 determining that a software RAID information request cannot be submitted to the first storage device; or
 determining that polling operations for the first storage device have been unsuccessful.

12. An Information Handling System (IHS), comprising:
 a processing system; and
 a memory system that is coupled to the processing system and that includes instructions that, when executed by the processing system, cause the processing system to provide a software Redundant Array of Independent Disk (RAID) engine that is configured to:
  designate a first storage device in a plurality of storage devices that are coupled to the processing system as a primary storage device, and a second storage device in the plurality of storage devices as a secondary storage device;
  generate, in response to designating the first storage device as the primary storage device and the second storage device as the secondary storage device, a primary/secondary storage device list that identifies the first storage device as the primary storage device and the second storage device as the secondary storage device;
  provide the primary/secondary storage device list in each of the respective storage device memory subsystem in the first storage device and the respective storage device memory subsystem in the second storage device, wherein the management subsystem is configured to retrieve the primary/secondary storage device list from either of the respective storage device memory subsystem in the first storage device and the respective storage device memory subsystem in the second storage device;
  transmit, using the respective storage device memory subsystem in the first storage device, first management communications with the management subsystem;
  determine that the first storage device is unavailable; and
  transmit, in response to determining that the first storage device is unavailable and using the respective storage device memory subsystem in the second storage device, second management communications with the management subsystem.

13. The IHS of claim 12, wherein the software RAID engine is configured to:
 update, in response to determining that the first storage device is unavailable, the primary/secondary storage device list to designate the second storage device as the primary storage device and a third storage device in the plurality of storage devices as the secondary storage device; and
 update, subsequent to determining that the first storage device is unavailable, the primary/secondary storage device list in each of the respective storage device memory subsystem in the second storage device and the respective storage device memory subsystem in the third storage device, wherein the management subsystem is configured to retrieve the primary/secondary storage device list from either of the respective storage device memory subsystem in the second storage device and the respective storage device memory subsystem in the third storage device.

14. A method for providing resilient communication between a software Redundant Array of Independent Disk (RAID) subsystem and a management subsystem in a computing device, comprising:
 designating, by a software Redundant Array of Independent Disk (RAID) subsystem, a first storage device in a plurality of storage devices that are coupled to the software RAID subsystem as a primary storage device, and a second storage device in the plurality of storage devices as a secondary storage device;
 providing, by the software RAID subsystem in a respective storage device memory subsystem in the first storage device, a software RAID information request that requests the management subsystem provide software RAID information associated with the operation of a software RAID provided by the software RAID subsystem;
 determining, by the software RAID subsystem, that a software RAID information response to the software RAID information request is not received in a threshold time period following the provisioning of the software RAID information request in the respective storage device memory subsystem in the first storage device;
 providing, by the software RAID subsystem in a respective storage device memory subsystem in the second storage device in response to determining that the software RAID information response is not received in the threshold time period, the software RAID information request that requests the management subsystem provide the software RAID information associated with the operation of the software RAID provided by the software RAID subsystem;
 determining, by the software RAID subsystem, that the management subsystem has provided a software RAID information response in the storage device memory subsystem of the second storage device; and
 retrieving, by the software RAID subsystem from the storage device memory subsystem of the second storage device, the software RAID information response.

15. The method of claim 14, wherein the method further comprises:
 periodically accessing, by the software RAID subsystem, the respective storage device memory subsystem of the first storage device and, in response, determining that the software RAID information response to the software RAID information request is not received in the threshold time period following the provisioning of the software RAID information request in the respective storage device memory subsystem in the first storage device.

16. The method of claim 14, wherein the method further comprises:
 periodically accessing, by the software RAID subsystem, the respective storage device memory subsystem of the second storage device and, in response, determining that the management subsystem has provided a software RAID information response in the storage device memory subsystem of the second storage device; and.

17. The method of claim 14, wherein the respective storage device memory subsystems in each of the first storage device and the second storage device are provided by respective Controller Memory Buffer (CMB) devices.

18. The method of claim 14, wherein the first storage device is determined to be unavailable in response to at least one of:
- determining, by the software RAID subsystem, that a software RAID information request cannot be submitted to the first storage device; or
- determining, by the software RAID subsystem, that polling operations for the first storage device have been unsuccessful.

19. A method for providing resilient communication between a software Redundant Array of Independent Disk (RAID) subsystem and a management subsystem in a computing device, comprising:
- designating, by a software Redundant Array of Independent Disk (RAID) subsystem, a first storage device in a plurality of storage devices that are coupled to the software RAID subsystem as a primary storage device, and a second storage device in the plurality of storage devices as a secondary storage device;
- generating, by the software RAID subsystem in response to designating the first storage device as the primary storage device and the second storage device as the secondary storage device, a primary/secondary storage device list that identifies the first storage device as the primary storage device and the second storage device as the secondary storage device;
- providing, by the software RAID subsystem, the primary/secondary storage device list in each of the respective storage device memory subsystem in the first storage device and the respective storage device memory subsystem in the second storage device, wherein the management subsystem is configured to retrieve the primary/secondary storage device list from either of the respective storage device memory subsystem in the first storage device and the respective storage device memory subsystem in the second storage device;
- transmitting, by the software RAID subsystem using the respective storage device memory subsystem in the first storage device, first management communications with the management subsystem;
- determining, by the software RAID subsystem, that the first storage device is unavailable; and
- transmitting, by the software RAID subsystem in response to determining that the first storage device is unavailable and using the respective storage device memory subsystem in the second storage device, second management communications with the management subsystem.

20. The method of claim 19, further comprising:
- updating, by the software RAID subsystem in response to determining that the first storage device is unavailable, the primary/secondary storage device list to designate the second storage device as the primary storage device and a third storage device in the plurality of storage devices as the secondary storage device; and
- updating, by the software RAID subsystem subsequent to determining that the first storage device is unavailable, the primary/secondary storage device list in each of the respective storage device memory subsystem in the second storage device and the respective storage device memory subsystem in the third storage device, wherein the management subsystem is configured to retrieve the primary/secondary storage device list from either of the respective storage device memory subsystem in the second storage device and the respective storage device memory subsystem in the third storage device.

* * * * *